United States Patent
Negulescu et al.

(10) Patent No.: US 11,960,475 B2
(45) Date of Patent: *Apr. 16, 2024

(54) COMPUTER-IMPLEMENTED SYSTEMS AND METHODS FOR MODELING EXECUTABLE INTERACTION MODELS FOR CONTEXT-DRIVEN USER INTERACTIONS

(71) Applicant: Sessions Technologies Inc., Wilmington, DE (US)

(72) Inventors: Radu Negulescu, Baia Mare (RO); Radu Alexandru Tintescu, Piatra Neamt (RO); Laurentiu-Petrut Ciobanu, Targoviste (RO)

(73) Assignee: Sessions Technologies Inc, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 17/447,887

(22) Filed: Sep. 16, 2021

(65) Prior Publication Data
US 2022/0083212 A1 Mar. 17, 2022

Related U.S. Application Data

(60) Provisional application No. 63/079,304, filed on Sep. 16, 2020.

(51) Int. Cl.
| | |
|---|---|
| *G06F 16/23* | (2019.01) |
| *G06F 3/0481* | (2022.01) |
| *G06F 3/04847* | (2022.01) |
| *G06F 3/0486* | (2013.01) |
| *G06F 3/16* | (2006.01) |

(Continued)

(52) U.S. Cl.
CPC ........ *G06F 16/2379* (2019.01); *G06F 3/0481* (2013.01); *G06F 3/04847* (2013.01); *G06F 3/0486* (2013.01); *G06F 3/167* (2013.01); *G06F 16/9024* (2019.01); *G06F 21/604* (2013.01); *G06Q 10/1091* (2013.01); *G06Q 10/1097* (2013.01); *H04L 12/1822* (2013.01); *H04L 12/1831* (2013.01); *H04L 67/14* (2013.01)

(58) Field of Classification Search
CPC ............ G06F 16/2379; G06F 16/9024; G06F 3/0481; G06F 3/04847; G06F 3/0486; G06F 3/167; G06F 21/604; G06Q 10/1091; G06Q 10/1097; H04L 12/1822; H04L 12/1831; H04L 67/14
See application file for complete search history.

(56) References Cited

U.S. PATENT DOCUMENTS

| | | | |
|---|---|---|---|
| 10,228,858 B1* | 3/2019 | Stoakes | ................ G06F 3/0641 |
| 2005/0261949 A1* | 11/2005 | Martin | ................ G06Q 10/10 |
| | | | 705/1.1 |

(Continued)

*Primary Examiner* — Mandrita Brahmachari
(74) *Attorney, Agent, or Firm* — Finnegan, Henderson, Farabow, Garrett & Dunner, LLP

(57) ABSTRACT

Computer-implemented systems and methods are provided for modeling, executing, and controlling context-driven user interactions. In some embodiments, systems and methods are provided for modeling user interactions and generating interaction models. Each generated interaction model may be executable for controlling a context-driven user interaction. The interaction model may include data identifying one or more interaction objects and one or more modules that are executable in session(s) of the modeled interaction.

29 Claims, 29 Drawing Sheets

(51) Int. Cl.
  *G06F 16/901*     (2019.01)
  *G06F 21/60*      (2013.01)
  *G06Q 10/1091*    (2023.01)
  *G06Q 10/1093*    (2023.01)
  *H04L 12/18*      (2006.01)
  *H04L 67/14*      (2022.01)

(56) References Cited

U.S. PATENT DOCUMENTS

| | | |
|---|---|---|
| 2009/0259720 A1* | 10/2009 | Heins .................... G06Q 10/10 |
| | | 709/204 |
| 2016/0072862 A1 | 3/2016 | Bader-Natal et al. |
| 2018/0024986 A1 | 1/2018 | Singh et al. |
| 2018/0294986 A1* | 10/2018 | Vidro .................... H04L 51/046 |
| 2021/0218784 A1* | 7/2021 | Geiselhart .......... G06Q 10/1095 |
| 2022/0083538 A1 | 3/2022 | Radulescu et al. |
| 2022/0083985 A1 | 3/2022 | Radulescu et al. |

* cited by examiner

Example Buildup Interface: Global View

Example Buildup Interface: Interface View

Example Buildup Interface: Session View

COMPUTER-IMPLEMENTED SYSTEMS AND METHODS FOR MODELING EXECUTABLE INTERACTION MODELS FOR CONTEXT-DRIVEN USER INTERACTIONS

TECHNICAL FIELD

The present disclosure relates to the fields of data management, information security, and computer data processing and transferring. More specifically, and without limitation, the present disclosure relates to computer-implemented systems and methods for modeling and controlling context-driven user interactions. Each interaction may include one or more sessions among users that exchange information for a common context. The exchanged data may be stored with metadata as part of a data buildup. The present disclosure also relates to interfaces, modules, and other components for implementing the systems and methods of the present disclosure.

BACKGROUND

In today's modern society, computerized interactions and the exchange of information between individuals is highly advanced. With the technological developments in networks, databases, servers, applications, and user devices, there is a wide array of communication tools and infrastructures. Collectively, they enable the instantaneous exchange of information at any given time and in any given context. Also, information is digitized and readily available in many forms, including video, audio, and text. In this highly connected, information rich world, there is virtually no cost or restriction to accessing and exchanging information.

Unfortunately, these advances have led to drawbacks, such as information overload and disorganization. With so much available information, it is a challenge to users, businesses, and other entities to efficiently and effectively process and manage this information. For example, it is often difficult to store, identify, and access the right or useful information, particularly for a common context or goal. It is also difficult to strike a balance between quantity and quality of available information. Further, there are security issues and problems with access control and information management. As a result, collaboration and productivity suffer.

There are also other drawbacks. For example, available computer-implemented systems and techniques are restrictive and inflexible. As a result, due to the large number of technologies and different platforms for facilitating communications, there are often compatibility issues and/or infrastructural challenges that make it difficult to organize and retain relevant data. Extant technology and techniques are also unable to provide an effective way to control and manage communications when multiple users and varied computing and data sources are involved. This frustrates knowledge buildup, retention, and retrieval. Still further, many database systems only provide limited information about stored data (e.g., filename, date, and/or author). This means it is often impossible to determine the context for stored data, including how that data was shared, gathered, and/or developed among users. Consequently, related data also becomes difficult to identify and retrieve from memory.

SUMMARY

Embodiments of the present disclosure provide computer-implemented systems and methods for modeling, executing, and controlling context-driven user interactions. As disclosed herein, the present embodiments address one or more of the above-referenced drawbacks of extant technologies and techniques. Embodiments of the present disclosure include systems and methods for modeling user interactions through the generation of interaction models. Embodiments of the present disclosure also provide technological solutions for processing and managing data exchanged in those interactions. The disclosed embodiments also provide systems and methods that are more flexible and capable of managing interactions when multiple users and varied computing and data sources are involved.

Still further, systems and methods consistent with the present disclosure enable qualitative structuring and organization of data provided by users. This data may be exchanged through modeled interactions among users across one or more sessions. As disclosed herein, an interaction model may be designed to manage and control each interaction. With the interaction model, computer-implemented modules are defined to control the execution of the interaction with more precision and, at the same time, an agenda is defined and generated for guiding and informing users throughout the execution of the interaction. Systems and methods disclosed herein are thus capable of providing improved and friction-free interaction environments for collaboration and communication among users. These and other features of the present disclosure address the above-mentioned drawbacks of extant systems while at the same time advance work efficiency and productivity among users.

Embodiments of the present disclosure also include an innovative platform for enabling the exchange of information among a configuration of users in a common context, and for retaining all relevant information as part of a data buildup. As disclosed herein, a data buildup consistent with the present disclosure enables effective knowledge retention and the identification of how data was shared, gathered, and/or developed among users. Also, related data can be easily identified and retrieved from memory. These and other features and advantages of the embodiments of the present disclosure are presented herein and will become more apparent from the following detailed description and accompanying drawings and claims.

As disclosed herein, a computer-implemented method is provided for generating an interaction model. The interaction model provides a model for controlling an interaction comprising a plurality of sessions among a defined configuration of users that exchange data for a common context. The method includes providing, on a computer-implemented display, a designer interface adapted to design the interaction model based on a plurality of user inputs. The method also includes arranging, responsive to first user inputs, one or more interaction objects in a sequence and/or relative to a time axis displayed in the designer interface, each interaction object representing a configuration of users associated with the interaction, and further arranging, responsive to second user inputs, one or more modules relative to the sequence and/or time axis displayed in the designer interface, each module representing a set of functional elements that are executable in one or more of the plurality of sessions of the interaction. The method also includes storing, in a computer-readable medium, data representing the interaction model based on the one or more interaction objects and modules arranged in the designer interface.

In some embodiments, the computer-implemented method may further include identifying, responsive to third user inputs, users associated with the configuration for each interaction object and a role assigned to each user in the configuration and storing, in the computer-readable medium, data representing the identified users and roles assigned to users as part of the interaction model. The roles available to assign to users may include, for example, an owner, an administrator, a contributor, and a participant. Each assigned role may define the rights of a user in the configuration. Further, the set of functional elements of the one or more of the modules include may functional elements that are configured to be dependent on the assigned roles to users. Such features help address security issues and provide better access control and information management, while at the same time supporting a well-structured environment for exchanging data for a common context.

According to another embodiment, a computer-implemented method is provided for controlling an interaction comprising a plurality of sessions, each session including a configuration of users that exchange data for a common context using a plurality of user devices in network communication with a system platform. The method includes providing, in a computer-readable medium, an interaction model for controlling the interaction, the interaction model including data identifying one or more interaction objects and one or more modules arranged in a sequence and/or relative to a time axis. Each interaction object may represent a configuration of users associated with the interaction, and each module may include a set of functional elements that are executable in one or more of the sessions of the interaction. The method may further include providing, on a computer-implemented display of each user device, a player interface adapted to display an interaction environment to enable an exchange of data among the configuration of users associated with the interaction and executing, with at least one processor, an instance of the provided interaction model to control the exchange of data among the configuration of users associated with the interaction. As disclosed herein, the interaction environment displayed by the player interface may be updated responsive to the execution of the interaction model. Such features provide a more organized environment for exchanging data and can address compatibility issues that might exist due to varied computing and data sources among the users participating in the sessions.

By way of example, the interaction environment of the player interface may be updated to present at least one of tools, prompts, or instructions during the execution of the interaction model. In addition, the interaction environment of the player interface may be updated in response to execution of one or more of the modules of the interaction model.

In some embodiments, the users in the configuration can view, through the player interface, an agenda for each session and the progress of each session relative to the agenda. Further, the users in the configuration may exchange data, through the interaction environment of the player interface, using one or more modules of the interaction model.

According to the present disclosure, the computer-implemented method may further include identifying, in at least one of a designer interface or a management interface, users associated with the configuration for each interaction object and a role assigned to each user in the configuration. Also, the method may include storing, in the computer-readable medium, data representing the identified users and roles assigned to users as part of the interaction model.

As disclosed herein, a data buildup for an interaction may be stored in a database. The data buildup may include data exchanged in the sessions of the interaction. To assist with the searching and retrieval of data from the data buildup, metadata may be stored that identifies, among other things, the contextual information for data in the data buildup. During execution of an interaction model, the functional elements of one or more modules may generate and provide the metadata for the data buildup. Examples of modules include, for example micro modules, macro modules, and meta modules.

In accordance with still further embodiments of the present disclosure, an interaction system is provided. The interaction system may include a data management server configured to form a persistence layer and manage data associated with a plurality of interaction models. The system may also include a buildup server configured to store and provide data associated with executed instances of each interaction model using the persistence layer. In addition, the system may include an application server configured to execute instances of the interaction models, each interaction model including a plurality of sessions for an interaction, each session including a configuration of users that exchange data for a common context.

As disclosed herein, each interaction model may include one or more interaction objects and one or more modules. Each interaction object may represent a configuration of users associated with the interaction. Further, each module may include a set of functional elements that are executable in one or more of the sessions of the interaction.

In some embodiments, the application server may be configured to process metadata comprising location information for accessing data managed by the data management server or stored by the buildup server. The metadata may also include contextual information to search and retrieve data stored by the buildup server. Further, according to the interaction system of the present disclosure, application data may be provided that includes configuration data. The configuration data may identify users associated with the configuration for each interaction object and a role assigned to each user in the configuration.

In accordance with still further embodiments of the present disclosure, a computer-implemented system for controlling context-driven interactions is provided. In the system, each interaction may include a configuration of users that exchange data using a plurality of user devices in network communication with the system. The system may include a computer-readable medium that stores at least one interaction model for controlling an interaction. The interaction model may include data identifying one or more interaction objects and one or more modules arranged in a sequence and/or relative to a time axis. Each interaction object may represent a configuration of users associated with the interaction, and each module may include a set of functional elements that are executable in one or more of the sessions of the interaction. Also, the one or more modules may include one or more micro modules arranged in a sequence as part of at least one session of the interaction.

The computer-implemented system may also include a player interface, generated on a computer-implemented display of each user device, that is adapted to display an interaction environment to enable an exchange of data among the configuration of users associated with the interaction. Further, the system may include at least one processor configured to execute an instance of the interaction model to control the exchange of data among the configuration of users associated with the interaction. As disclosed herein, the interaction environment displayed by the player interface may be updated responsive to the execution of the interaction model. Further, an agenda may be displayed in the interaction environment for the at least one session, the agenda including one or more graphical objects arranged in the sequence of the one or more micro modules.

In some embodiments, at least one of the graphical objects in the agenda is selectable by a user to execute functional elements of at least one of the micro modules in the interaction model. Examples of micro modules include, for instance, a comment module, a video conference module, or a presentation module. Further examples of micro modules and other types of modules are disclosed herein.

In the computer-implemented system, at least one processor may be configured to execute the one or more modules of the interaction mode. Further, as disclosed herein, the interaction environment displayed by the player interface may be updated in response to execution of one or more of the modules of the interaction model. By way of example, the interaction environment displayed by the player interface may be updated to indicate a progress of the at least one session relative to the agenda by displaying a progress pointer or line or by highlighting items in the agenda.

During execution of the interaction model, users in the configuration may exchange data, through the interaction environment of the player interface on their respective user device. The functional elements of one or more modules of the interaction model may be executed to support the transfer of data among users. Data exchanged in the sessions of the interaction may be stored in a data buildup. The data buildup may be implemented as part of a relational database, for example.

In yet additional embodiments, a computer-implemented method is disclosed for providing a data buildup for context-driven interactions. Each interaction may include a configuration of users that exchange data using a plurality of user devices. The method may include providing at least one interaction model for controlling an interaction, the interaction model including data identifying one or more interaction objects and one or more modules. Each interaction object may represent a configuration of users associated with the interaction, and each module may include a set of functional elements that are executable in one or more of the sessions of the interaction.

The computer-implemented method may further include generating, on a computer-implemented display of each user device, a player interface adapted to display an interaction environment to enable an exchange of data among the configuration of users associated with the interaction, and executing, with at least one processor, the interaction model to control the exchange of data among the configuration of users associated with the interaction. Further, the method may include providing a database configured to store a data buildup for the interaction, the data buildup comprising data exchanged in the sessions of the interaction, and maintaining a schema for the database that stores the data buildup.

In some embodiments of the method, maintaining the schema may include assembling the schema based on a namespace for the modules in the interaction model, the namespace including at least one of a developer name and a module name for each module, and declared dependencies by one or more of the modules with respect to other modules in the interaction model.

As disclosed herein, the computer-implemented method for may include storing a graph representation of all changes to the schema, the graph representation including data that identifies changes to the schema by the modules. In addition, the method may include reducing the graph representation by eliminating cycles in the graph representation corresponding to redundant operations. Additionally, the method may include providing metadata that identifies contextual information for data in the data buildup, wherein at least a part of the metadata is generated by the functional elements of the one or more of the modules.

Additional objects and advantages of the present disclosure will be set forth in part in the following detailed description, and in part will be clear from the description, or may be learned by practice of the embodiments of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

Any feature in one aspect may be applied to other aspects, in any appropriate combination. In particular, method aspects may be applied to apparatus or system aspects, and vice versa. Any apparatus or system feature as described herein may also be provided as a method feature and vice versa. Furthermore, features implemented in hardware may be implemented in software, and vice versa. Any reference to software and hardware features herein should be construed accordingly. When used, functional features or steps may be expressed alternatively in terms of their corresponding structure, such as a suitably programmed processor and associated memory. It is understood that particular combinations of various features described and defined in any aspects of embodiments of the present disclosure can be implemented and/or supplied and/or used independently.

BRIEF DESCRIPTION OF THE DRAWINGS

The accompanying drawings, which comprise a part of this specification, illustrate several embodiments and, together with the description, serve to explain the principles and features of the disclosed embodiments. In the drawings:

FIG. 11B illustrates an example player interface that provides an interaction environment for users to exchange information, according to embodiments of the present disclosure.

DETAILED DESCRIPTION

Figure 1A:
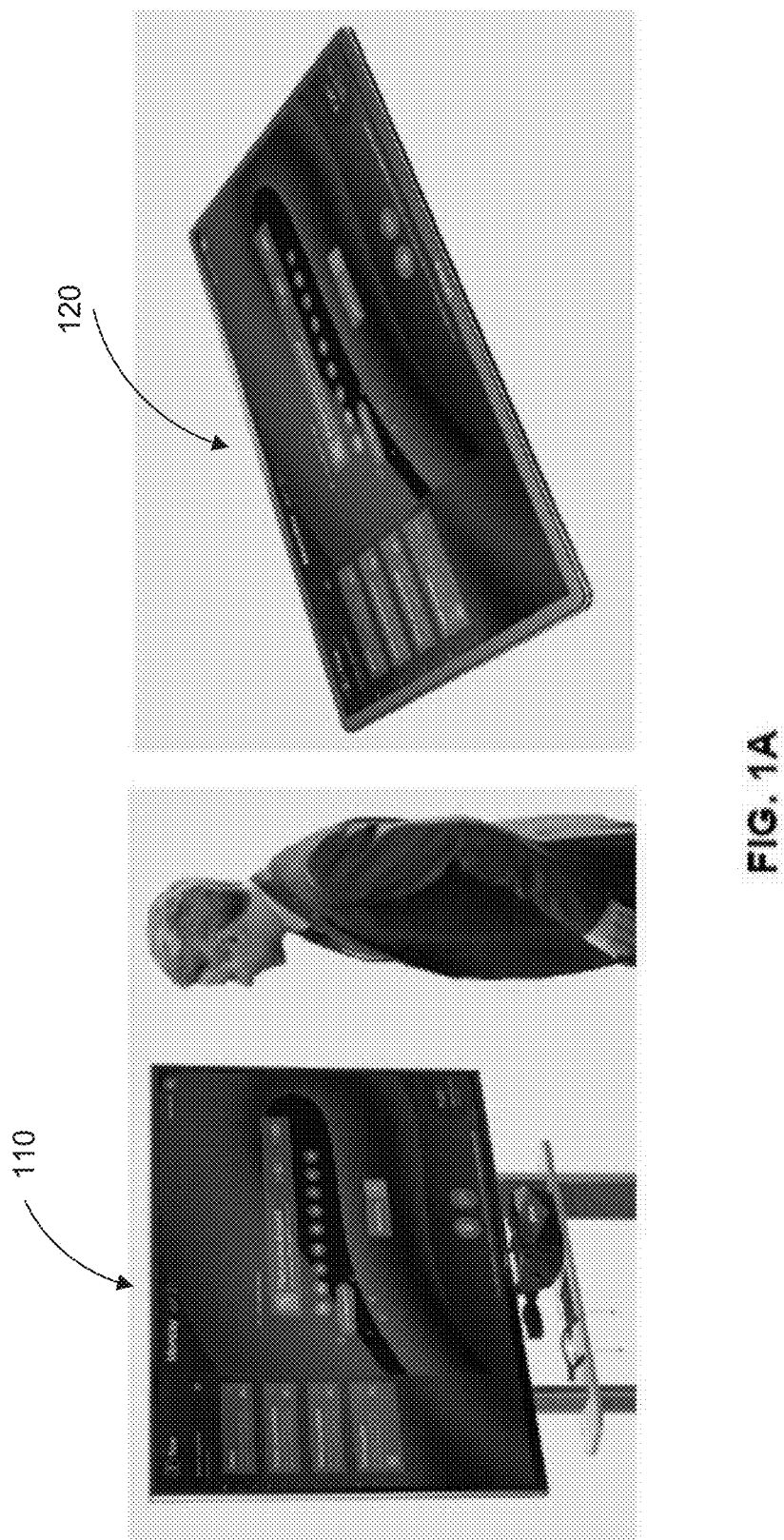
FIG. 1A illustrates example devices for use in interaction systems and methods, according to embodiments of the present disclosure.

The disclosed embodiments of the present disclosure relate to computer-implemented systems and methods for modeling, executing, and controlling context-driven user interactions. In some embodiments, the disclosed systems and methods may be configured to generate an interaction model. The interaction model may provide a model for controlling an interaction comprising one or more sessions among users that exchange information for a common context. As disclosed herein, the interaction model may include one or more computer-implemented modules that control the sequence and execution of the interaction with more precision. With the interaction model, a configuration of users for each session may also be defined, including their respective roles and access rights. As a result, drawbacks of extant systems are avoided, such as information overload and disorganization.

The common context of an interaction may relate to any goal, purpose, or objective. Further, it may relate to any type of meeting, project, or initiative. By way of example, the context for an interaction may be a software development project, product research and development, a scientific study, board meeting(s), a financial audit, business plan development, judicial or legal hearing(s), bill writing initiative(s), educational content creation, an online festival, music/play/film drafting and production, an architectural study, a building project, and so on. As will be appreciated from this disclosure, these are non-limiting examples and other context-driven interactions may be modeled and executed with the disclosed systems and methods.

Embodiments of the present disclosure may be implemented with various types of devices, interfaces, modules, and other components for implementing the disclosed systems and methods herein. For example, users may generate, exchange, access, and view information using any combination of devices, including computers, laptops, tablets, smartphones, mobile phones, wearables, virtual reality (VR) or augmented reality (AR) headsets, hand gesture devices, display screens, electronic white boards or smartboards, audio headsets, ear buds, microphones, stylus pens, and so on. These devices may communicate with the system platform and one another using any combination of networks and communication technologies. Examples of networks include local area networks and wide area networks. The networks may include any combination of private networks (e.g., a corporate or virtual private network) and/or public networks (e.g., the Internet). Also, any suitable combination of wired and/or wireless communication technologies may be employed, including for example Bluetooth, WiFi, 802.11, GPS, 4G/5G, TCP/IP, USB C, and so on.

As disclosed herein, various interfaces may be provided to enable users to generate and exchange information. Interfaces may also be provided for other purposes, such as to enable users to design interaction models and manage interactions. As a further example, interfaces may also be provided to set parameters and/or program modules. In some embodiments, interfaces may be implemented with software and, when executed, provide graphical user interfaces (GUIs) and/or VR/AR interfaces that are displayed on and/or with user devices or terminals. Each interface may be device independent (e.g., an independent application solution or app; a web browser or applet based solution; etc) and work with various forms of input/output data, such as audio, voice, text, and/or haptic feedback. Examples of interfaces, consistent with the present disclosure, include a designer interface, a management interface (such as a base or studio interface), a player interface, and a buildup interface. Further examples of interfaces include a program interface (e.g., to program modules) and a marketplace interface (e.g., to search, purchase, and/or load modules from developers and vendors). These and other examples of interfaces are further described below, including example features and capabilities of these interfaces. In some embodiments, representations of user roles and configurations for an interaction may be displayed using graphical objects in an interface. Collectively, graphical objects and elements may be used to represent the features, design, and state of an interaction model, as shown in the example embodiments presented herein.

In some embodiments, a method of generating an interaction model is provided that includes computer-implemented steps. For example, the method may be implemented with one or more processors that execute programmable instructions and include providing, on a computer-implemented display, a designer interface adapted to design the interaction model based on a plurality of user inputs. Through the designer interface, a user or administrator may select and arrange graphical objects to design the interaction model. For example, the method may include arranging, responsive to first user inputs, one or more interaction objects in a sequence and/or relative to a time axis displayed in the designer interface. Each interaction object may represent a configuration of users associated with the interaction. The method may also include further arranging, responsive to second user inputs, one or more modules relative to the sequence and/or time axis displayed in the designer interface. Each module may represent a set of functional elements that are executable in one or more of the plurality of sessions of the interaction. In some embodiments, a database or other computer-readable medium may store data representing the interaction model, including the one or more interaction objects and modules arranged through the designer interface.

In some embodiments, the users for an interaction and the roles to be assigned to each user may be identified through additional inputs to the designer interface (e.g., third user inputs by an owner or administrator of the interaction). Data representing the identified users and roles may be stored in the database as part of the interaction model. As disclosed herein, there may be different types of user roles (e.g., owner, contributor, participant) and each role may define the rights of user in a configuration, including the right to provide or access information. User roles may also be used by the functional elements of a module to control or manage user activity or participation during a session.

Systems and methods consistent with embodiments of the present disclosure may also be configured to execute interaction models and control context-driven user interactions. As discussed above, each interaction model may include one or more modules. In some embodiments, there may be different types of modules and each module may be implemented as a software application or set of programmable instructions executable by the system. The modules may provide rules or functional elements to control and/or manage a user interaction at a particular point in time or during a time period of a session.

According to some embodiments, a method is provided for controlling an interaction comprising a plurality of sessions, each session including a configuration of users that exchange information for a common context using a plurality of user devices networked with a system platform. The method may include computer-implemented steps. For example, the method may be implemented with one or more processors that execute programmable instructions and include providing an interaction model for controlling the interaction, the interaction model including one or more interaction objects and one or more modules arranged in a sequence and/or relative to a time axis. Further, a player interface may be provided on a computer-implemented display of each user device. As further disclosed herein, the player interface may be adapted to provide an interaction environment to exchange information among the users in each session of the interaction. The method may also include executing, with at least one processor of the system platform, an instance of the interaction model to control the exchange of information among users in each session of the interaction, wherein the interaction environment provided by the player interface is updated responsive to the execution of the interaction model.

For example, in some embodiments, the player interface may be updated to display information and/or graphical objects based on the interaction model. In some embodiments, the player interface may be configured to display an agenda based on the one or more modules of the interaction model. As disclosed herein, the agenda may include graphical objects that are selectable by a user to access and execute functional elements of the one or more modules. The graphical object may be any combination of text, symbol(s), and/or graphic(s). Further, the player interface may be updated to display information responsive to the execution of the one or more modules of the interaction model. Through the player interface, users in the configuration may be able to view and confirm the agenda for a session (including the one or more modules) as well as the progress of the session. Also, through the player interface, users in the configuration may exchange data, including in response to tools, prompts, and/or instructions presented in the player interface. Tools may be represented by graphical objects in the player interface and, when selected, enable a user to link to another interface (e.g., a designer interface or a management interface) or to functional elements of a module (e.g., a device module, a micro module, a macro module, or a meta module). Prompts and/or instructions to manage the session or the exchange of data may also be displayed in the player interface using, for example, a predetermined screen segment (e.g., a outer margin of the screen) and/or a pop-up window. Further, in some embodiments, the player interface may be updated to display information dependent on the role assigned to each user. Thus, there may be common displays for all users and user role-specific displays presented through the player interface.

As previously noted, user roles may be stored as part of the interaction model. Each role may define the rights of each user, including the right to provide or access certain information. User roles may also control which users have the right to define an interaction model and the roles of other users. Roles may also be used by the functional elements of a module to control or manage user activity or participation during a session (e.g., joining a break-out meeting; voting on one or more items; authorizing a software revision; controlling access to confidential documents; etc).

For example, in some embodiments, a user that is an owner or administrator may have the right to define and execute an interaction model. The owner or administrator may also have the right to define the roles of other users and the right to contribute data during an interaction. A user that is a contributor may also have the right to contribute data to an interaction, but not the right to assign roles or design an interaction model. A user that is a participant may only have the right to participate in the sessions. That is, they cannot contribute data as part of the buildup or design any aspect of the interaction. It will be appreciated from the present disclosure that the above are non-limiting examples of role definitions and rights, and that other roles and associated rights may be implemented as part of the embodiments herein.

When an interaction model is executed by the system, there may be different triggers for each module. Additionally, or alternatively, the module and its functional elements thereof may be available at a particular point or period of time relative to a session. For example, one module type may be trigged at the particular point or period of time as the execution of the interaction model progresses through the modeled sequence and/or time axis, while another module type may be triggered or available when the execution starts for a session and remain active throughout the session.

As previously described, there may be different types modules and the set of functional elements related to each may be provided for different purposes (e.g., creating, editing, and/or recording data in an interaction environment; searching and accessing archived data; sharing a presentation; providing a meta environment to generate and exchange information; etc.). Examples of modules and their functional elements are further described below. In general, at least three types of modules may be provided: micro modules, macro modules, and meta modules. There may also be device modules to support different types or classes of devices (e.g., smartboard, tablet, VR, headset, etc). Modules are further described below with reference to the present embodiments.

Embodiments of the present disclosure also provide an interaction system for enabling the exchange of information among a configuration of users in a common context, and for retaining all relevant information as part of a data buildup. As disclosed herein, a data buildup consistent with the present disclosure enables effective knowledge retention and the identification of how data was shared, gathered, and/or developed among users. Also, related data can be easily identified and retrieved from memory (e.g., notes or chat of users created while a presentation was given by another user). As disclosed herein, metadata may be stored as part of the buildup. The metadata can provide contextual information identifying how data was shared, gathered, and/or developed in the interaction. With the metadata, related data can be searched and retrieved from storage. This provides an advantage over extant systems which do not retain such context information and/or only have limited tools for searching and retrieving data.

In accordance with some embodiments, an interaction system is provided that includes, among other components, a data management server, a buildup server, and an application server. The data management server may be configured to form a persistence layer and manage data associated with a plurality of interaction models. The buildup server may be configured to store and provide the data associated with executed instances of each interaction model using the persistence layer. In some embodiments, the one or modules of the interaction model during their execution provide metadata that can be used to search and access data from the buildup server. Additionally or alternatively, the data management server may provide metadata for accessing data from the interaction.

As part of the system platform, the application server may be configured to execute instances of an interaction model for an interaction. As previously described, each interaction may include a plurality of sessions and each session may include a configuration of users that exchange information for a common context. The interaction model may be designed with one or more modules. Each module may provide a set of functional elements that are executable in one or more of the sessions of the interaction. The modules may be implemented as software applications or set of programmable instructions that are executable by the application server. Application Program Interfaces (APIs) and/or Software Development Kits (SDKs) may be provided to assist with the development of the modules and enable smooth execution within the system and by the application server. Further, the functional elements of each module may serve as rules to control and manage a user interaction at a particular point in time or during a time period of a session, thus aiding in providing a more structured environment for exchanging information where the execution of the interaction is carried out with more precision. At the same time, embodiments of the present disclosure result in systems and methods that are more flexible and facilitate communications, as the design of the interaction model is open and adjustable by the owner of administrator of the interaction and may be developed efficiently through a user interface, such as the example design interface disclosed herein.

The system may also include one or more databases configured to store data from the sessions. The data may include documents, presentations, notes, audio, pictures, video, multimedia files, and other content exchanged by users in the interaction. Consistent with embodiments of the present disclosure, data may be digitized and/or streamed. Further, through the system interfaces, users may generate, access, modify, and exchange information in any suitable form, including video, audio, and text. All data becomes part of the buildup for the interaction. In some embodiments, metadata is also stored as part of the buildup. Among other things, the metadata enables the identification of how data was shared, gathered, and/or developed among users in the interaction. Also, related data can be identified and retrieved from storage.

Referring now to FIGS. 1A-1D, example embodiments, consistent with the systems and methods of the present disclosure are described. In these examples, a configuration of users exchange information for a common context (e.g., a software development project, product research and development, a scientific study, a board meeting, etc.). Some of the users may be physically present in the same room or office, while others may participate via a remote connection. To participate, all user devices may be connected to the system platform using, for example, a secure network connection. In some embodiments, users have a meeting code and/or password to authenticate themselves and join their device to a session of the interaction flow. Additionally, or alternatively, users may identify and/or authenticate themselves by appropriate identification (e.g., a personal email, password, and/or ID).

FIG. 1A illustrates example devices for use in interaction systems and methods, according to embodiments of the present disclosure. The illustrated devices include a large display screen or board 110 and a tablet 120. As will be appreciated from this disclosure, these are non-limiting examples and other forms of devices may be utilized. By way of example, user devices may include a smart TV, a monitor, a touchscreen, a smartwatch or other wearable, a smartphone, a mobile phone, a computer, a laptop, a tablet or pad, smart glasses, a virtual reality (VR) or augmented reality (AR) headset, hand gesture devices, electronic white boards or smartboards, and so on. These devices may be used individually or in combination with the above or other devices, as needed. Further examples of user devices include headsets, ear buds, a mouse, stylus pens, and so on. Any of the above devices may be integrated (i.e., part of the same apparatus) or in wired or wireless communication with one another. To illustrate further, large display screen 110 and a tablet 120 may be in wireless communication with one another and also be communicatively combined with other devices, such as a keyboard, a mouse, a stylus pen, a touchscreen, smart glasses, a VR or AR headset, a motion sensor, an image capturing device, a microphone, and so on.

Consistent with the present disclosure, various interfaces may be presented on the devices. The interfaces may be implemented as graphical user interfaces (GUIs) and/or VR/AR interfaces that are displayed to users. The interfaces may be device independent (e.g., an independent application solution or app; a web browser or applet based solution; etc) and work with various forms of input/output data, such as audio, voice, text, and/or haptic feedback. Examples of interfaces include a designer interface, a management interface (such as a base or studio interface), a player interface, and a buildup interface. These interfaces are further described below with reference to the drawings.

With devices like those shown in FIG. 1A, and described above, users may participate in sessions of an interaction and generate and exchange data according to their roles and rights. By way of example, at least one user may serve as the owner or administrator of the interaction and be responsible for scheduling and executing the sessions in the interaction model. Other users may join as contributors and participants, observing and providing data according to their roles. Consistent with embodiments of the present disclosure, data from each session is automatically collected by the modules and stored, so that it becomes part of the data buildup and can be later searched and accessed.

Figure 1B:
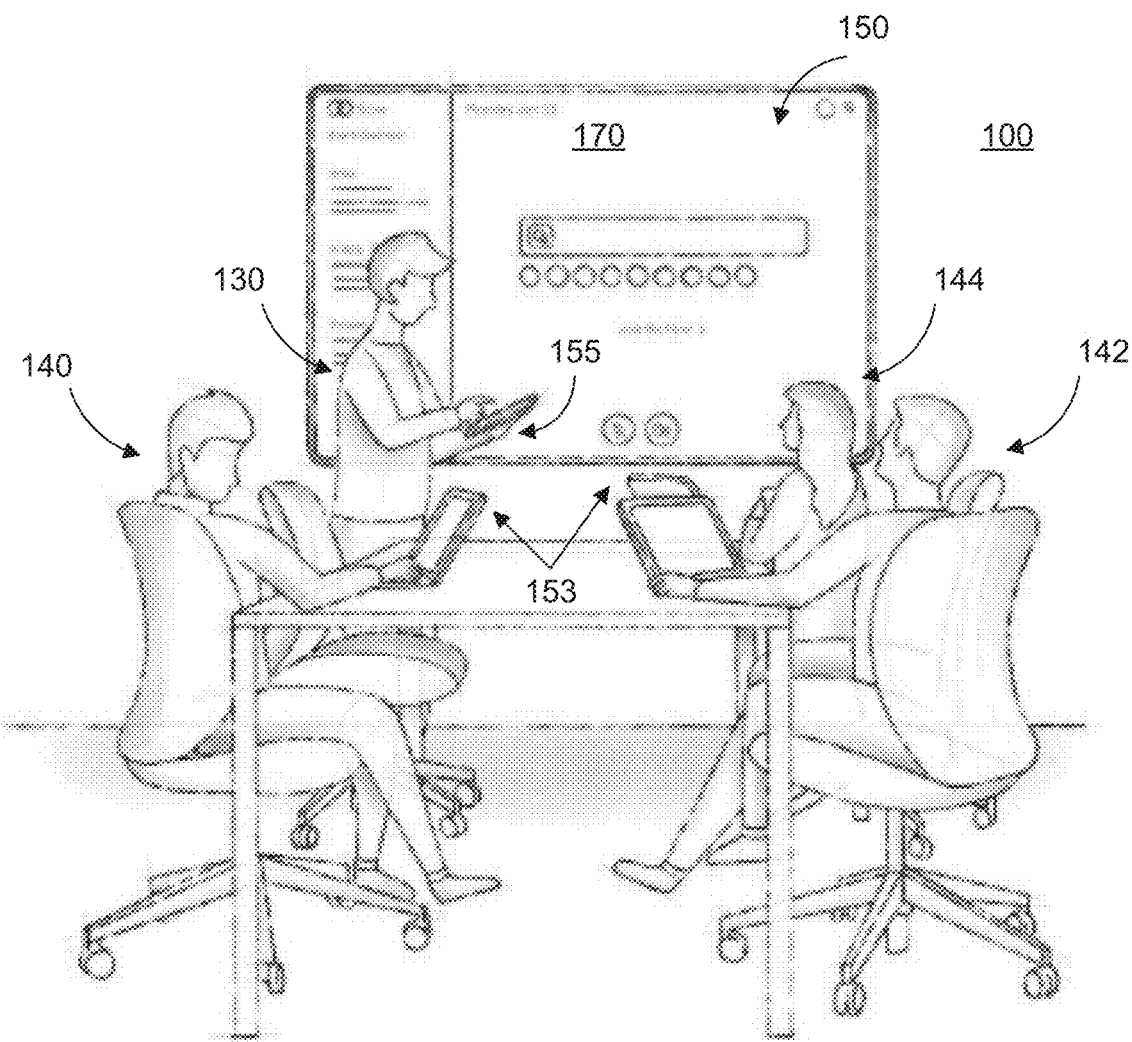
FIG. 1C illustrates another example player interface that provides an interaction environment for users to exchange information, according to embodiments of the present disclosure.
FIG. 1D illustrates an example interaction model including a configuration of users and a plurality of sessions, according to embodiments of the present disclosure.
FIG. 1E illustrates the graphical objects for the modules shown in FIG. 1D, according to embodiments of the present disclosure.

FIG. 11B illustrates an example player interface 170 that provides an interaction environment for users to exchange information, according to embodiments of the present disclosure. In FIG. 1B, the users for a session are assembled in a common office or room 100. As noted above, some of the users may be physically present together for a session, while others may participate via a remote connection. In some embodiments, a user 130 that serves as the owner or administrator of the interaction may set-up and initiate a session. This may be done through, for example, a player interface or a management interface (e.g., a base or studio interface). Additionally, or alternatively, an owner or administrator may initiate a session of an interaction model directly from a designer interface. Users 140, 142, 144, etc. may be contributors and participants in the session and join their devices using, for example, a secure network connection. In some embodiments, a meeting code and/or password may be entered to join individual devices (such as a laptop 153 or tablet 155) and also common or shared devices (such as a large display screen or board 150). For security, other forms of identification may be used, including randomly generated passcodes and multi-form identification.

FIG. 1B illustrates several example devices for a session, including a large display screen 150, laptops 153, and a tablet 155. Other devices such as those described above (e.g., computers, wearables, headsets, VR equipment, AR equipment, mouse, stylus pen, etc) may also be used in the session. The common context for the session may be a software development project, product research and development, a scientific study, or board meeting(s), for example. The interaction model executed by the system may define all aspects of the interaction, including the configuration of users and modules for each session, consistent with embodiments of the present disclosure. An example interaction model is described below with reference to FIG. 1D.

Referring again to FIG. 1B, an example player interface 170 is shown on the large display screen 150. The same or similar player interface may be presented on individual user devices. On the left-hand side of the interface 170, a meeting agenda is provided for the session. The agenda includes, for example, an "Intro", a "Video Presentation", a "Power Point", and a "Q&A Session." The agenda may be automatically generated from the interaction model, with one or more modules assigned to the session being used to create the agenda. For example, based on the sequence and names of the modules in the interaction model, the agenda may be generated and displayed in the player interface. The agenda may include graphical objects that are selectable by a user to access functional elements of the modules in the agenda (e.g., to play a video, give a presentation, takes notes, enable chat, etc.). The graphical object may be any combination of text, symbol(s), and/or graphic(s). As the session is executed, its progress relative to the agenda can be shown to the users via the player interface (e.g., by displaying a progress pointer/line and/or highlighting of the agenda items). Also, the progress of the session may trigger when certain modules become active or available (e.g., automatically or upon selection of the corresponding graphical object in the agenda). In the center of the interface 170 is the main view. In the example of FIG. 1B, the main view is shown with a text field and set of graphical objects. In the text field, an upcoming/scheduled session may be shown or a user can search for a particular interaction and/or session by name (e.g., Wayne Technologies Board Meeting, Week 1). In some embodiments, for security, a meeting ID and/or password may be entered into the text field. The graphical objects on the screen may provide various functions (e.g., "Log In", "Join," etc) to assist with joining a session and controlling different settings (e.g., switching on/off a microphone and a camera). The identity of all users in the session may also be displayed in the interface 170 using appropriate indicia (e.g., for each user, a bubble or circle including the user's photo and/or initials). In some embodiments, user information for a session is first displayed under the text field in the main view and then moved to the right margin after the session starts. The main view also may be updated. For example, during the session, the main view may be updated to play a video presentation, display Power Point slides, transmit the video of a user that is speaking or presenting, etc. An example of an updated main view for the interaction environment is shown in FIG. 1C.

During each session, different modules may be used to manage and control the session. As disclosed herein, each module and its functional elements may be available at a particular point or period of time relative to each session of the interaction. For example, some modules may be available throughout a session, while others may be triggered and executed at a particular point or available for a specified period, as defined in the interaction model. Also, consistent with the present disclosure, there may be different types of modules to assist interactions and the collection of data for the buildup. By way of example, at least three types of modules may be provided: micro modules, macro modules, and meta modules. In addition, other types of modules may be provided, such as device modules. Device modules may support different types or classes of devices used during each session. Each of these module types are further described below with reference to the present embodiments.

Figure 1C:
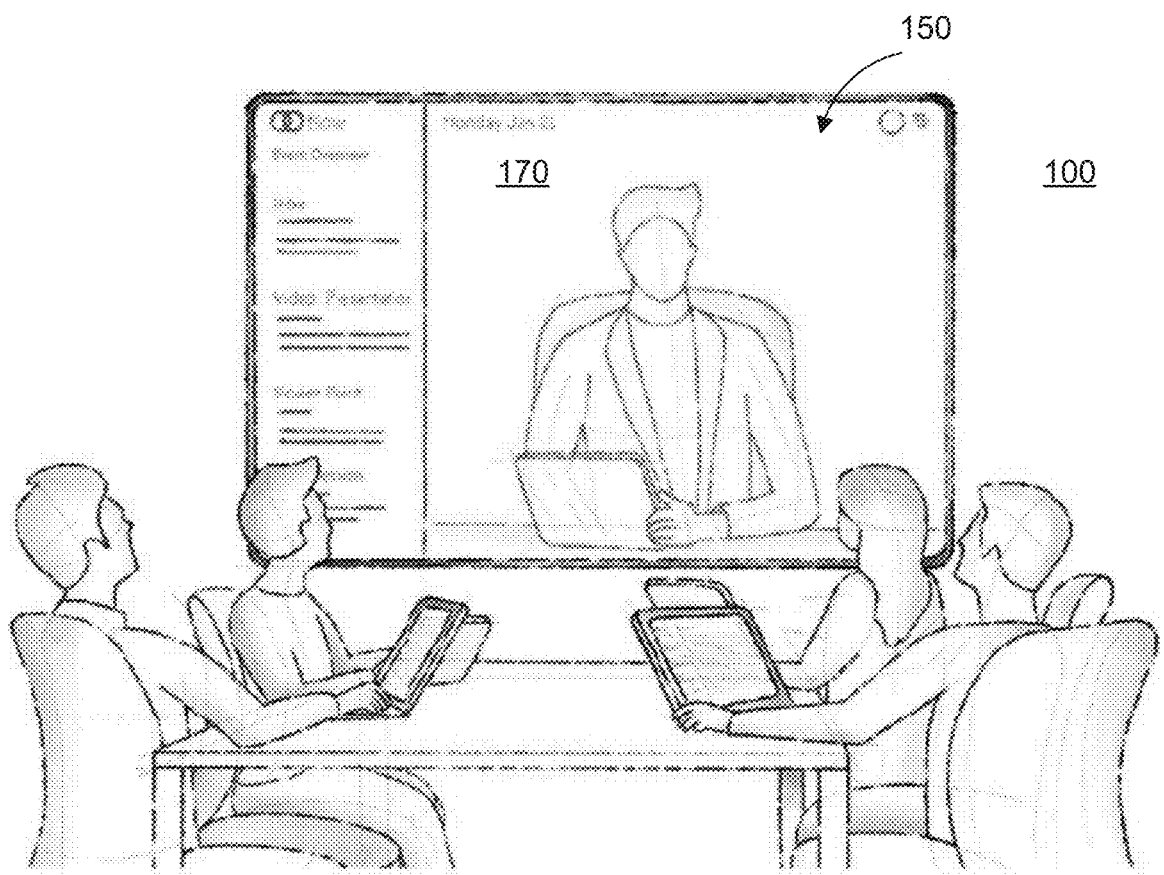

FIG. 1C illustrates another example player interface (updated relative to that shown in FIG. 1B) that provides an interaction environment for users to exchange information, according to embodiments of the present disclosure. In FIG. 1C, the main view of the player interface 170 on screen 150 is updated to present content during the session. This may be part of a video presentation or one of the users (such as the owner) commenting on the agenda or leading the meeting. At other points in the session, other users (such as a contributor) may present content (e.g., share a document, give a Power Point presentation, etc.) through their individual devices. The users that are participants in the session will listen/watch/observe and consume this information through their individual devices (such as a laptop or tablet) or a shared device (such as large screen or board 150 in a meeting room). All presentations and data from the session may be collected by the system and stored as part of the data buildup. Metadata is also generated by the modules and stored with the data buildup. Among other things, the metadata may enable the identification of how data was shared, gathered, and/or developed among users in the interaction. Also, related data can be identified and retrieved from storage.

Referring again to the board meeting example, the interaction model for this interaction may include a number of sessions. Each session may correspond to a scheduled board meeting. During each board meeting, the users in that session may, for example, review matters relevant to the company, record meeting minutes, etc. In some sessions, board members may take a vote on items or resolutions. Each session may have a similar configuration of users (e.g., the CEO/President and all board members), but there can be sessions where additional users join the configuration (e.g., outside legal counsel or a strategic advisor who is scheduled to give a presentation). The configuration of users for each session may be defined in the interaction model or provided as data to instantiate the interaction model for execution. Also, for each session, a set of modules may be selected and defined to assist with the interaction flow and exchange of information. Some modules may be especially adapted for board meeting interactions and provide functionality for recording meeting minutes, taking votes, analyzing sales data, etc. In general, modules may be developed with different sets of functional elements. Further, in some embodiments, the system may be designed as an open platform that is configured to execute modules (e.g., as software applications or sets of programmable instructions) from a wide variety of developers and sources. Application Program Interfaces (APIs) and/or Software Development Kits (SDKs) may be provided to assist with the development of these modules and enable smooth execution within the system.

As discussed above, the user configuration(s) and modules for each session are defined in the interaction model. Consistent with embodiments of the present disclosure, the interaction model may be generated through a designer interface (see, e.g., FIG. 11). If adjustments to the interaction model are needed after it is initially designed, the owner or administrator may make changes or updates through the designer interface. Additionally, or alternatively, the owner or administrator could make changes or updates to the interaction model through a management interface (see, e.g., FIGS. 9A and 9B). Example embodiments of these interfaces are further described below.

Figure 1D:
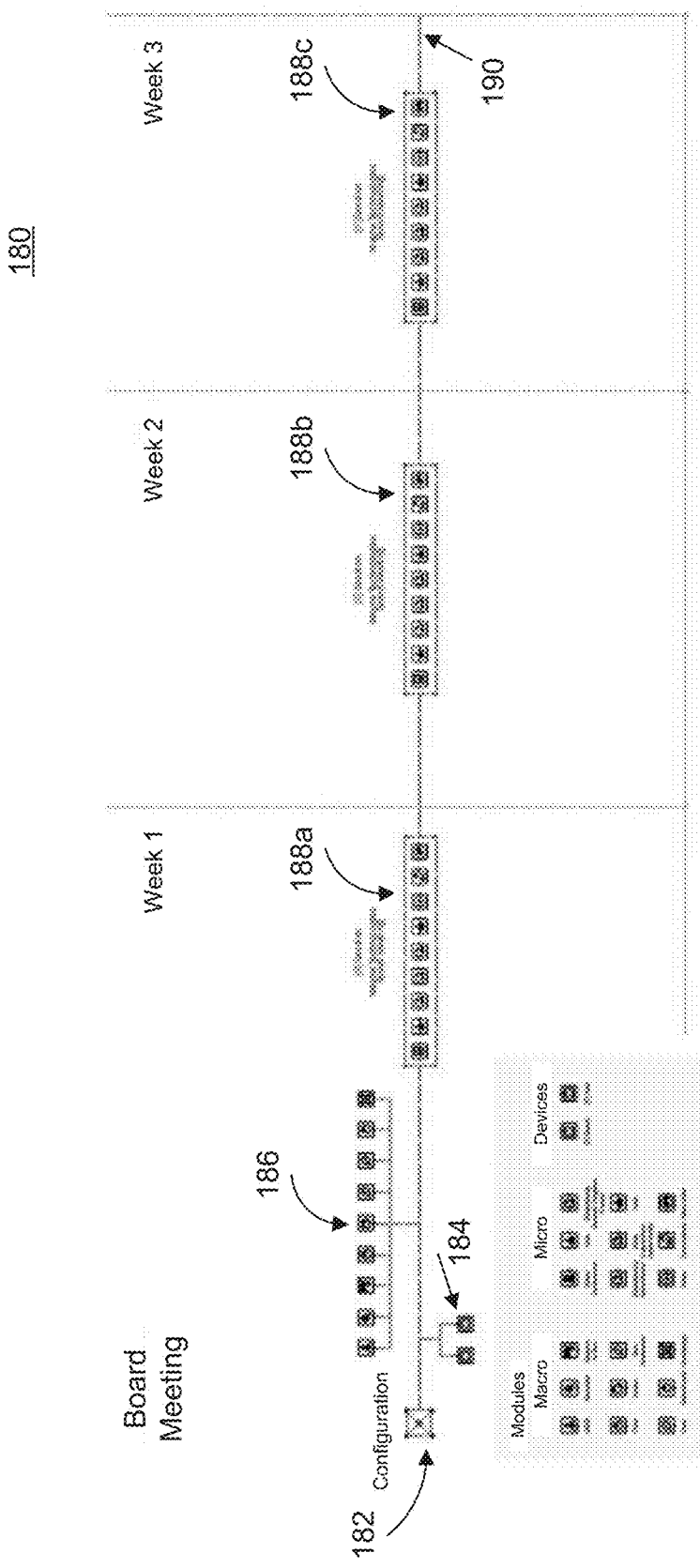
Figure 1E:
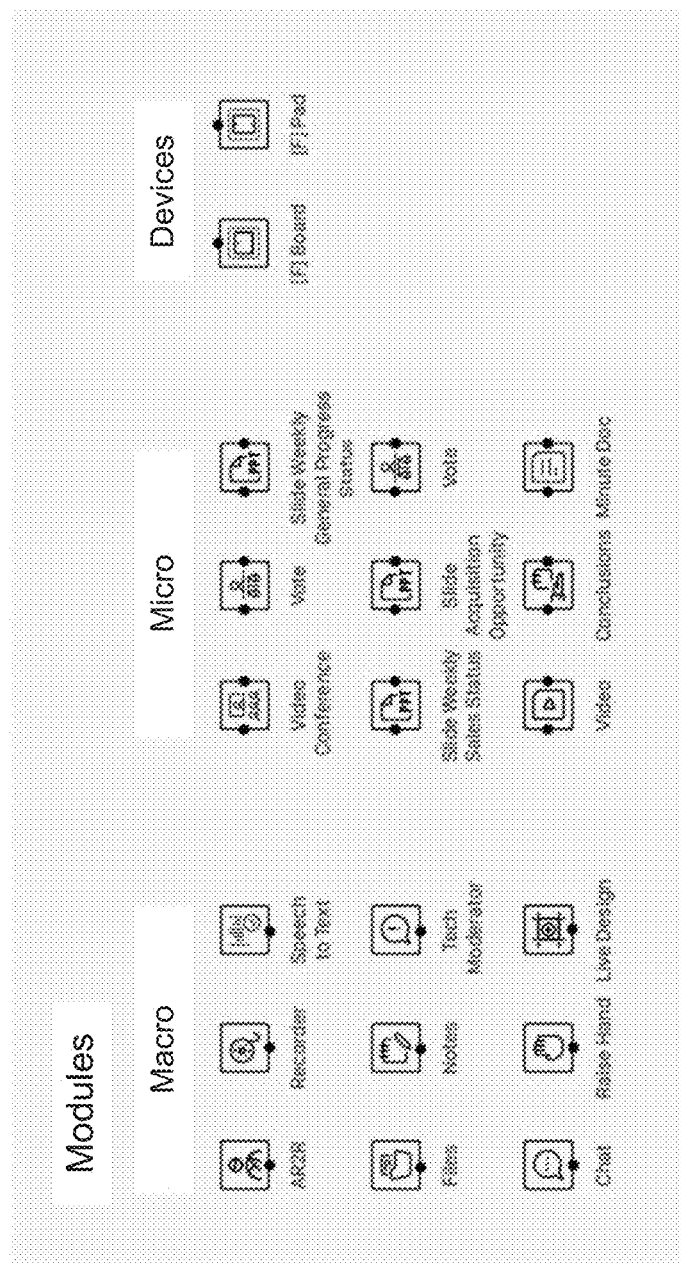

FIG. 1D illustrates an example interaction model 180, including a configuration of users and a plurality of sessions. The example of FIG. 1D includes a plurality of graphical objects (representing, among other things, an interaction object 182 and a plurality of modules 184, 186, 188a-188c) arranged in a sequence and/or relative to a time axis 190. In some embodiments, the arrangement of the objects is performed in a designer interface through a plurality of user inputs (e.g., drag and drop operations, text commands, voice commands, motion commands, etc). The example of FIG. 1D illustrates how the arrangement of graphical objects of interface model 180 may appear to a user in the designer interface when the user is designing the interaction model. The user can select modules from a stored library or repository of modules. A set of available modules is shown in the lower right portion of FIG. 1D. Also, FIG. 1E illustrates, in greater detail, the graphical objects for the modules shown in FIG. 1D, including the example text and graphics associated with each example module. An example designer interface, including its tools and functionalities, is further described below (see, e.g., FIG. 11).

In FIG. 1D, interaction model 180 includes an interaction object 182 and a plurality of modules 184, 186, 188a-188c. Interaction object 182 represents a configuration of users for the interaction. In this example, the same configuration of users is applied to each of the sessions (Weeks 1-3). As described above, the configuration of users may also vary between sessions. In such cases, more than one interaction object may be defined in the interaction model.

Modules 184, 186, 188a-188c represent different module types and sets of functional elements for the interaction. In this example, modules 184 are device modules, module 186 are macro modules, and modules 188a, 188b, 188c are micro modules. The arrangement of these modules in the modeled sequence and/or relative to time axis 190 define when these modules are available or triggered for execution. Consistent with some embodiments, modules arranged perpendicular or as an offshoot from time axis 190 (such as modules 184 and 186) are available for during the entire interaction (e.g., they are executed at the beginning of each session and can be used at any time during each session). If a module is arranged in-line or along time axis 190 (such as modules 188a, 188b, 188c), then it is available at a particular time or for a finite period (e.g., they are executed at a particular point or time period within a session). The sequence and names of the modules 188a, 188b, 188c within each session also can be used to generate a session agenda that includes the module names and their sequence defined in the interaction model. As disclosed herein, an agenda for each session can be displayed in a player interface to inform users of the planned session activity and to manage and guide that session while it is executed. In addition, the agenda may include graphical objects that are selectable by a user to implement or execute modules (e.g., a comment module, a video conference module, a presentation module, etc.). Other module types may be provided in interaction model 180, such as meta modules (not shown in FIG. 1D). As further disclosed herein, meta modules may provide a meta environment for exchanging information. Meta modules may be available throughout an interaction and each of its sessions.

Device modules 184 may support different types or classes of user devices. In the example of FIG. 1D, device modules 184 include a smartboard module and a pad module. As will be appreciated, other types of device modules may be provided, such as device modules for computers, laptops, tablets, VR devices, AR devices, headset devices, etc. These examples are non-limiting and it will be appreciated from this disclosure that other types of device modules may be implemented.

Macro modules 186 may provide sets of functional elements to support and control activity during each session. As noted, in some embodiments, macro modules are active throughout an interaction and can be used at any time during each session. Non-limiting examples of macro modules are provided in the following table:

TABLE 1

Examples of Macro Modules

| Macro Module | Description |
| --- | --- |
| Recording | Records sessions and allows them to be replayed |
| Speech To Text | Generates the minute of a session |
| Billable Flow | Allows owners and/or contributors to be paid during a transaction |
| Chat | Allows written conversations |
| Fan Shop | Displays articles and acquisition |
| Secured Session | Encrypts a session |
| Ticketing | Allows access only after a transaction |
| AR2R | Virtual assistant |
| Files | Allows files storage |
| Notes | Allows notes during a session |
| Tech Moderator | A tech assistant that can help users through chat or video |
| Raise Hand | Allows users to present and save a question |
| Live Design | Collaborative prototyping session |
| Add Module | Allows owners and/or contributors to add modules during an interaction |
| Camera | Camera that streams a video |
| Microphone | Microphone that streams audio |
| Branded Content | Allows third party entities to present branded content (e.g. sponsors) |
| Live Presence | Active presence indicator |
| Random | Matches users in random conferences |
| Match Making | Matches users in specific criteria conferences |
| Profile | Details about a user |
| Notifications | Pops in notifications on different use-cases |
| Account | Aloows the participants to creat a user account |
| Alert Ads | Pops in commercial ads |
| Schedule | Detailed view of a specific schedule |

Micro modules 188a, 188b, 188c also include functional elements to support and control activity during a session. However, they may be only available at a particular point or for a finite period of time. For example, consistent with their arrangement in a modeled sequence and/or on the time axis of an interaction model, they may be executed at a particular point or period of time within a session. Their arrangement in the sequence and/or on the time axis can also define a sequence of activation of the micro modules. Through the designer interface, the micro modules may be arranged in a sequence that is used to generate the agenda of a session. Other modules may also be displayed in the agenda, such as macro modules and device modules. Non-limiting examples of micro modules are provided in the following table:

TABLE 2

Examples of Micro Modules

| Micro Module | Description |
| --- | --- |
| Gallery | The speaker can switch between artworks and users will be able to see each artwork live |
| Doc Container | Document storage |
| Q&A | Allows users to raise questions in different ways (e.g. video or text) |
| On | Validator on different topics |
| Live Event | Live broadcast regarding an event |
| Signature Collector | Placeholder for users to collect their e-signature |
| Text Doc | Allows users to upload a document to view or edit |
| Video Conference | Video and audio live conference |
| Video Performance | Live concert or show broadcasted to all users |
| Voting | Allows users to express their vote on a specific topic |
| Presentation Doc | Allows users to upload a PPT or other presentation document to view or edit |
| Slide Image | Images presentation mode in a slideshow |
| Conclusions | Auto generated or written conclusions after a session |
| Minute Doc | Allows the users to download a minute in different document types |

TABLE 2-continued

Examples of Micro Modules

| Micro Module | Description |
| --- | --- |
| Merchandise | Products that can be sold |
| Comments | Comments regarding a specific module context |
| Blackboard | Interactive medium where users can draw |

As described above, other type of modules may be used to design an interaction model. For example, in some embodiments, meta modules may be provided. Meta modules may always be active. Also, they can be used to provide a meta environment for exchanging information during any of the sessions. In some embodiments, meta modules may provide a meta environment by enabling import, translation, and/or conversion of data from another platform or environment into the interaction system and vice versa. This can provide an immersive experience or environment for users when an interaction takes place. Non-limiting examples of meta modules include immersive modules and gaming modules. An immersive module may provide an immersive session where all channels (audio, video, text) for exchanging content/data are available. A gaming module may provide a session where a game is broadcasted to all users in the session. In addition, different module types may be combined in an interaction model. For example, an immersive module may be combined with a VR or AR device object module to provide users with VR or AR experience for accessing, obtaining, sharing, using, and/or further contributing to the data or context of one or more sessions. As a further example, a gamer can stream game session(s) by interfacing a gaming platform with the gaming module and record it and/or generate a short video using a micro module. Still further, the recording and/or short videos could be uploaded to a video sharing platform using modules consistent with the present disclosure.

Consistent with embodiments of the present disclosure, users in a configuration are assigned to roles. A role defines at least one of: functions, rights, permissions, access levels, capabilities, and responsibilities of a user (together referred to as "rights" herein). By way of example, a role may specify whether a user is only able to access information. Another role may give a user additional rights, such as the right to design and generate an interaction model, including the interaction objects and modules of the interaction model. Roles can also be used by modules to determine what to present or share with a user, as well as what functional elements should be applied to a user (such as applying a payment process, voting on an item, uploading or sharing a document or presentation, etc.).

In some embodiments, the role assigned to a user can change overtime with the progress of sessions for an interaction. For example, the role of a user may change in relation to their function, right, permission, access level, capability and/or responsibility within one session or between different sessions. In some embodiments, the role of a user may also change and be different among interaction models. For example, a user may be an owner of one interaction model, and a contributor or participant of another interaction model. Additionally, or alternatively, the role of a user may vary depending on which entity or group designs and manages a particular interaction and the corresponding interaction model(s). In cases where an interaction is designed and managed by an entity or group, that entity or group may assign one or more individuals to serve as owner(s), contributor(s), and participant(s). Still further, interactions may also be based on collaborations between users from different entities or groups (e.g., an open source or standards setting interaction). In such cases, the role assignments may include a plurality of designated owners to assist with the design and management of the interaction model(s). There may also be a plurality of contributors and participants for each session. In general, the systems and methods consistent with the present disclosure are flexible to support any number and combination of role assignments. Further examples are described below with reference to FIG. 14. In addition, embodiments of the present disclosure can implement interaction models for a wide variety of use cases.

In some embodiments, roles may be managed by a permission-based authentication component (e.g., implemented on or as part of an application server or orchestrator). For example, an Identity & Access Management (IAM) component may be configured to manage user roles. Each role may be defined as a collection of permissions that are available to a user assigned that role. Some permissions may grant a user access to a particular function or functional element. Embodiments for implementing systems with role management are further described below (see, e.g., FIGS. 8 and 13).

Figure 2:
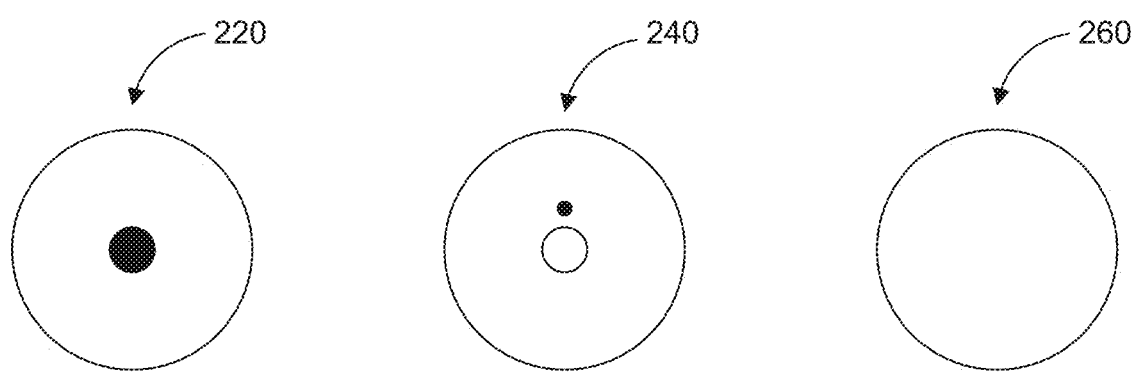
FIG. 2 illustrates example graphical objects representing different types of users and their associated roles, according to embodiments of the present disclosure.

Referring now to FIG. 2, an illustration is provided of example graphical objects representing different types of users and their associated roles, according to embodiments of the present disclosure. Roles may be assigned to users as part of a configuration defined in an interaction model or provided as data to instantiate an interaction model for execution. The example roles include an owner 220, a contributor 240, and a participant 260. The rights associated with each of these roles are described below.

Owner 220 may have the right to design and generate an interaction model. As described above, a designer interface may be used to design an interaction model, including an interface object (representing a user configuration) and arrangement of modules. Owner 220 may also have administrative rights, such as to assign roles to other users and update the interaction model as needed. Owner 220 can also schedule sessions, add/remove modules, and have other rights as the owner of an interaction.

Contributor 240 may have the right to contribute to a session. Such contribution may include, for example, providing a document, submitting comments or notes, sharing/giving a presentation, etc. In some embodiments, contributor may act as an assistant to owner 220 and have rights to help with the administration or management of an interaction model. Such rights may be designated by the owner. For example, contributor 240 may have the right to schedule a session or make updates to the interaction model.

Participant 260 represents a user who is assigned to a configuration for one or more sessions of an interaction. Participant 260 may have the right to join a session and view and consume information. Participant 260, however, may not have the right to contribute any content or information. Also, participant 260 may not have any administrative rights or ability to perform functions or responsibilities of a user that has the role of an owner or contributor. In some embodiments, the rights of participant 260 can be changed by, for example, owner 220 to allow participant 260 to contribute information during a session.

In some embodiments, one or more owner(s) may design interaction model(s) and users may join and experience an interaction based on the interaction model(s). Further, in some embodiments, one or more owner(s) and/or one or more contributor(s) may manage the interaction model(s) to facilitate, or control, the interaction(s). As described above, there may be any number and combination of role assignments for an interaction and the sessions thereof.

According to some embodiments, all owner(s) 220, contributor(s) 240, and participant(s) 260 of an interaction model may be capable of providing information or data during the session(s), thereby forming and defining the context of interaction(s) taking place in the interaction model system.

In some embodiments, owner 220 is capable of performing all functions of a contributor 240 and/or a participant 260. Further, in some embodiments, contributor 240 is capable of performing all functions of a participant 260, but only some of the functions of owner 220. Additionally, or alternatively, owner 220 is capable of performing all functions required for designing an interaction model, but is not capable of performing at least some functions of a contributor 240 and/or a participant 260. Thus, the rights of users may vary by role and some roles may include rights of other roles.

Consistent with embodiments of the present disclosure, the ability to access and use an interface may be controlled by the role assigned to a user. In some embodiments, each role may have an access right (or use permission) to one or more interfaces of the system. For example, owner 220 may have the right to access and use a designer interface and a management interface, as well as other interfaces such a player interface and a buildup interface. Contributor 240 may have the right to access and use a management interface, a player interface, and a buildup interface. Participant 260 may access and use only a player interface and a buildup interface. In some embodiments, owner 220 may be able to change or update the access rights to interfaces by users. In some embodiments, interface access rights may be updated (granted or revoked) based on input from owner 220 through for example a designer interface and/or a management interface.

According to some embodiments, interaction model(s) establish (define, plan, and schedule) interactions among users specific to a common context. Each interaction model defines a configuration of users that exchange information in one or more sessions. The interactions can involve any type of data or informational exchange, including documents, presentations, notes, audio, pictures, video, multimedia files, and/or other content. Further, consistent with embodiments of the present disclosure, data may be digitized and/or streamed.

Figure 3:
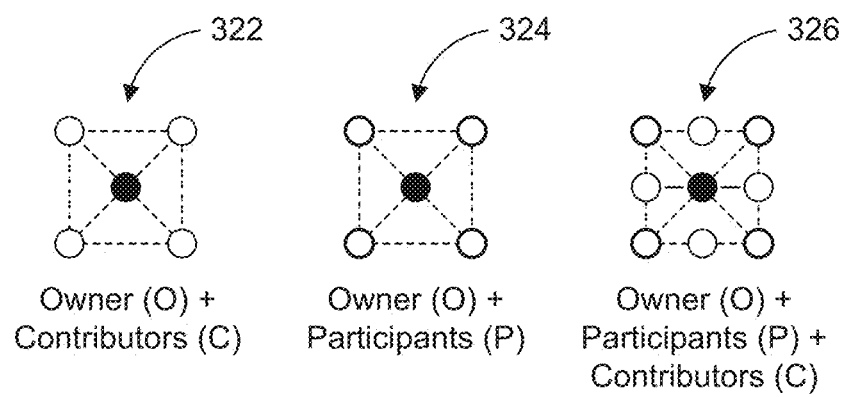
FIG. 3 is an illustration of example types of interaction objects, according to embodiments of present disclosure.

Consistent with embodiments of the present disclosure, interaction objects may be provided to represent the configuration of users for one or more sessions. FIG. 3 illustrates example types of interaction objects, according to embodiments of present disclosure. These examples are non-limiting and it will be appreciated from this disclosure that other types of interaction objects may be provided, including their graphical representations for generating an interaction model.

In FIG. 3, three non-limiting examples 322, 324, 326 of interaction objects are illustrated. These interaction objects represent three different configurations of users for one or more sessions of an interaction. Graphically, they represent which types of users are in the configuration and can exchange information. Although additional information related to each configuration (e.g., the specific identity and number of users in the configuration, as well as each of their respective roles) is provided in the data for the interaction model, these interaction objects assist an owner or administrator to visualize the configuration and design an interaction model in the designer interface.

In the examples of FIG. 3, a first type of graphical representation 322 indicates a configuration among one or more owner(s) and contributor(s). A second type 324 represents a configuration of users includes one or more owner(s) and participant(s). Further, a third type 326 represents a configuration of users including one or more owner(s), contributor(s), and participant(s). As will be appreciated from the present disclosure, objects 322, 324, 326 are non-limiting examples and other types of interaction objects may be provided. For example, any of the illustrated types of objects 322, 324, 326 could be modified (e.g., outlined with a box) to indicate the inclusion of an additional type of user in the configuration, such as an administrator. Further, other examples of interaction objects include graphical representations of user configurations where the exchange of information is between one or more administrators(s), contributor(s), and/or participant(s) (i.e., owner(s) are not in the configuration).

Figure 4:
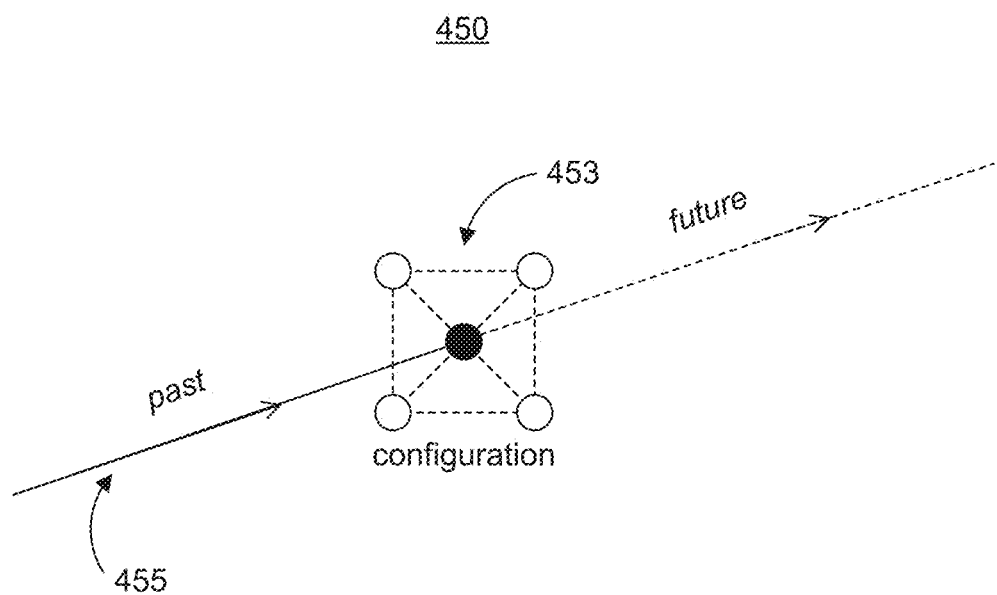
FIG. 4 is an illustration of an example interaction model including an interaction object shown relative to a time axis, according to embodiments of the present disclosure.

After an interaction model is generated, it may be executed by a computer-implemented system consistent with the present disclosure. As disclosed herein, an interaction model may be designed with one or more sessions. As each session is initiated and then subsequently completed, the interaction object(s) and exchange(s) of information between users progress relative to the time axis of the interaction model. This provides a structured process for the accumulation of knowledge and the data buildup, as well as completing the goals or objectives of the common context. FIG. 4 provides an illustration of an example interaction model 450 including an interaction object 453 that is shown relative to its progression to a time axis 455, according to embodiments of the present disclosure. It will be appreciated that this drawing is a generalized representation of an interaction model that is useful for purposes of presenting concepts related to the present disclosure. Further examples are provided herein.

In FIG. 4, example interaction model 450 is shown with an interaction object 453. The interaction object 453 is similar to object 322 in that it is a type of interaction object representing a configuration of users including one or more owner(s) and contributor(s). Interaction object 453 may be applied to all sessions of interaction model 450 or it may be designed for only certain sessions with other interaction object(s) being arranged for the remaining sessions defined in interaction model 450.

Consistent with embodiments of the present disclosure, an interaction model defines an arrangement of one or more interaction objects and one or more modules relative to a time axis. In FIG. 4, interaction object 453 represents the configuration of users applicable to a particular point or period in time (e.g., a point/position or period in time when a particular session of the interaction is taking place at present, took place in the past or is scheduled to take place in the future). As noted above, as each session is initiated and then subsequently completed, the interaction object(s) and exchange(s) of information between users progress relative to the time axis of the interaction model. Also, one or more module(s) (not shown in FIG. 4) are available to assist the flow and activity in each session. There will be session(s) in the past that have been completed, and there will be future session(s) to be executed before the interaction is completed. Thus, interaction model 450 is defined related to time and time axis 455 is central to the design and arrangement of the session(s) and the objects and modules related thereto. All past, present, and future session(s) are defined in the interaction model, along with the configuration of users and modules for each session. This provides a structured model and process for the exchange of information and the accumulation of knowledge (i.e., the data buildup), as well as completing the goals or objectives of the common context. It also promotes work collaboration and efficiency with a process that is clear and smooth to all participants.

Along with the data stored from each session, metadata may be stored as part of the data buildup. In some embodiments, the metadata provides contextual information for the data related to the interaction. In some embodiments, the metadata may comprise one or more of a description, a title, a topic, a commentary, and/or a guideline for the interaction or a session of the interaction (e.g., a session discussion, voting, a presentation, and so on). This metadata may provide contextual information for that taking place at present, that which took place in the past, and/or that which is going to take place in the future. Thus, the metadata can add transparency and structure to users, and also contribute to the benefits of the interaction system.

As disclosed herein, one or more modules may be defined in an interaction model. There may be different types of modules and each module may be implemented as a software application or set of programmable instructions executable by the system. The modules may provide rules or functional elements to control and manage a user interaction at a particular point in time or during a time period of one or more sessions. Examples of modules are described above, including with respect to Tables 1 and 2. The modules may also be configured to generate and provide metadata for each session, such as the metadata described above.

In some embodiments, a core set of modules may be provided with the system and available for selection via a designer interface to generate an interaction model. Modules from third party developers may also be added and used to generate an interaction model, using the systems and methods of the present disclosure. Additionally, there may be standardized interaction models that are available for selection via a designer interface for updating or instantiation (e.g., by changing one or more of the standardized sessions, interface objects, and/or modules) to generate a final interaction model for a specific context or use case.

In some embodiments, the modules may set conditions, rules, and/or instructions to enable at least one of provision, collection, storage, access, obtaining, generating, sharing, use, and/or exchange of data during session(s) of an interaction. The session(s) may be performed using interfaces (e.g., management and/or player interfaces), which are capable of being plugged into the system. In some embodiments, there are different types of modules, each module type being available for use, applicable and/or implementable when an instance of the interaction model is executed.

Figure 5:
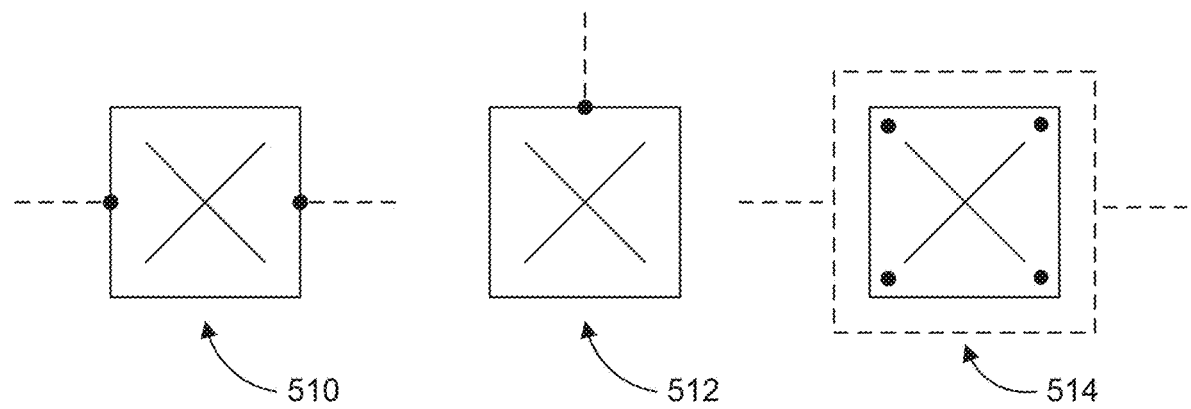
FIG. 5 illustrates example graphical objects representing different types of modules, according to embodiments of the present disclosure.
Figure 6:
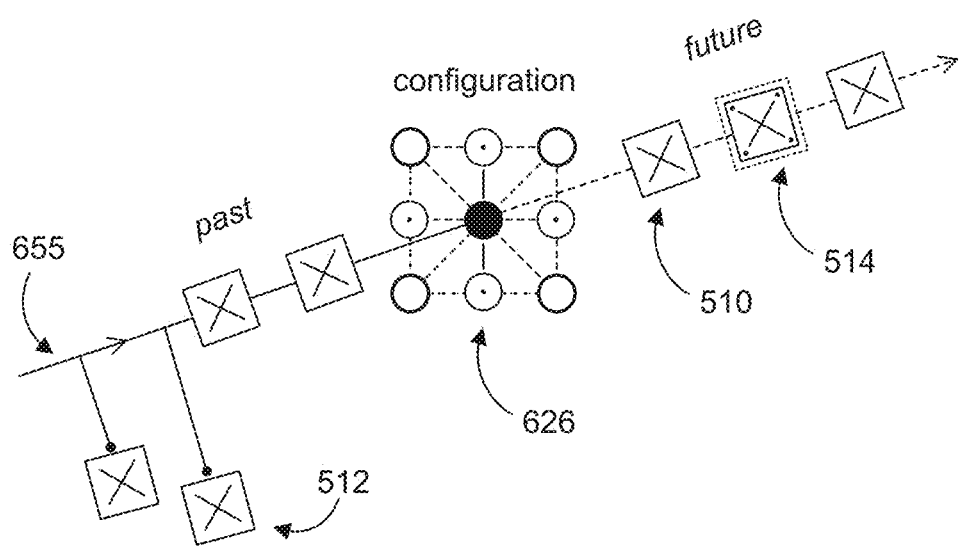
FIG. 6 is an illustration of an example interaction model including an interaction object and different types of modules, according to embodiments of the present disclosure.

Reference is now made to FIGS. 5 and 6 of the present disclosure. Among these drawings, FIG. 5 illustrates example graphical objects representing different types of modules, according to embodiments of the present disclosure. Further, FIG. 6 is an illustration of an example interaction model including an interaction object and different types of modules, according to embodiments of the present disclosure.

In FIG. 5, three different types of modules 510, 512, 514 are shown. The graphical objects for these modules 510, 512, 514, as illustrated in FIG. 5, represent how they may appear in a designer interface for generating an interaction model. However, as will be appreciated, the "X" in each illustrated object is a placeholder and it may be substituted with text, symbol(s) and/or graphic(s) to indicate the specific function(s) performed by a corresponding module (e.g., Recorder, Speech To Text, Notes, Video Conference, Vote, Doc Container, etc.). FIGS. 1D and 1E illustrates graphical objects for modules with text, symbol(s) and/or graphic(s) for each example module. FIG. 6 and several of the other figures in this disclosure show the graphical objects for the modules with the generic "X" placeholder.

Referring again to FIG. 5, the example types of modules include: a first type 510 corresponding to a micro module; a second type 512 corresponding to a macro module; and a third type 514 corresponding to a meta module. Examples of each of these types of modules is described above (see, e.g., Tables 1 and 2 and the surrounding paragraphs). As will be appreciated, there may be other types of modules, such as device modules. Similar to macro modules, device modules may be arranged perpendicular or as offshoots to a time axis.

Each of the module types 510, 512, 514 includes sets of functional elements. As discussed, these functional elements may set conditions, rules, and/or instructions to enable at least one of provision, collection, storage, access, obtaining, generating, sharing, use, and exchange of data during session(s) of an interaction. Further, the modules may generate and provide the metadata for each session, such as the metadata disclosed herein. The connected dashed lines around the periphery of each module type (see FIG. 5) indicate how the module would be arranged relative a time axis of an interaction model. FIG. 6 provides a further illustration of the arrangement of module types 510, 512, 514 relative to a time axis 655 of an example interaction model 650. Consistent with some embodiments, modules arranged perpendicular or as an offshoot from the time axis (such as a device module (not shown) or module type 512, a macro module) are available during the entire interaction (e.g., they are executed at the beginning of each session and can be used at any time during each session). Modules that are arranged in-line or along the time axis (such as module type 510, a micro module) are available at a particular time or for a finite period (e.g., they are executed at a particular time or period within a session). Other modules may be overlaid on top of the time axis (such as module type 514, a meta module) and available throughout an interaction and each of its sessions.

Referring again to FIG. 6, interaction model 650 includes a number of modules 510, 512, 514 arranged relative to time axis 655. An interaction object 626 representing a configuration of users is also shown in FIG. 6. The first type 510 of modules (i.e., micro modules) include a set of functional elements which are available for use at a particular point or period of time, consistent with their arrangement relative to time axis 655. The second type 512 of modules (i.e., macro modules) include a set of functional elements which are available for use during the entirety of the session(s) of the interaction. The third type 514 of module (i.e., a meta module) includes a set of functional elements for providing a meta environment for the interaction. In some embodiments, meta modules may be available for use at any time during the interaction.

By way of example, micro modules 510 may be used to control data exchanges that occur at specific points in time and in a sequence defined in the interaction model and shown in a player interface by the agenda of each session. As disclosed herein, the agenda may be generated from the one or more modules defined for the session. For example, using the sequence and names of the micro modules for a session in the interaction model, the agenda may be generated and displayed in the player interface. The agenda may include graphical objects that are selectable by a user to access functional elements of the modules in the agenda for that session (e.g., to play a video, give a presentation, takes notes, enable chat, etc.). The graphical object may be any combination of text, symbol(s), and/or graphic(s). Further, as the session is executed, its progress relative to the agenda can be shown to the users via the player interface (e.g., by displaying a progress pointer/line and/or highlighting of the agenda items). Also, the progress of the session may trigger when certain modules become active or available (e.g., automatically or upon selection of the corresponding graphical object in the agenda). Other modules, such as macro modules, may be represented by graphical objects in or near the agenda in the player interface. By way of example, macro modules 512 may be used to control an action (e.g., Notes, Speech to Text, AR2R, etc.) that can be taken at any time during the session of an interaction. Meta modules may be defined as part of the interaction mode to configure a meta environment for exchanging data. For example, meta module 514 may be available throughout the entire interaction and used to enable the system to communicate with, and convert data to and from a format compatible with, an external platform or environment, such as a specific data storage or cloud-based service, a VR system, a AR system, a gaming system, and so on.

Further features and aspects may be implemented with the player interface and displayed agenda during the execution of a session. For example, a user may be permitted to move a progress pointer or line displayed in the player interface to navigate or adjust the flow of a session. For instance, through their user device, a user (such as the owner) can provide input to drag or move a progress pointer or line to any portion or stage in the agenda. By way of example, an owner may move the progress pointer or line to a previous micro module in the agenda and thereby cause the module to reexecute or make its associated functional elements available again within a session. The owner can also move the progress pointer or line forward or past a micro module and thereby advance the session relative to the agenda. This could be helpful where, for example, a particular item or module in the agenda was performed earlier or it needs to be postponed to a later time or skipped entirely because it is no longer needed. With this ability to navigate back and forth in the agenda, more control can be provided during the execution of a session and thereby improve efficiency and collaboration.

In some embodiments, modules 510, 512, 514 may be configured so that micro modules 510 and meta module 514 are triggered (e.g. made available, instantiated and/or executed) at a particular point or period of time, and macro modules 512 are always triggered (i.e., while the interaction model is being executed and hence is active and available for use). Device modules (not shown) may also be executed like macro modules 512. Further, in some embodiments, the triggering of a module may be implemented by setting a condition in the module to true or active.

Figure 7:
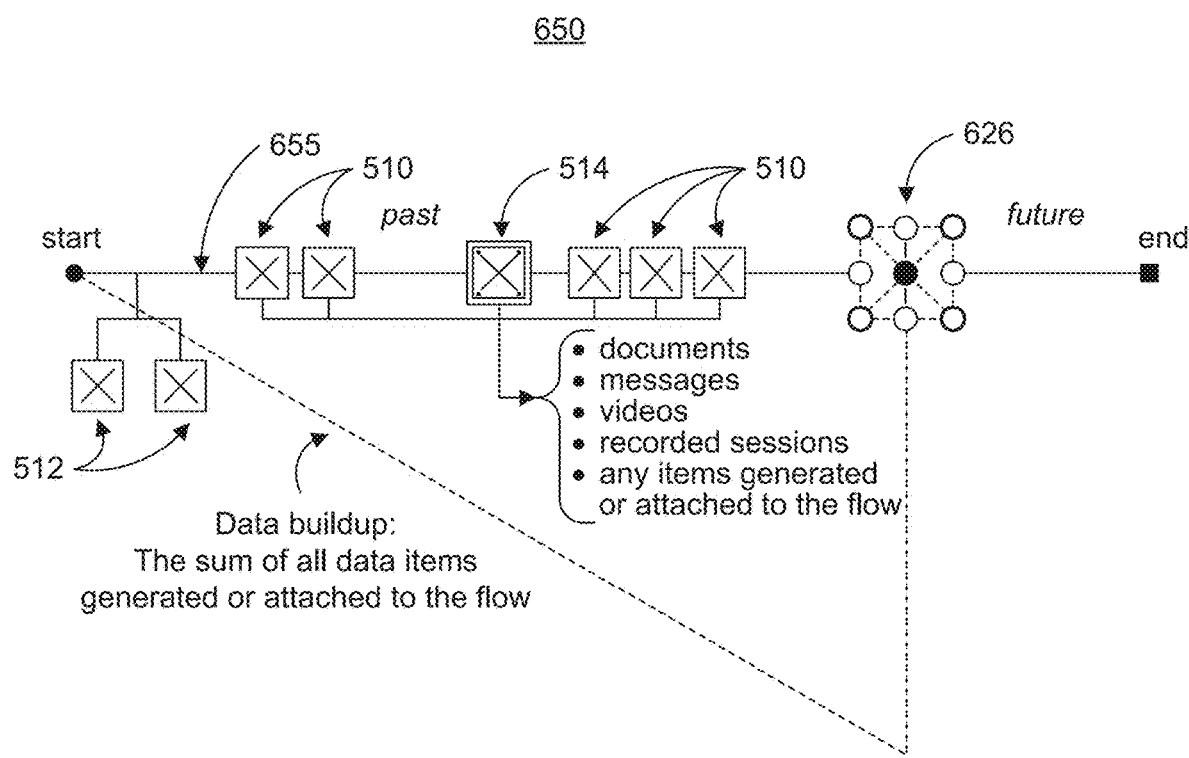
FIG. 7 is an illustration of a data buildup for an interaction model including an interaction object and different types of modules, according to embodiments of the present disclosure.

FIG. 7 is an illustration of a data buildup for an interaction model 650 including an interaction object 626 and different types of modules 510, 512, 514 arranged relative to time axis 655, according to embodiments of the present disclosure. As disclosed herein, a data buildup is the accumulation of all data items (e.g., documents, messages, audio, videos, text, multimedia files, recorded sessions, etc.) generated, accessed, shared, recorded, or otherwise related to the session(s) of an interaction. The data buildup accumulates data over time and increases from the start to the end of the interaction. The data buildup is stored in a database and can be subsequently accessed by users in relation to the same transaction or subsequent transactions. In some embodiments, the data buildup is stored in a relational database system. With the data buildup stored in a relational database, every piece of generated data and associated information can be viewed in relation to each other.

According to some embodiments, modules may store data to the data buildup. Modules may also include functional elements to allow users to access data in the data buildup. By way of example, a Files macro module can render a preview of documents it has saved to the buildup. As further examples, a Slide micro module can render a preview of a presentation, and a Chat macro module can render a chat history. Still further, a Voting micro module can render a bar chart showing the results of a vote. In some embodiments, the data can be stored with timestamps or marked related to the time axis of the interaction. This can an allow a user to navigate and view, for example, portions of video or audio streams saved by micro modules. Data retrieval can also be done relative to a file or document. For instance, a user may want to hear what a presented said during the first 5 slides of a presentation. As will be appreciated, these are non-limiting examples and other data storage and retrieval features may be implemented.

In some embodiments, database(s) or storage system(s) for maintaining the data buildup may be networked and/or cloud-based systems. For example, depending on the organization and required network security, a public or private cloud system may be utilized. Further, each database or storage system may be implemented as a relational database, such as a SQL or CQL database. As a further example, each database or storage system may support managed Kubernetes clusters for containers.

Consistent with embodiments of the present disclosure, metadata is also stored in or with relation to the data buildup to provide contextual information for the stored data and enable the retrieval of the data from the buildup, as well as related data (e.g., other documents, messages, audio, video, text, etc.). The metadata may provide, for example, information related to how, when, and/or why the stored data was created, shared, and/or stored, and by whom. By way of further example, for each session of an interaction, the metadata may include immersive information identifying the title and/or agenda for the session, which users were logged in, which modules were activated and used, how the modules were configured, which data channels were open, and so on. As still further examples, the metadata may include information to assist with identifying related data, such as what notes or comments were made when a presentation was given, what answer was given by one user when a question was asked by another user, which user took the meeting minutes, and so on. In some embodiments, metadata may be marked (e.g., using timestamps) relative to time, a modeled sequence, and/or the time axis of the interaction. The metadata may also include information on where the data from the interaction is stored, as well as the storage locations of related data.

In some embodiments, data from the sessions (e.g., documents, messages, presentations, media, etc.) may be stored in containers which are separate from the metadata. The metadata may include pointers to the storage locations of the data, such as pointers to the IDs of the blobs (binary data) in the database. The data might get moved to cold storage or back to hot storage at any point. The metadata can help keep track of the data at all times. It will be appreciated that these are non-limiting examples and other database implementations are possible, consistent with embodiments of the present disclosure.

To facilitate the searching and retrieval of data from the buildup, a buildup interface may be provided. The buildup interface may be implemented as a GUI and rendered on or with user devices (e.g., board, laptop, pad, etc.; see FIGS. 1A-1C). The buildup interface may have tools and capabilities to allow users to search and view data from the database, as well as the relationship of that data to sessions and/or interactions. By way of non-limiting examples, the following features may be provided by the buildup interface: (i) a global view indicating how all interactions generated the data; (ii) an interaction view indicating how a specific interaction generated data; (iii) a session view from a specific interaction indicating how a specific session generated data; (iv) the ability to search for specific data via parameters (e.g., users with their roles and the module metadata, both presented in a time dependency) from: the global view, the flow view, and/or the session view; and (v) the ability to share the resultant data with others (e.g., users inside or outside an organization or other entity).

Figure 19A:
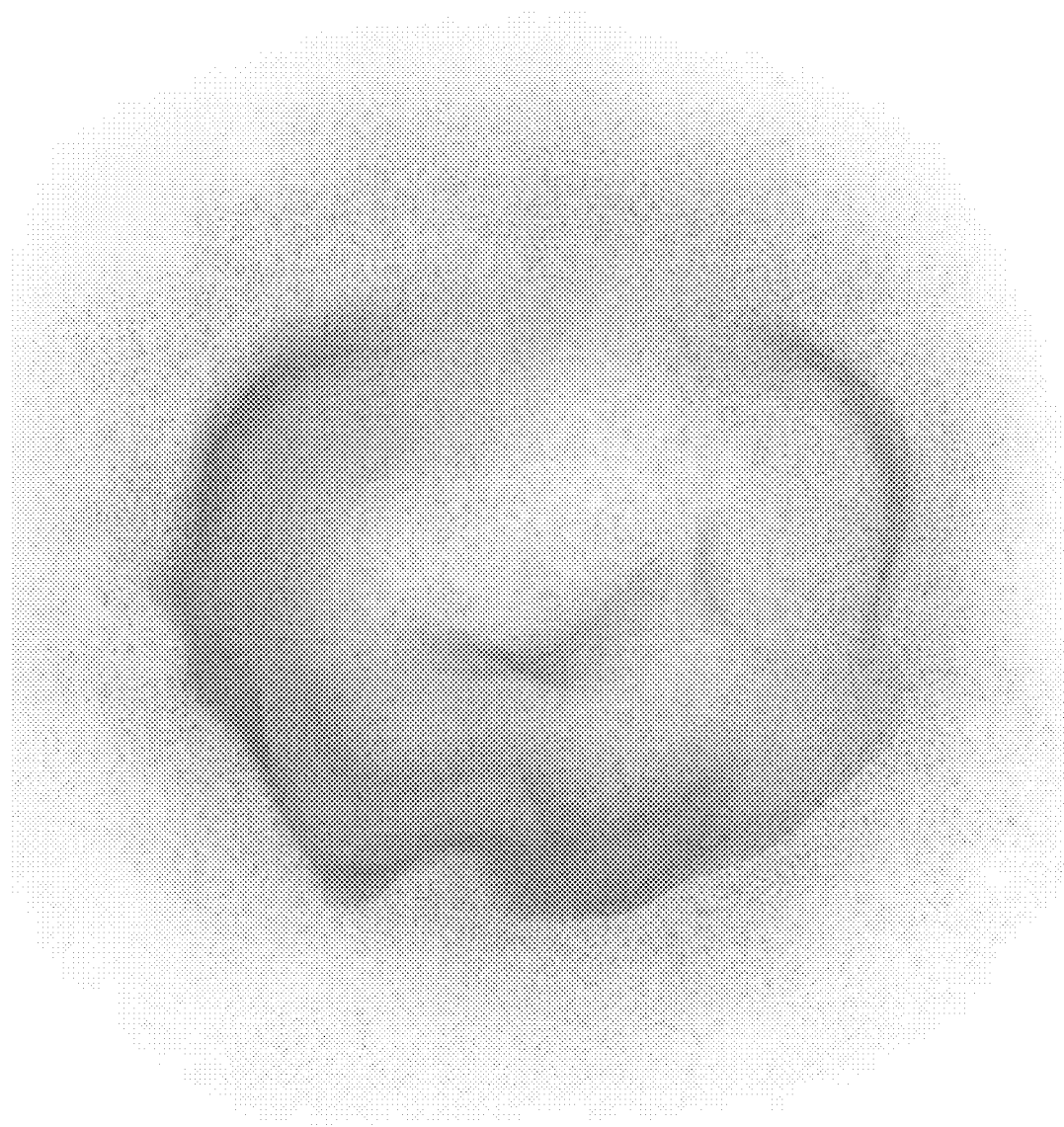
FIGS. 19A-19C illustrate examples of a buildup interface, according to embodiments of the present disclosure.
Figure 19B:
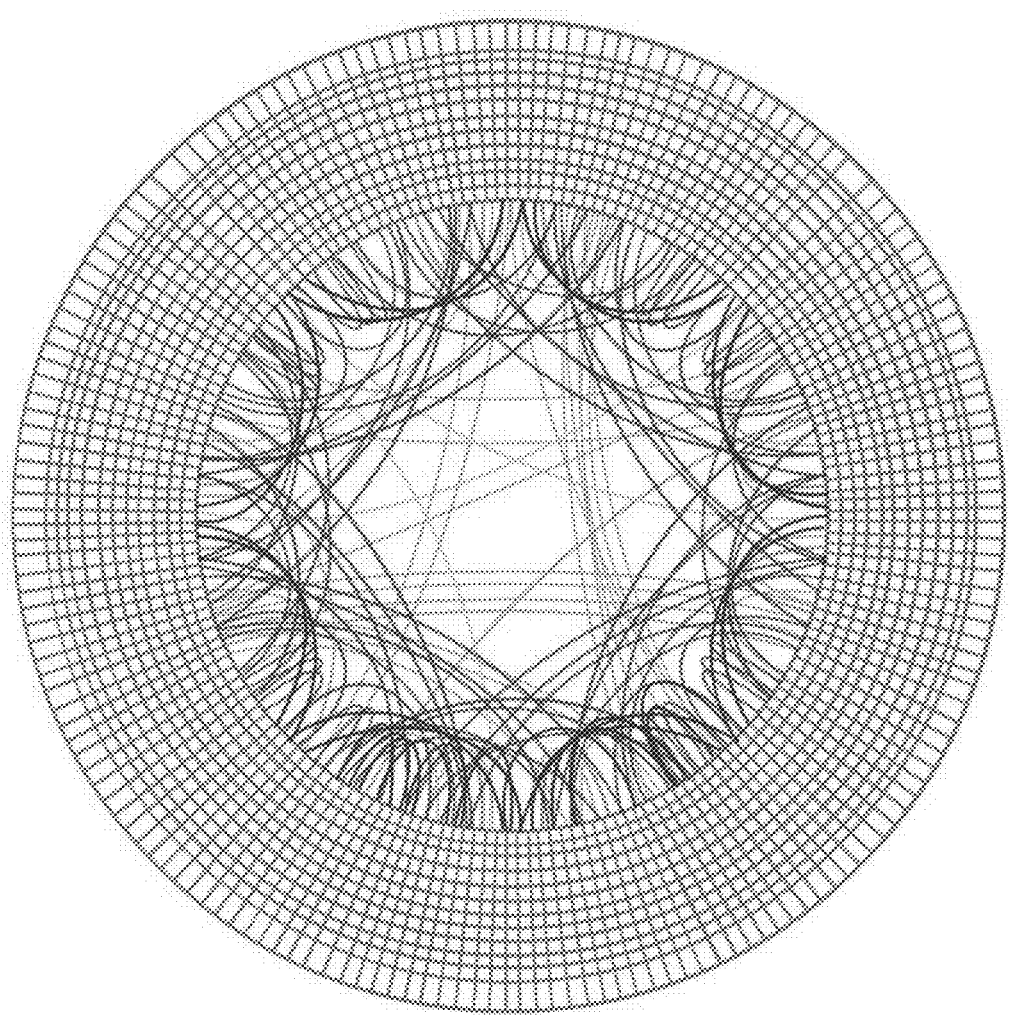
Figure 19C:
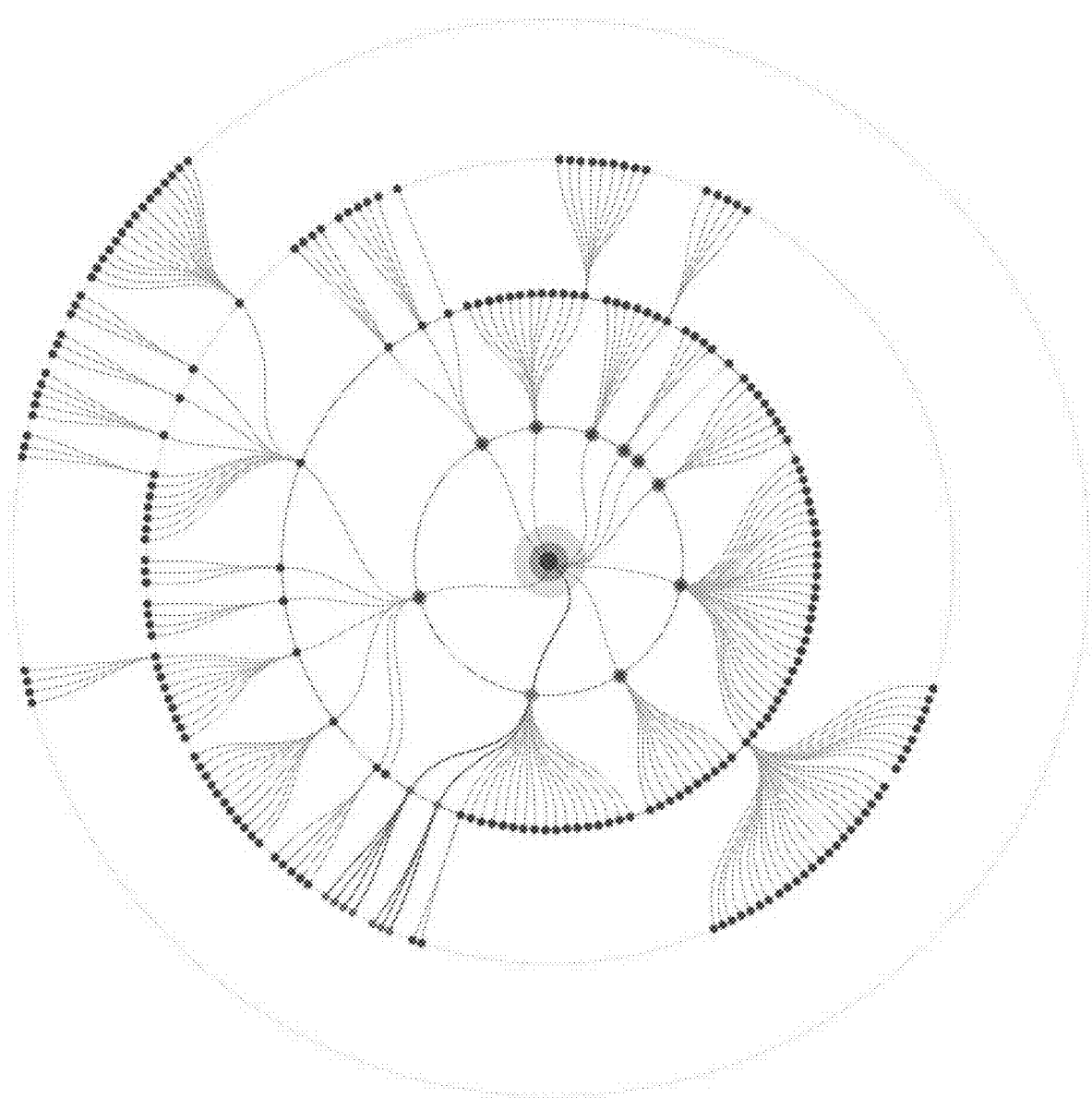

Examples of a buildup interface are provided in FIGS. 19A-19C. Included in these drawings are examples of a global view (FIG. 19A), an interface view (FIG. 19B), and a session view (FIG. 19C) for a buildup interface.

In some embodiments, the buildup interface may include a reporting feature or tool. The reporting tool may allow a user to, among other things, generate a history of conversations, notes, comments, etc. of a specific user or a group of users. Historical data and trends can also be analyzed and reported. By way of example, the buildup interface and reporting tool can help organizations and other entities to optimize their communication or interaction processes by looking at trends based on the logged activities of users over specific time periods.

As disclosed herein, the present disclosure relates to computer-implemented systems and methods for modeling and controlling context-driven user interactions. Systems and methods consistent with embodiments of the present disclosure may be configured to execute interaction models with one or more modules that provide rules or functional elements to control and manage user interactions. The modules may also generate the metadata for the data, such as the example metadata disclosed herein. Also disclosed herein are interfaces to enable users to receive and provide information. These interfaces may be implemented as GUIs and/or VR/AR interfaces and may be device independent. Examples of interfaces, consistent with the present disclosure, include a designer interface, a management interface (such as a base or studio interface), a player interface, and a buildup interface.

Figure 8:
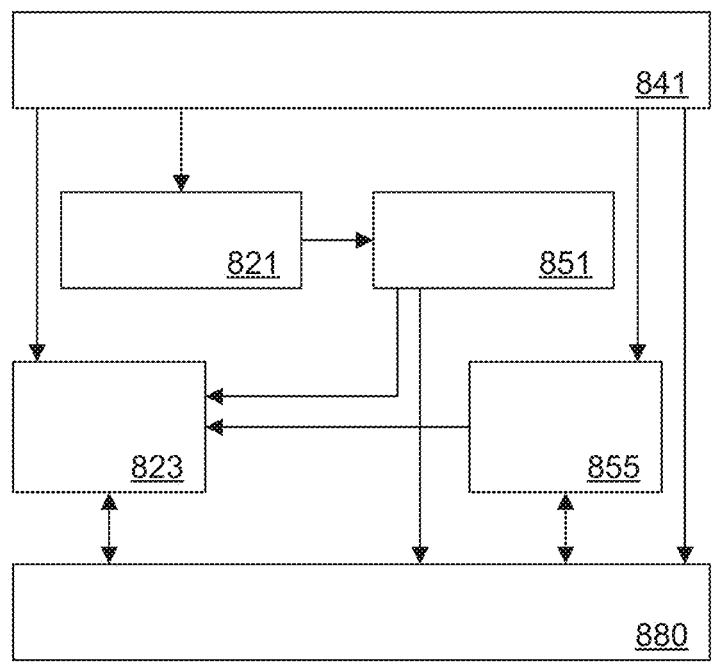
FIG. 8 illustrates an example system and an arrangement of the components thereof, according to embodiments of the present disclosure.

FIG. 8 illustrates an example system 810, according to embodiments of the present disclosure. FIG. 8 shows how several main components (821, 823, 841, 851, 855, 880) of system 810 interact with each other at the logical level. It will be appreciated that the number and arrangement of components in FIG. 8 is exemplary and that modifications and adjustments can be made, in view of the present disclosure. For example, the components of FIG. 8 may be combined into multiple subsystems that function and operate together. Additionally, or alternatively, the number of components may be increased, reduced, or simplified. Further, one or more processors and/or servers may be used to implement system 810 and its components, as a single system or distributed system. Components may also be added to system 810 (such as an application server or orchestrator) and system 810 may be networked to enable communications between the illustrated components (821, 823, 841, 851, 855, 880) as well as with user devices (not shown).

The illustrated components in FIG. 8 include: a designer interface 821 for designing and generating interaction models; management and player interfaces 823 for managing instances of interaction models, rendering interaction environments on user devices (not shown), and controlling the exchange of information between users in an interaction; a module database 841 for storing and providing modules; an interaction model database 851 for storing and providing interaction models; an API/SDK database 855; and a data buildup 880. In accordance with embodiments of the present disclosure, designer interface 821 is used to design and generate interaction models. Different types of modules (e.g., micro modules, macro modules, meta modules, device modules) may be stored in database 841 and used to generate interaction modules with designer interface 821. Interaction models are stored in database 851 and then interpreted, managed, and rendered by the management and player interfaces 823, with the modules and associated data being processed in accordance the APIs from the API/SDK database 855. All data and metadata generated by the modules and collected for each interaction is stored in data buildup 880.

As disclosed herein, designer interface 821 may be used to design and generate interaction models. The interaction models may include, among other things, one or more modules from the module database 841. Data representing each interaction model is stored in interaction model database 851. In some embodiments, each interaction model is interpreted (e.g., by providing data from the database 851 and executing an instance of the interaction model) and the modules that are selected as part of the interaction model are triggered or executed. As part of this process, the player interface is rendered on each user device (not shown) to provide an interaction environment for users in the configuration to generate and exchange information in a common context. In addition, session agendas are provided in the player interface with graphical object(s) that are user-selectable to execute functional elements of one or more of the modules in the interaction model. All data and metadata from the sessions of an interaction is stored in data buildup 880. In accordance with embodiments of the present disclosure, data buildup 880 may be implemented with one or more database systems, such as a highly scalable relational database system. Examples of database systems include scalable database systems such as Apache Cassandra and cloud storage systems such as Amazon S3, including data archiving and long-term backup solutions such as Amazon S3 Glacier. It will be appreciated that these are non-limiting examples and other implementations are possible, consistent with embodiments of the present disclosure.

In some embodiments, system 810 in FIG. 8 further comprises an orchestrator implemented as a kernel application. The orchestrator or kernel application may run on server(s) and/or each user device (e.g., server and/or client applications). Interfaces run on server(s) and/or each user device and perform at least one of: module control and management (e.g., management of when or how a module is triggered or executed; management of data communication among modules; updating of information or data relevant to the session(s) or interaction); system resource allocation; API management; and role or user based permission/authorization enforcement.

In some embodiments, one or more of the components of system 810 in FIG. 8 are implemented (or hosted) on a server (e.g., an external server or a cloud server) with the rest of the components accessing, obtaining, and/or providing data therein/thereto by receiving and/or transmitting data via a communication network (e.g. wired and/or wireless communications networks including intranets and/or the Internet). It will be appreciated that such an implementation may include one or more servers or processors, depending on the size and capacity needs of the system.

Moreover, in some embodiments, one or more of the databases (e.g., databases 841, 851, 855) may be hosted on server(s), which may be the same or different servers, with the interfaces (e.g., designer interface 821, management and player interfaces 823, buildup interface 880) running on user device(s) or terminal(s), which may be the same or different user device(s) or terminal(s), in communication with the server(s). Also, in some embodiments, data buildup 880 may comprise one or more databases hosted on one or more servers.

As disclosed herein, various types of interfaces may be provided with different sets of features and capabilities. Examples of interfaces, consistent with the present disclosure, include a designer interface, a management interface (such as a base or studio interface), a player interface, and a buildup interface. In some embodiments, interfaces may be implemented with software and, when executed, provide GUIs and/or VR/AR interfaces that are displayed on user devices or terminals. Each interface may be device independent (e.g., an independent application solution or app; a web browser or applet based solution; etc) and work with various forms of input/output data, such as audio, voice, text, and/or haptic feedback.

Example management interfaces will now be described with reference to FIGS. 9A-9C. Following these examples, descriptions of example player interfaces are provided with reference to FIGS. 10A-10C and an example designer interface is provided with reference to FIG. 11. Other example interfaces are disclosed below, including an example buildup interface and an example marketplace interface. It will be appreciated from this disclosure that other embodiments of interfaces may be provided, including with different sets of features and capabilities.

A management interface may enable users to manage interactions. In some embodiments, there may be different types of management interfaces, such as a base interface and a studio interface. The right to use a management interface, or a particular feature or type of management interface, may be role dependent. Also, the right to access and use other interfaces and/or features thereof may be role dependent. An example base interface is illustrated in FIG. 9A and an example studio interface is illustrated in FIG. 9B. Generally, the studio interface may share features and capabilities with the base interface, but it may include additional features and capabilities. Thus, the studio interface may be a more advanced management interface in comparison to the base interface.

In some embodiments, a management interface may enable users to manage an interaction, including the configuration, scheduling, and execution of an interaction. For example, a management interface may enable a user to select and enter other interfaces, such as a designer interface or a player interface. As disclosed herein, a designer interface may be configured to allow users to create new interaction models or edit existing interaction models. Further, a player interface may be configured to allow users to access a defined/scheduled interaction and exchange information as part of that interaction.

Within a management interface, users may be provided with other features and capabilities. For example, with a management interface, an owner or administrator of an interaction may identify the users for a configuration. In addition, an owner or administrator may define and assign roles to users in a configuration for the interaction. Still further, an owner or administrator may use a management interface to update assigned roles or manage users in a configuration (e.g., add or delete users). In some embodiments, other features and capabilities may be enabled for an owner or administrator through the management interface, such as scheduling and sending individual user or group invites for a created session or interaction. There may also be various settings and options in the management interface, such as a calendar view, an organizational view, a timeline view, an interactive map view, or a customized view in order to access information for managing transactions.

Figure 9A:
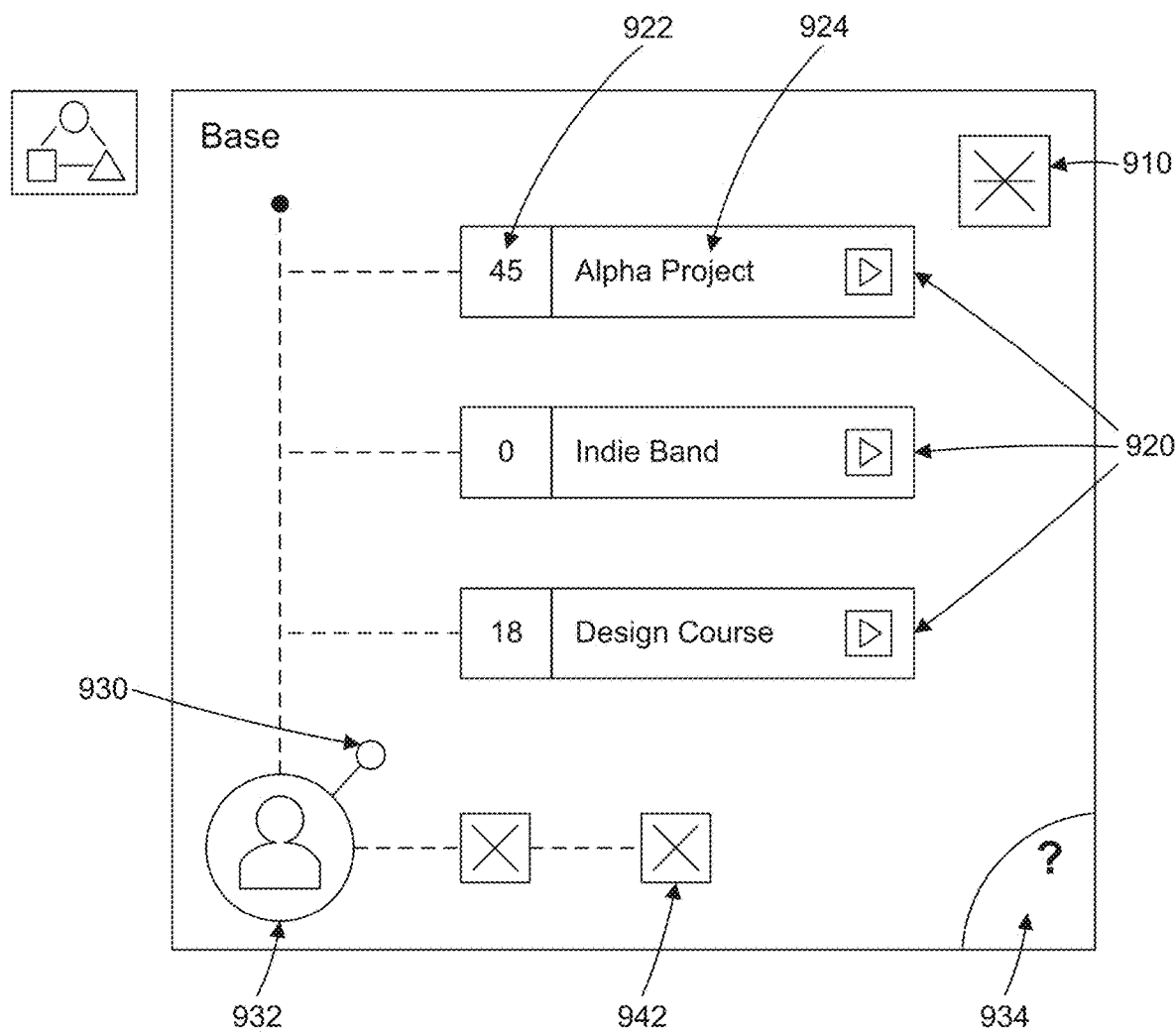
FIG. 9A illustrates an example base interface implemented as a graphical user interface, according to embodiments of the present disclosure.

Referring now to FIG. 9A, an example base interface is illustrated, according to embodiments of the present disclosure. As shown, the base interface may comprise a plurality of graphical objects (including information items or icons and links) for accessing, managing and/or controlling the features and capabilities of the base interface. As will be appreciated from this disclosure, the number and arrangement of these objects (910, 920, 922, 924, 930, 932, 934, 942) can be modified and updated, and thus other embodiments of a base interface are possible beyond the non-limiting example of FIG. 9A.

As shown in FIG. 9A, the base interface includes a graphical object or link 910 for accessing a designer interface. By clicking on link 910, a user may open a new window or display with a designer interface to create new interaction models or edit existing interaction models. Active interactions that a user is associated with may be shown in notification fields 920 of the base interface. Each of these fields 920 may provide information on an active interaction, such as interaction ID or number 922 and an interaction title or name 924. Notification fields 920 may be ordered in ascending or descending order with respect to interaction number, scheduling time, etc. Fields 920 may also be ordered alphabetically by interaction title or name 924. In some embodiments, when a user clicks on a particular one of the fields 920 (e.g., any portion of the field or a play button in the field), a new window or display with a player interface may be presented to the user for the corresponding interaction. In some embodiments, if the user is an owner or administrator of an interaction, then clicking on a particular one of the fields 920 for that interaction may cause an updated view of the base interface to be displayed, through which the owner or administrator may manage that interaction (e.g., add or delete users to the configuration; assign roles or modify assigned roles; update scheduling for the interaction, including the schedule of session(s) of the interaction).

As further shown in FIG. 9A, the base interface may also include a settings object 930 for accessing and managing settings, such as view settings or user profile settings. As described above, various view options or settings may be provided for the base interface, such as a calendar view, an organizational view, a timeline view, an interactive map view, or a customized view in order to access information for managing transactions. FIG. 9C illustrates an example interactive map view for a base or studio interface, according to embodiments of the present disclosure. The map view may be navigable and include one or more scenes, each scene representing an interaction. The scenes may be animated, provided with changing colors or elements, and/or updated to show notifications. When a user hovers a cursor over or points to a scene, the scene may respond with animation, coloring, and/or notifications. The user can then enter inputs and manage the selected scene or interaction. In addition, the base interface may include a profile object 932 for displaying a profile or image of the current user, which can be adjusted as part of the user profile settings. Also, an information tab 934 may be provided to enable a user to get information or address questions related to the base interface or any other aspect of the interaction system. For example, by clicking on the information tab 934, the base interface may be updated to display a list of facts and/or frequent questions and corresponding answers. In some embodiments, a search field may be provided to allow a user to search instructional videos or documents. Additionally, or alternatively, an online chat window may be presented to enable a user to communicate and receive information from a live attendant or a chat bot.

In FIG. 9A, the base interface is also shown to include objects 942 representing one or more modules. Different modules may be listed, each with different sets of functional elements. By clicking on a particular one of the objects 942, a user my invoke a corresponding module to perform certain functions or actions, such as scheduling and sending individual user or group invites for a created session or interaction. As further non-limiting example, one of the objects 942 may be selectable by a user to invoke a module for preparing notes or instructions for a session or interaction. Also, for example, a chat module could be selected and executed to communicate with everyone active in the base interface.

Figure 9B:
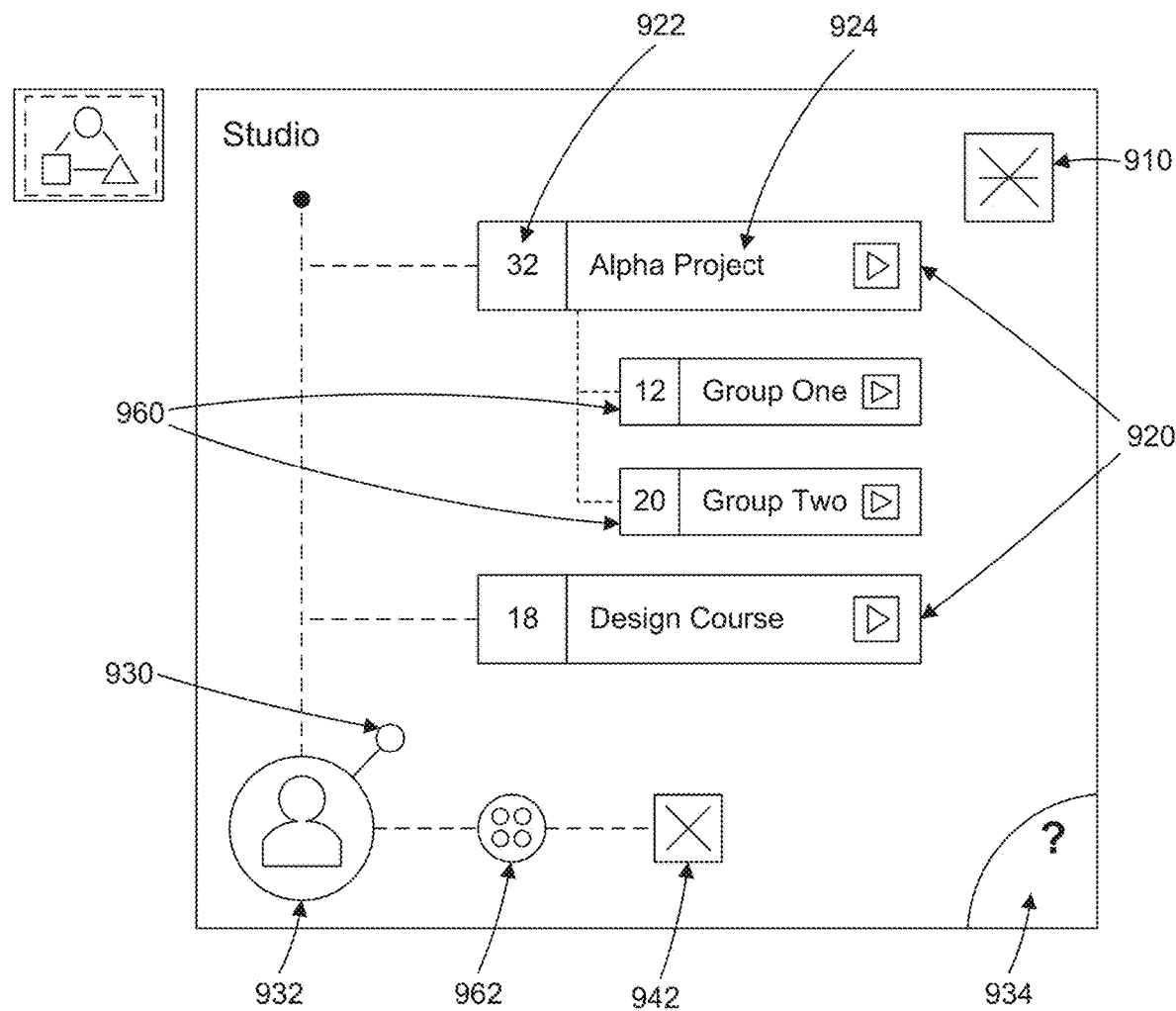
FIG. 9B illustrates an example studio interface implemented as a graphical user interface, according to embodiments of the present disclosure.
Figure 9C:
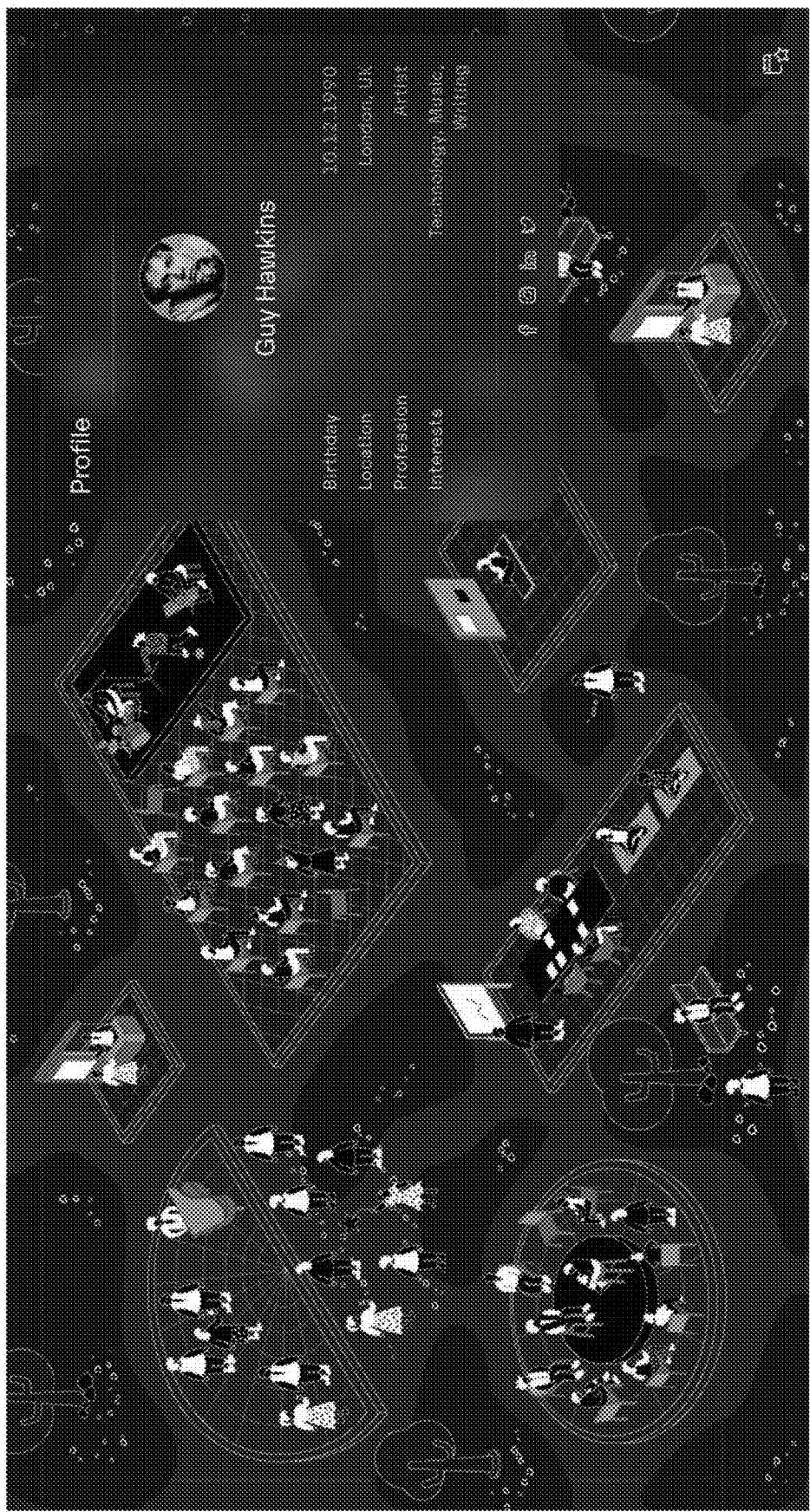
FIG. 9C illustrates an example interactive map view for a base or studio interface, according to embodiments of the present disclosure.

FIG. 9B illustrates an example studio interface, according to embodiments of the present disclosure. As disclosed herein, the studio interface may share features and capabilities with the base interface (including 910, 920, 922, 924, 930, 932, 934, 942), but it may include additional features and capabilities. For example, the studio interface may support a higher number of interactions. Further, in the example of FIG. 9B, the studio interface enables the creation and management of subflows 960, as further described below. Generally, the studio interface includes a plurality of graphical objects (including information items or icons and links) for accessing, managing and/or controlling the features and capabilities of the studio interface. As will be appreciated from this disclosure, the number and arrangement of these objects (910, 920, 922, 924, 930, 932, 934, 942, 960, 962) can be modified and updated, and thus other embodiments of a studio interface are possible beyond the non-limiting example of FIG. 9B.

As with the base interface, the studio interface includes a graphical object or link 910 for accessing a designer interface. By clicking on link 910, a user may open a new window or display with a designer interface to create new interaction models or edit existing interaction models. Further, the studio interface includes notification fields 920 for active interactions. Each of these fields 920 may provide information on an active interaction, such as interaction ID or number 922 and an interaction title or name 924. Notification fields 920 may be ordered in ascending or descending order with respect to interaction number, scheduling time, etc. Fields 920 may also be ordered alphabetically by interaction title or name 924. In some embodiments, when a user clicks on a particular one of the fields 920 (e.g., any portion of the field or a play button in the field), a new window or display with a player interface may be presented to the user for the corresponding interaction. In some embodiments, if the user is an owner or administrator of an interaction, then clicking on a particular one of the fields 920 for that interaction may cause an updated view of the studio interface to be displayed, through which the owner or administrator may manage that interaction (e.g., add or delete users to the configuration; assign roles or modify assigned roles; update scheduling for the interaction, including the schedule of session(s) of the interaction).

As further shown in FIG. 9B, the studio interface includes notification fields 960 for active subflows. The subflows may be identified in fields 960 by ID or number and title or name. Consistent with embodiments of the present disclosure, subflows may be set-up for specific jobs or task related to an interaction. Each subflow may inherit all modules or functionalities of the parent interaction, but only as a child of the parent interaction. There may be a specific user configuration and assigned roles for each subflow, and the jobs or tasks related to a subflow may encompass one or more sessions of the interaction, or only part of a session of the interaction. In the example of FIG. 9B, two subflows are identified; namely, Group One and Group Two. Each is a subflow or child of the parent interaction titled Alpha Project. In comparison to the parent interaction, subflows may have different owners or administrators and the user configuration (e.g., specific groups or departments within an organization, company, or other entity). Advantageously, subflows may allow the distribution of management or control, which may be helpful for large scale interactions and improve productivity.

Subflows may be managed through the studio interface. For example, through the studio interface, an owner or administrator of an interaction may create one or more subflows of the interaction. As part of this process, a specific task or job for the subflow may be defined, as well as the user configuration for the subflow. Further, for active subflows, when a user clicks on a particular one of the fields 960 (e.g., any portion of the field or a play button in the field), a new window or display with a player interface may be presented to the user for the corresponding subflow. If the user is an owner or administrator of a subflow, then clicking on a particular one of the fields 960 for that subflow may cause an updated view of the studio interface to be displayed, through which the owner or administrator may manage that subflow (e.g., add or delete users to the configuration; assign roles or modify assigned roles; update scheduling for the subflow, and so on). In some embodiments, the creating and editing of a subflow may be performed in the designer interface, and the managing of that subflow done through the studio interface.

The studio interface of FIG. 9B also includes a settings object 930 for accessing and managing settings, such as view settings or user profile settings. For example, through object 930, a user may choose between various view options for the studio interface, such as a calendar view, an organizational view, a timeline view, an interactive map view, or a customized view. As described above, FIG. 9C illustrates an example interactive map view for a base or studio interface, according to embodiments of the present disclosure. In addition, a profile object 932 that displays a profile or image of the current user may be adjusted as part of the user profile settings. As with the base interface, an information tab 934 may also be provided in the studio interface to enable a user to get information or address questions. For example, by clicking on the information tab 934, the studio interface may be updated to display a list of facts and/or frequent questions and corresponding answers. In some embodiments, a search field may be provided to allow a user to search instructional videos or documents. Additionally, or alternatively, an online chat window may be presented to enable a user to communicate and receive information from a live attendant or a chat bot.

The studio interface may also include an object 962 for defining and managing studio users. Clicking on object 962 may cause an updated view of the studio interface for managing studio users. For example, users that need to access the studio interface to manage a subflow may be granted access using object 962. Also, rights to access the studio interface may be changed and specific subflow assignments to user(s) may be done through object 962. Further, studio interface may include one or more objects 942 representing one or more modules. Similar to that described above for the base interface, different modules may be listed, each with different sets of functional elements. By clicking on a particular one of the objects 942, a user my invoke a corresponding module to perform certain functions or actions, such as scheduling and sending individual user or group invites for a created session or interaction. As further non-limiting example, one of the objects 942 may be selectable by a user to invoke a module for preparing notes or instructions for a session or interaction. As another example, a video module may be provided to enable the playing of a video (such as an instructional or information video).

Figure 10A:
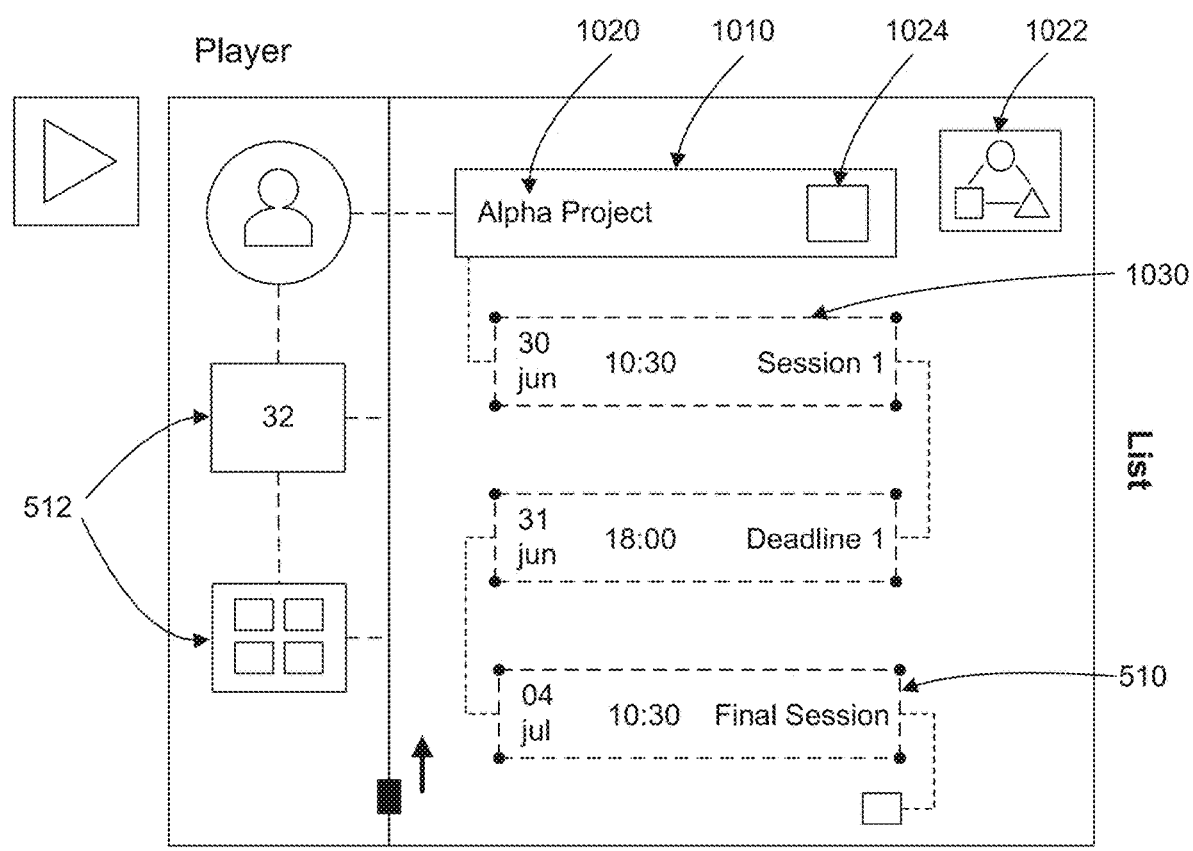
FIG. 10A illustrates a list view of an example player interface implemented as a graphical user interface, according to embodiments of the present disclosure.
Figure 10B:
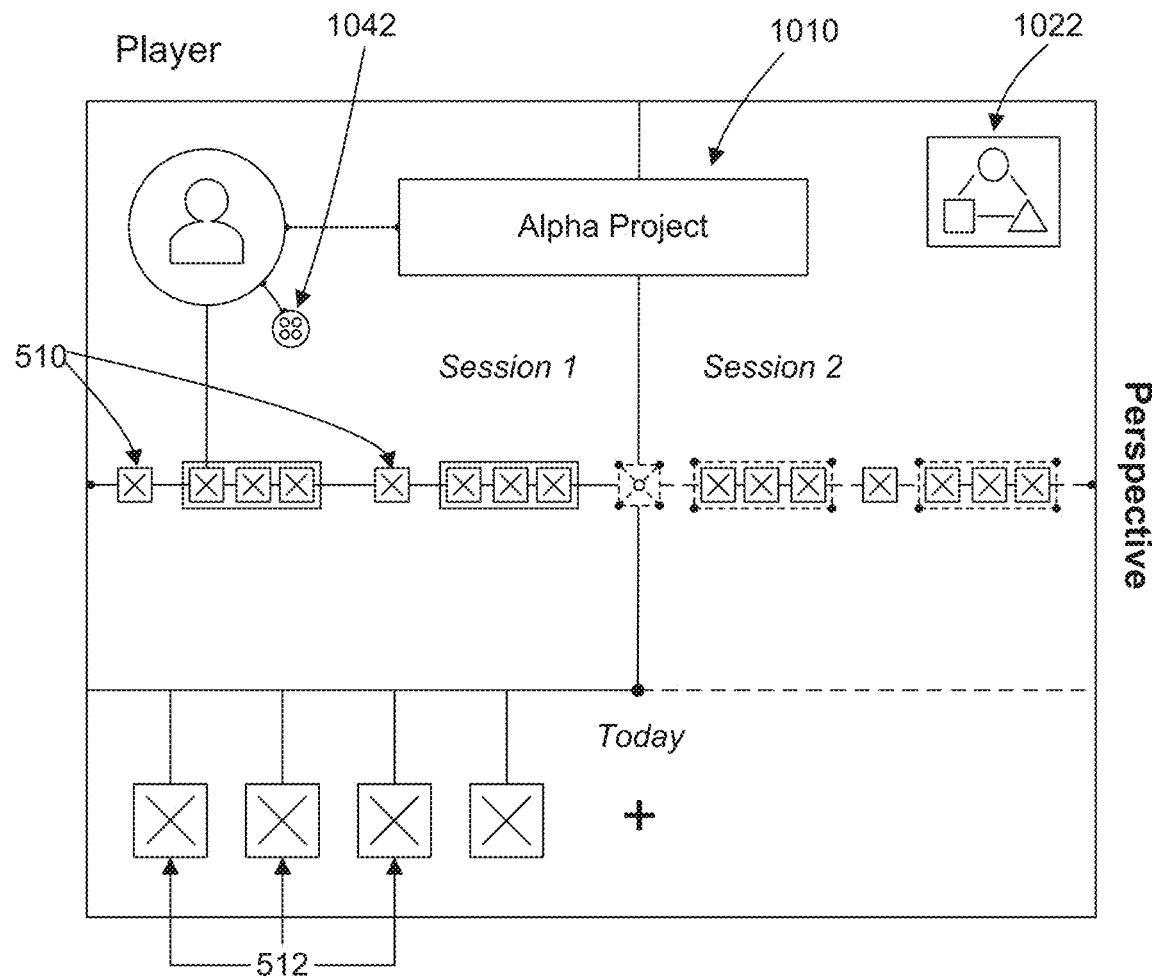
FIG. 10B illustrates a perspective view of an example player interface implemented as a graphical user interface, according to embodiments of the present disclosure.
Figure 10C:
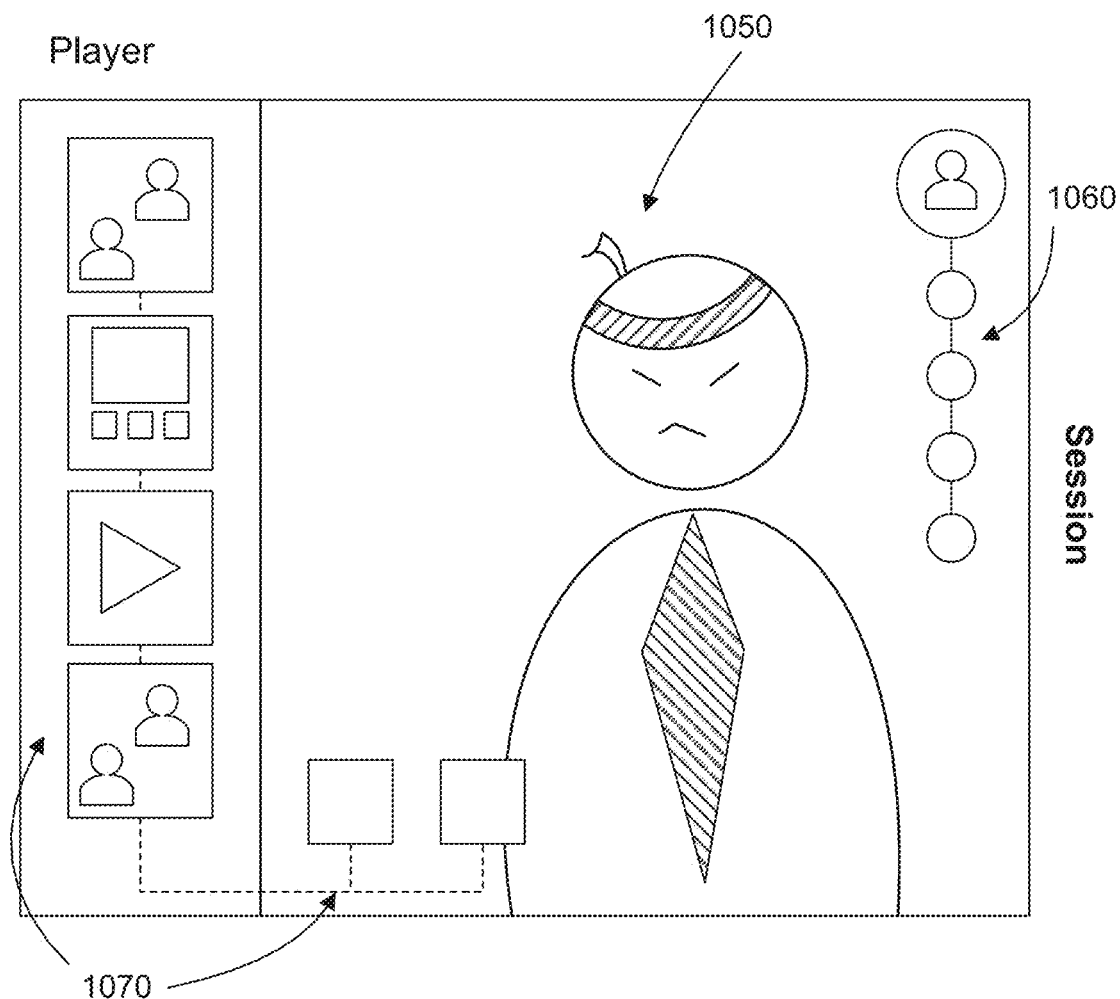
FIG. 10C illustrates a session view of an example player interface implemented as a graphical user interface, according to embodiments of the present disclosure.

FIGS. 10A-10C illustrate example embodiments and views of a player interface. As disclosed herein, a player interface may be implemented to provide an interaction environment for users to generate, exchange, access, and view information during execution of an instance of an interaction model. The capabilities and displayed views of a player interface may be dependent on the roles assigned to users associated with the interaction. For example, participants may use a player interface to consume information exchanged in sessions(s) of the interaction. Contributors may also consume information through a player interface, but contributors may also generate and contribute data to the interaction. Owners have the rights of contributors and participants, but also have additional rights and capabilities through a player interface. For example, an owner of a transaction may update or modify modules for a session or the interaction, including by removing, substituting, or adding modules. Through the player interface, an owner may also be able to interact with modules and control their configuration (e.g., send an email to all the participants using an email module). The player interface may also enable an owner to interact with other users and change their configuration (e.g., change a user's assigned role within or with respect to a module). Still further, an owner can use a player interface to stop, reprogram, or reiterate a session of an interaction, or extend a session of an interaction. The above are non-limiting examples and it will be appreciated from the present disclosure that other features and capabilities, and combinations thereof, may be implemented in a player interface.

FIG. 10A illustrates a list view of an example player interface implemented as a graphical user interface, according to embodiments of the present disclosure. The list view is configured to provide a display that lists of the one or more sessions of a defined interaction. As disclosed herein, each interaction may be modeled using an interaction model. In the example of FIG. 10A, the player interface includes an information field 1010 that provides information for an interaction, including the name or title 1020 for the interaction. In or near the information field, a short description or theme image for the interaction may also be provided in window 1024. Below the information field 1010, each scheduled session 1030 for the interaction may be shown. The list view of the sessions may be done in chronological order, according to their sequence and/or scheduling. For each session 1030 in the list, information about the session may be provided (e.g. schedule date and time; session name or ID; etc.). If the list of sessions goes beyond the immediate screen view, the player interface may be configured to allow a user to scroll through the list view of sessions (e.g., scrolling the screen view up or down for the example in FIG. 10A).

In some embodiments, the player interface may also display information related to the modules that are associated with the interaction. For example, as shown in FIG. 10A, macro modules 512 that are defined for one or more of the sessions may be displayed adjacent to the list view of sessions. Further, one or more micro modules 510 that are applied a particular time or period of time in a session may be shown. To show the defined micro modules 510 for a session, representative graphical objects may appear besides or adjacent to the corresponding session or micro modules 510 may be listed or displayed when a user clicks or hovers a cursor over the displayed session in the player interface. In some embodiments, by clicking on a micro module 510 or macro module 512, an owner may interact or control the configuration of the module. As disclosed above, the player interface may also be configured to allow a user to update or modify modules for a session or the interaction, including by removing, substituting, or adding modules.

The player interface may include additional features and capabilities. For example, as shown in FIG. 10A, a graphical object 1022 is provided to allow a user to navigate to a management interface (such as a base interface or studio interface). In some embodiments, responsive to the user clicking on object 1022, a new window or display is provided to the user that includes the management interface. By way of example, other feature and capabilities in the player interface may include a profile object (e.g., in the upper left corner of FIG. 10A) for displaying a profile or image of the current user, and a graphical object (not shown) for adjusting settings such as view and/or user profile settings. As a further example, the player interface may include an information tab (not shown) to enable a user to get information or address questions related to the player interface or any other aspect of the interaction system.

FIG. 10B illustrates a perspective view of an example player interface implemented as a graphical user interface, according to embodiments of the present disclosure. The perspective view is configured to provide a display that shows the one or more sessions of a defined interaction relative to time. In the example of FIG. 10B, the player interface includes an information field 1010 that provides information for an interaction, including the name or title for the interaction. In or near the information field, a short description or theme image (not shown) for the interaction may also be provided. Below the information field 1010, scheduled sessions for the interaction may be shown. The sessions may be displayed related to time, a modeled sequence, and/or a time axis. For example, in some embodiments, an indicator may indicate the position or time on the time axis (e.g., Today). The player interface may also include information about each session, such as the session name or ID (e.g., Session 1; Session 2; etc.). If the list of sessions goes beyond the immediate screen view, the player interface may be configured to allow a user to scroll through the list view of sessions (e.g., scrolling the screen view left or right for the example in FIG. 10B).

In some embodiments, the player interface may also display information related to the modules that are associated with each session. For example, as shown in FIG. 10B, macro modules 512 that are defined for one or more of the sessions may be displayed below the perspective view of sessions. Further, the perspective view may show the sequence and/or relative arrangement of one or more micro modules 510 that are defined for each session. Detailed information on a micro module 510 or micro module 512 may be provided through the player interface when a user clicks or hovers a cursor over the displayed module. Further, in some embodiments, by clicking on a micro module 510 or macro module 512, an owner may interact or control the configuration of the module. As disclosed above, the player interface may also be configured to allow a user to update or modify modules for a session or the interaction, including by removing, substituting, or adding modules.

The player interface of FIG. 10B may include additional features and capabilities. For example, as with the example in FIG. 10A, a graphical object 1022 may be provided to allow a user to navigate to a management interface (such as a base interface or studio interface). In some embodiments, responsive to the user clicking on object 1022, a new window or display is provided to the user that includes the management interface. By way of example, other feature and capabilities that may be provided in the player interface of FIG. 10B include a profile object (e.g., in the upper left corner of the screen) for displaying a profile or image of the current user, and a graphical object (not shown) for adjusting settings such as view and/or user profile settings. As a further example, the player interface may include an information tab (not shown) to enable a user to get information or address questions related to the player interface or any other aspect of the interaction system.

In the example of FIG. 10B, a graphical object 1042 is provided in the player interface. This object may be selected to display or access information about the contributor(s) to the interaction. Assigned contributors may also be updated or modified by selecting object 1042 (i.e., by adding or removing contributor role assignments to users). In some embodiments, users that are assigned a contributor role may have the right to access, for example, the perspective view of the player interface. However, a contributor's ability to access and use certain features in the player interface may still be restricted (e.g., adding or deleting modules defined for a session).

FIG. 10C illustrates a session view of an example player interface implemented as a graphical user interface, according to embodiments of the present disclosure. The session view is configured to display executed sessions and, more particularly, an interaction environment for users to access, consume, generate, and exchange information. With the session view, users can take part in a current session and consume information (e.g., as participant or contributor) and/or contribute data (e.g., as a contributor) to the session. As disclosed herein, all data and metadata collected from the sessions of an interaction is stored as part of a data buildup.

As shown in FIG. 10C, the users that are logged in and participating in a current session may be shown in the player interface through one or more graphical objects 1060 with appropriate indicia (e.g., for each user, a bubble or circle including the user's photo and/or initials). In the main window 1050, the player interface may present the interaction for the session. For example, during the session, the main window 1050 may be updated to play a video presentation, display Power Point slides, transmit the video of a user that is speaking or presenting, etc. An example of an updated main window 1050 for the interaction environment is shown in FIG. 10C.

During each session, different modules 1070 may be used to manage and control the session. As disclosed herein, each module and its functional elements may be available at a particular point or period of time relative to each session of the interaction. For example, some modules may be available throughout a session, while others may be triggered and executed at a particular point or available for a specified period, as defined in the interaction model. Also, consistent with the present disclosure, there may be different types of modules to assist interactions and the collection of data for the buildup. By way of example, at least three types of modules may be provided: micro modules, macro modules, and meta modules. In addition, other types of modules may be provided, such as device modules. Device modules may support different types or classes of devices used during each session. Graphical objects 1070 representing the defined modules for a session may be displayed so that users may select and interact/use the modules to access, consume, generate, and exchange information.

Figure 11:
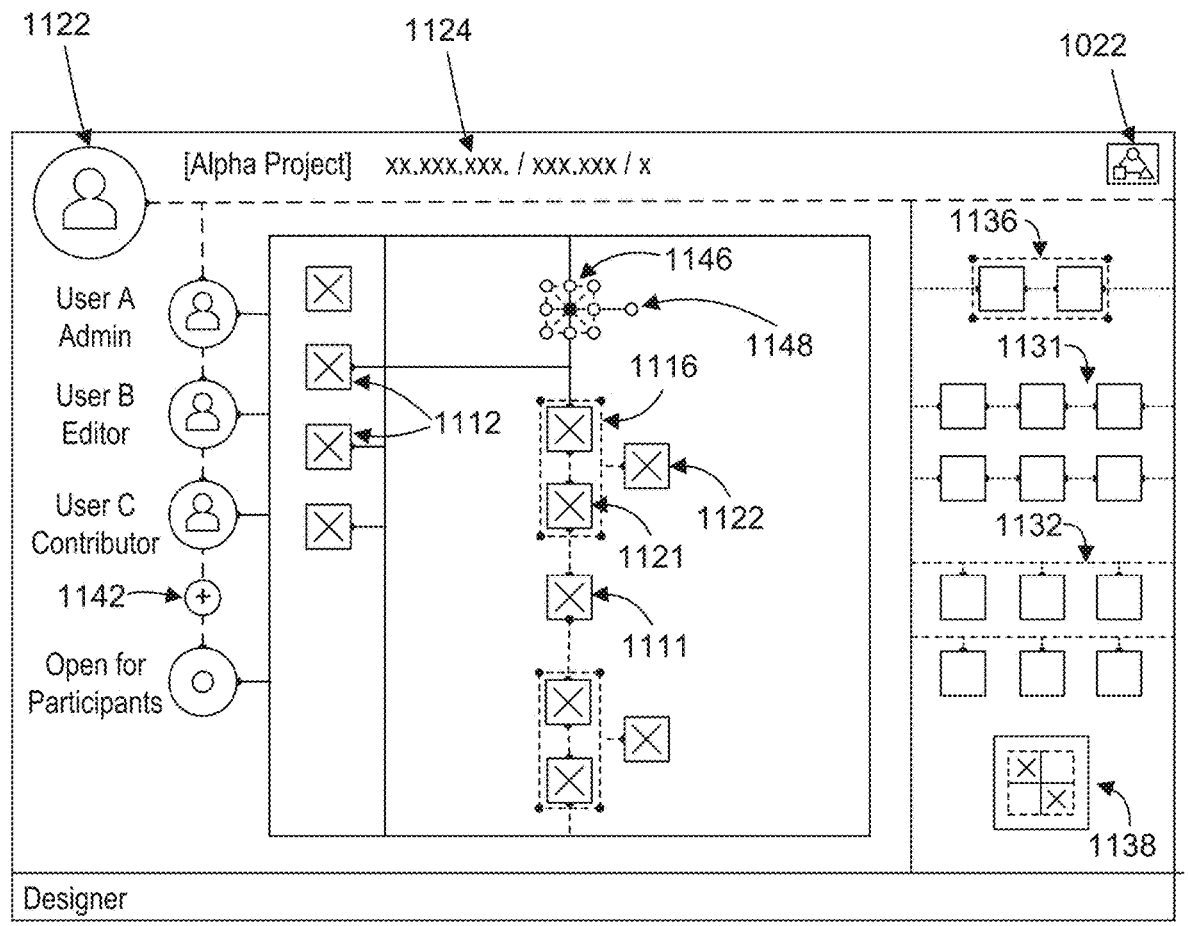
FIG. 11 illustrates an example designer interface implemented as a graphical user interface, according to embodiments of the present disclosure.

FIG. 11 illustrates an example designer interface implemented as a graphical user interface, according to embodiments of the present disclosure. As disclosed herein, a designer interface may be provided to enable the design and generation of interaction models. Each interaction model for an interaction may include one or more interaction objects and one or more modules that are defined relative to a sequence and/or time axis. As disclosed herein, each interaction object may represent a configuration of users associated with the interaction. Further, each module may include a set of functional elements that are executable in one or more sessions of the interaction.

With a designer interface, an owner or administrator may design and generate an interaction model for an interaction, including a start date and end date to the interaction, as well as the scheduling and sequence for the sessions of the interaction. Sessions may be added by arranging modules in a sequence and/or relative to a time axis and providing their start date and end date. Editing to the sessions, including by adding or removing modules, may also be performed through the design interface, if changes are needed or later desired. Modules may be selected from a core set of modules stored in a database, as well as selected through a marketplace interface. In designer interface, drag and drop operations, audio/text commands, etc. may be used to arrange the modules on the time axis, for example. The owner or administrator can also set configurations, such as assigning users to the sessions and defining metadata structures. After the interaction model is defined, an owner or administrator may execute the corresponding interaction directly from the designer interface or by entering the player interface.

Referring again to FIG. 11, the example designer interface includes a number of graphical objects, fields, and features for generating an interaction model. At the top of the designer interface, one or more fields 1124 may be provided for entering details for the interaction (e.g., title or name (such as "Alpha Project") and/or an ID or number). Also, at the top of the designer interface, there is a graphical object 1122 for identifying the owner or administrator of the interaction model, and a graphical object 1022 providing a link to navigate to a management interface (such as a base or studio interface). The graphical object 1112 may include a photo, image, and/or initials of the owner, for example. The title or role of the owner may also be displayed in text (not shown). Other users in the configuration may be presented below the owner using text (e.g., User A Admin, User B Editor, User C Contributor) and graphical objects with indicia (e.g., a photo, image, and/or initials). Further, as shown in FIG. 11, there may be a graphical object 1142 for adding additional users (such as administrators, contributors, and/or participants) to the session(s) of the interaction.

The designer interface may also include a time axis (extending vertically in the middle of the interface shown in FIG. 11) to arrange modules for each session. Available modules to select from may be shown on the righthand side of the designer interface. For example, as shown in FIG. 11, there are one or more objects representing micro modules 1131 and macro modules objects 1132 that can be arranged relative to the time axis. Also, there are objects representing a session 1136 to define sessions relative to the time axis. There is also an object 1138 for linking to a marketplace interface to search for and select additional modules.

In the example of FIG. 11, one or more micro modules 1111 have been arranged along the time axis, and one or more macro modules 1112 have been arranged as offshoots relative to the time axis. A session 1116 has also been defined in relation to the time axis, which includes a micro modules 1121 and a macro module 1122 for that session. A graphical object 1146 representing a configuration of users is shown near the top of the time axis, and approximate thereto an object 1148 is provided for adjusting or changing the configuration of users of the interaction.

In some embodiments, using graphical objects 1142 and/ or 1146, the owner can restrict or grant user access to the executed instance of the interaction model. The owner can also set or adjust the configuration of users of the interaction using the configuration graphical object 1148. In some embodiments, the configuration of users for the interaction defines a state for that interaction; e.g., which users of the system have access to the interaction and what role each user takes in the interaction.

As disclosed herein, other types of interfaces may be provided, such as a buildup interface, a marketplace interface, and a program interface. As with the other interfaces, each of these interfaces may also be implemented as a GUI and rendered on user devices (e.g., board, laptop, pad, etc.; see FIGS. 1A-1C). With a buildup Interface, users can search and view specific data from the data buildup. The data from the buildup may be presented in different ways. For example, the user can have: a global view indicating how all interactions generated the data; an interaction view indicating how a specific interaction generated data, and a session view from a specific interaction indicating how a specific session generated data. In addition, with the buildup interface a user can search and review specific data via parameters (e.g., users with their roles and the module metadata, both presented in a time dependency) from the global view, the flow view, and/or the session view. The buildup interface may also include reporting features and the ability to share data with others (e.g., users inside or outside an organization or other entity).

With the marketplace interface, users may be able to search, select, purchase, and/or download modules for use in the interaction system. In some embodiments, the system may be designed as an open platform that is configured to execute modules (e.g., as software applications or sets of programmable instructions) from a wide variety of developers, vendors, and other sources. As disclosed herein, Application Program Interfaces (APIs) and/or Software Development Kits (SDKs) may be provided to assist with the development of these software applications or programs and enable smooth execution within the system. With the marketplace interface, users can search, buy, and/or load and buy modules from developers and vendors. For example, users can identify modules using keywords searches in the marketplace interface. Details for each identified module (e.g., description, functionalities, how to configure) can also be provided through the marketplace interface. Some modules may be available for purchase while others are available for free or as shareware. All modules that are selected and purchased may be added to the modules database (see database 841 in FIG. 8) through the marketplace interface. The marketplace interface may also provide other features and capabilities, such as providing updates on current and further releases of modules, intelligent module search and comparison tools, promoting or recommending modules, and so on. It will be appreciated that these are non-limiting examples and that other features and capabilities may be provided in the marketplace interface.

As a further example, a program interface may be implemented to allow the programming of modules. For example, some modules may come with programmable parameters or functions to allow the customization of the module for particular use cases or interactions. Through a program interface, a user such as owner of an interaction may program the module as needed for the interaction. By way of example, the program interface may enable a user to review a list of programmable parameters or functions for the module and then set those parameters (e.g., with data values or states) or functions (e.g., enabling or disabling specific sets of functional elements) through one or more user inputs. In some embodiments, with an API, the program interface may enable a user to program the module at the code level or through visual programming operations.

In still further embodiments, an API may allow other applications or programs to interact with the data and the processes of the modules. Thus, systems consistent with the present disclosure may be implemented to allow a software application the power to do anything that the user could do using a GUI-enabled, program interface. For example, if a company or other entity wants to implement interactions that match the Agile processes used for developing software (e.g., using so-called "sprints" in which a development team creates a specific group of product capabilities from start to finish), a Jira integration application can be created to automatically update those interactions when a new ticket or change is made in a current sprint. Advantageously, this approach allows modules to be automatically updated and scaled, as needed, without user inputs or manual programming.

It is understood that any of the interfaces disclosed herein may be configured to receive user inputs in one or more of different forms. For example, the user inputs may be received as one or more of the following: inputs using a keypad or a keyboard; inputs using a mouse or touchpad; a manipulation of a graphical object displayed on the GUI (e.g., by a tactile input on a touchscreen); a voice command received through a microphone; and/or a motion or gesture command received through a motion capture device (such as a controller with an accelerometer or an image capture device with image processing capability for detection a motion command). In addition, a computing device, an augmented environment and/or a virtual environment may be provided with detectors or sensors for receiving any user inputs. It will be appreciated that these are non-limiting examples and that other forms of user inputs may be accepted by the interfaces, consistent with embodiments of the present disclosure.

Figure 12:
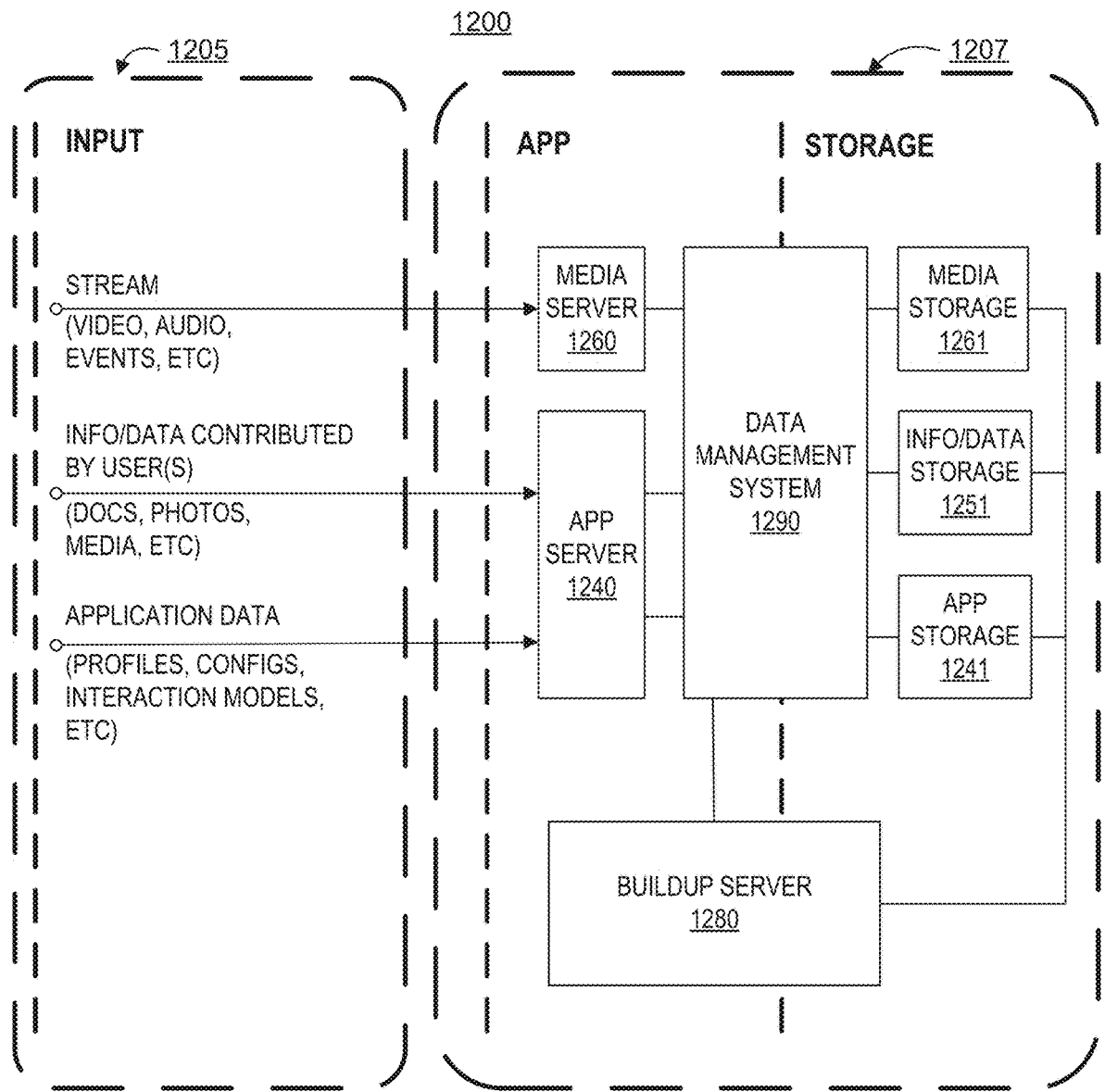
FIG. 12 illustrates an example system and an arrangement of components thereof, according to embodiments of the present disclosure.

FIG. 12 illustrates an example interaction system 1200 and an arrangement of components thereof, according to embodiments of the present disclosure. System 1200 may implement the methods and features of the present disclosure, including: the provisioning and execution of interfaces; the design and generation of interaction models; the configuration of users and role assignment; the providing of data to instantiate each interaction model; the scheduling and execution of interaction models; the triggering and execution of modules; the control and management of interactions; the collection and storage of data and metadata; the searching and accessing of data from the data buildup; and the generation of buildup views and reporting of data. It will be appreciated that these are non-limiting examples and other features and capabilities may be implemented with system 1200, consistent with embodiments of the present disclosure.

System 1200 may be a computer-implemented system with any suitable combination of hardware, software, and firmware. The illustrated components may be implemented with computing devices or systems, including one or more processors and programmable instructions. Examples of computing devices include computers, servers, cloud storage systems, and database systems. As shown in FIG. 12 and described herein, the components may be physically and/or logically in communication with one another. As will be appreciated, communication networks (public and/or private), bus structures, and data connections (sockets) may be utilized for this purpose. User devices (not shown) may also be networked to system 1200 with security features (password/login functions; authentication/role management; firewall; etc.) to send and receive data. It will also be appreciated from this disclosure that the number and arrangement of components in FIG. 12 is provided for purposes of illustration and may be modified. Thus, for example, the components of FIG. 12 may be combined into multiple subsystems that function and operate together. Additionally, or alternatively, the number of components may be increased, reduced, or simplified.

As illustrated in FIG. 12, system 1200 includes a number of components, including: a media server 1260 for receiving/managing/processing input media data (e.g. streamed video, audio, or events, etc during the execution of an interaction model); a media storage 1261 for storing the input media data from the media server 1260; an application server 1240 for executing applications and receiving/managing/processing executed application related data (e.g., data related to profile(s), configuration(s), interaction model(s), etc that are used during execution, as well as receiving/managing/processing information or data contributed by user(s) during interaction model execution, such as documents, presentations, photos, notes, media data, etc.; a data management system 1290 for managing data; an application storage 1241 for storing input application data from application server 1240; and an information or data storage 1251 for storing the information or data contributed by the user(s), which are received from application server 1240. Logically, some of the components may support or assist with data input sources 1205, while others may be involved with the execution of applications and/or data storage 1207.

In some embodiments, media server 1260 and/or media storage 1261 provide data for one or more interfaces. Other components of system 1200, such as the application server 1240 and buildup server 1280, may also communicate and provide data to the interfaces. The data may be used for generating GUI(s), as well as other features and functions of the interfaces (e.g., controlling, managing, and/or communicating). Examples interfaces are described herein, including a designer interface, a player interface, a management (base or studio) interface, and a buildup interface. See, e.g., example management and player interfaces described with reference to FIG. 8; example base and studio interfaces described with reference to FIGS. 9A-9C; example player interfaces described with reference to FIGS. 10A-10C; and example designed interface described with reference to FIG. 11. Example features and functions of a buildup interface are also described above. In some embodiments, a management interface, a player interface, and/or a buildup interface may communicate with the components of system 1200 to access and receive data, as well as provide and store data. All of the applications, including all interfaces and modules, may be executed by and run on the application server.

With system 1200, data moves inside the platform from input sources 1205. As shown in FIG. 12, there are three main input sources 1205: streamed data, user contributed data; and application data. The application data, including profiles, configurations, and interaction models, may be generated and provided as part of the process of designing and generating interaction models, including user configuration data and roles assignments to execute the interaction models. As disclosed herein, this data can be generated and provided using, for example, a designer interface and management interface. The user contributed data, including documents, presentations, photos, notes, media data, etc., may be generated and exchanged during the execution of interaction models. As disclosed herein, this data can be generated and provided using, for example, a player interface and one or more modules. The streamed data, including video, audio, and live events, etc., may also be generated and provided during the execution of interaction models. As disclosed herein, this data can be generated and provided using, for example, a player interface and one or more modules.

Data from input sources 1205 are processed and routed by the applications to be archived and stored 1207 for later use in the buildup view. As disclosed herein, a buildup interface may be provided to facilitate the searching and retrieval of data in the buildup from buildup server 1280. Further, consistent with the present disclosure, metadata may be stored to assist with searching the data in the data buildup. The metadata may be stored in a database with the data buildup or separately in another database or computer-readable medium (e.g., managed by data management system 1290).

In some embodiments, the data from input sources 1205 are processed and managed by data management system 1290, which stores the data in their respective storage containers or locations (e.g., media storage 1261, data storage 1251, and application storage 1241). Byway of example, data may be stored as binary data, e.g., as a Binary Large OBject (BLOB). This data management approach is useful when storing input media and other data because it can provide a single storage container or location for each data type and help provide compatibility with various applications and interfaces.

In some embodiments, data management system 1290 is configured to manage the input data and keep track of the storage locations by using pointers to the stored locations of the input data. For example, a BLOB identifier (depending on the type of BLOB storage used) or other form of pointer may be used. As a further example, metadata may be stored that includes pointers or other information to identify the storage locations of the data from input sources 1205.

Data management system 1290 may be configured to form a persistence layer or a data access layer. Further, data management system 1290 may be configured to store and manage metadata associated with the data from input sources 1205. In some embodiments, the metadata identifies contextual information for the data and is generated and provided by the modules of the interaction model when the modules are executed for each session. Further, in some embodiments, a relational database system may be used to implement one or more of media storage 1261, data storage 1251, and application storage 1241.

In some embodiments, a persistence layer or data access layer may be used by data management system 129 as an intermediate layer for managing (e.g., storing, retrieving, and/or acquiring) data of different types, formats and/or sources that were, or are, associated with interaction system 1200. Advantageously, this can lead to the interfaces not having to be tied to a specific data type or format or source. By forming the persistence layer or the data access layer, data management system 1290 may also enable, for example, buildup server 1280 to provide data for one or more interfaces, such as a buildup interface.

In some embodiments, a buildup interface may use metadata managed by or provided from data management system 1290 to access stored input data and identify a context and related data. As disclosed herein, buildup interface may be configured to provided different reports and/or views. For example, using metadata, buildup interface may provide reports, relative to a sequence and/or time axis summarizing all logged-in users, the micro and macro modules in effect (i.e., active state), and/or the interaction model(s) that took place, that are currently taking place, or that are scheduled to take place.

In accordance with embodiments of the present disclosure, modules can specify entities in their code and buildup server 1280 and/or data management system 1290 will load and transform these declarative entities into executable database queries. This arrangement is flexible and shifts responsibility for managing the database schema or structure to the modules. To avoid conflicts, a namespace may be created around each module that is composed of the name of the vendor or developer of the module and the name of the module. This approach is effective across the module repository because each module will include a unique combination of a vendor/developer name and a module name. In addition, a record or graph representation of all changes to the database schema may be maintained for each interaction model. This may be implemented to maintain a record of the changes by all installed modules at any instance. If two operations are the same, a cycle will be created in the graph. The graph can then be reduced to eliminate any cycles, thus eliminating redundant operations. As part of a migration process, this can be done every time there are changes to the schema. Consequently, the database schema is maintained and conflicts or redundancies are avoided. Advantageously, this approach also supports an open system platform with modules provided from numerous vendors/developers by providing an effective technical solution for managing the database scheme and avoiding data conflicts and overlaps.

As disclosed herein, the data buildup may be stored in a structured database (e.g., a SQL or CQL database). Further, in accordance with an aspect of the present disclosure, the primary responsibility for defining the schema for the database may be shifted to the modules. For example, each module can define pieces of this schema and buildup server 1280 and/or data management system 1290 may use those pieces to assemble the full schema that is then used to retrieve and store data. This approach may also be used for the metadata generated by the modules. In some embodiments, each module may have access to the full schema (authorization and access management still apply). For example, a chat module can access the data and/or metadata for documents stored by a files module without them having any links in-between. As part of a reconciliation process, the schema may be generated every time the application starts-up. After a new module is added, the system will restart. Pre-restart conditions can be set to make sure that there are no interruptions to any interactions. When the reconciliation begins, the new module will be part of the new schema. As disclosed herein, modules can declare the other modules that they depend on. For example, a chat module may depend on a files module. Thus, with the loading of the chat module during the design or development stage for an interaction model, the files module will be started and the schema will be reconciled. Consequently, the files module can be used inside the chat module. Whenever a module is installed in the system during the design of an interaction model, the application will validate the dependencies of that module. If the dependencies are not met, a warning may be shown helping the user to install any missing modules. These techniques can avoid data dependency issues and also reduce the overall complexity of the system. Further, this solution is advantageous because it allows an open system platform with modules provided from numerous vendors/developers (i.e., a marketplace of modules) through a database schema managed by the modules in each interaction model as opposed to a schema managed centrally by the system which could limit dependencies and/or cause data conflicts and overlaps.

Referring again to FIG. 12, the applications and/or data storage components 1207 may be implemented as a single system or distributed system. In some embodiments, applications and/or data storage components 1207 may be implemented with a cloud-based platform, with application and storage components executed on one or more cloud servers. It will be appreciated from this disclosure that these are non-limiting examples and that other architectures and arrangements may be provided for implementing these components (e.g., a networked, distributed service and/or a client-server architecture).

Figure 13:
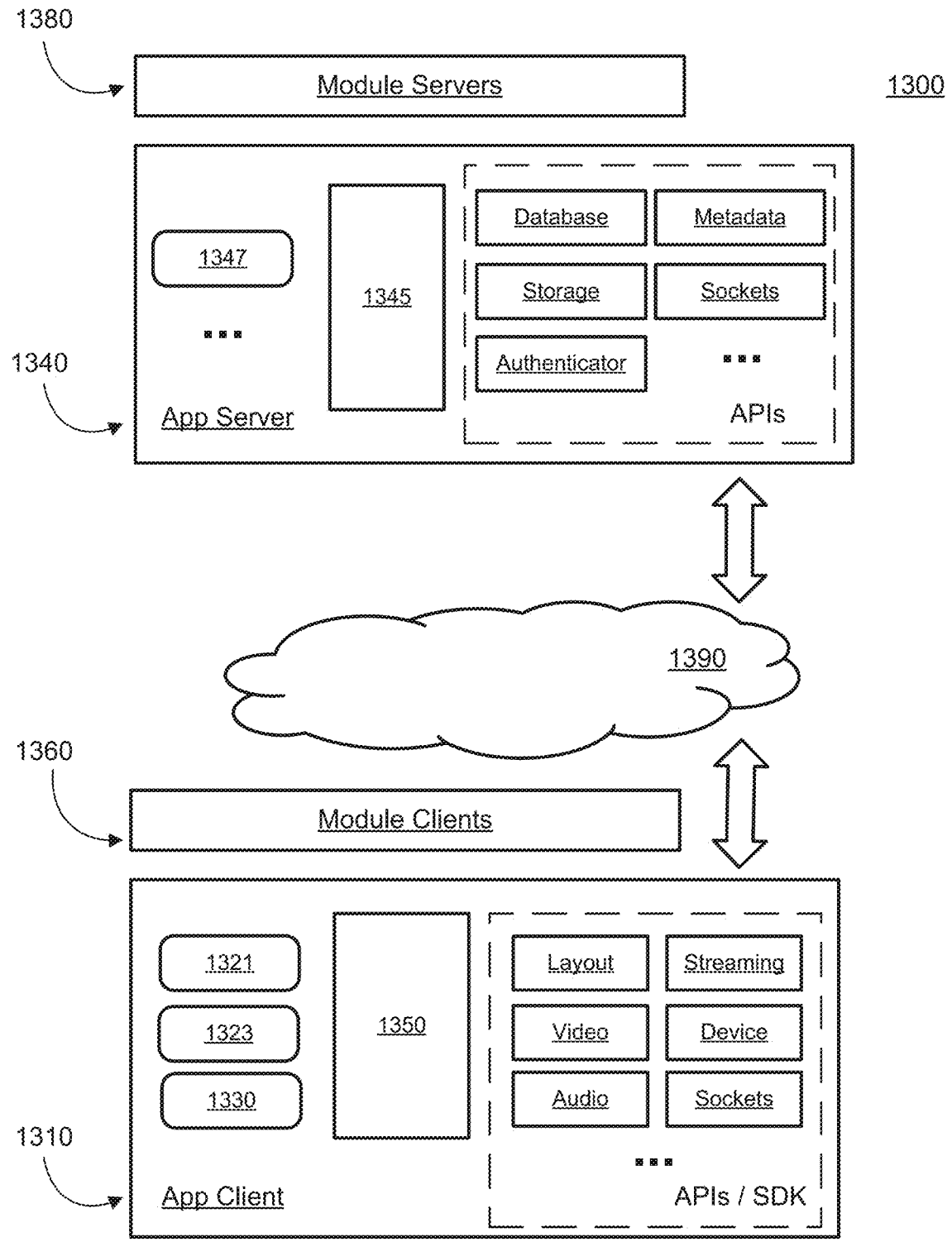
FIG. 13 illustrates another example system that includes client and server components, according to embodiments of the present disclosure.

FIG. 13 illustrates another example system 1300 that includes server and client components, according to embodiments of the present disclosure. System 1300 may implement the methods and features of the present disclosure. As further described below, the client-server arrangement of FIG. 13 includes an interaction application server 1340 (the "app server") and an interaction application client 1310 (the "app client"). App server 1340 and app client 1310 may be in communication with one another via a network 1390 (e.g., any combination of a wired and/or wireless communications network, which may be public or private). As shown in FIG. 13, app server 1340 and app client 1310 include a plurality of components, and this client-server arrangement may be utilized to implement modules of any type (e.g., micro, macro, meta, etc). As disclosed herein, modules may be used to define an interaction model and each module may include a set of executable functional elements that are programmable, and hence highly customizable, adaptable, and scalable. In the example embodiment of FIG. 13, modules are split into two components: the client code (i.e., module clients 1360) that interacts with app client 1310, which may be inside a user's browser or device; and the server code (i.e., module servers 1380) that interacts with the app server 1340. These and other features are further described below.

App server 1340 may run on one or more servers and, as described above, may include a number of components. When an interaction model is executed, app server 1340 may be adapted to process data, including live events 1347 (e.g., live sessions that are currently taking place) or other events. App server 1340 may also be able to process other data, such metadata generated by one or more modules or search parameters and requests for data in the buildup. As illustrated in FIG. 13, app server 140 includes APIs for databases, storages, user authentication, metadata, and/or sockets for plugging in module(s) or functional elements. App server 1340 also comprises an orchestrator or kernel 1345 which controls and manages this processing and exchange of data as each interaction model is executed. In some embodiments, kernel 1345 manages the scheduling of model execution and resource management, for example. Thus, the orchestrator or kernel 1345 is responsible for loading and unloading modules at the right time and for the right events on the server side.

App client 1310 may be implemented as a local client running on each user device (e.g., using a web browser or an application installed on the user device). When an interaction model is executed, app client 1310 may be adapted to process data, including for mounting or providing interfaces (e.g., a player interface, a designer interface, a buildup interface, and/or a management interface). In addition, APIs from the SDK may be provided for layouts, GUIs, streaming, video, audio, device management, and/or sockets for plugging in the devices, module(s) or functional elements. Further, app client 1310 may include an orchestrator 1350 which controls and manages the processing and exchange of data as each interaction model is executed. In some embodiments, orchestrator 1350 manages the scheduling of model execution and resource management, for example. Thus, the orchestrator or kernel 1350 is responsible for loading and unloading modules at the right time and for the right events on the client side.

As described above, in the example embodiment of FIG. 13, module are split into two components: the client code (i.e., module clients 1360) that interacts with app client 1310, which may be inside a user's browser or device, and the server code (i.e., module servers 1380) that interacts with the app server 1340. Module clients 1360 may be managed by orchestrator 1350. For example, orchestrator 1350 may control how and when a module can be rendered on a display screen or interact with the user. Orchestrator 1350 may also swap the current micro modules (e.g., based on the interaction model), and control and/or change the active functional elements (e.g., defining rules or conditions) for an interaction. Orchestrator 1350 can base its instructions on metadata generated by a designer interface, as well as other interfaces and/or modules. When a module client 1360 is about to render a graphical object or other content on the display screen, it may be influenced based on where it is mounted. For example, a module may be mounted in a player interface, a management interface, a designer interface, or a buildup interface. In FIG. 13, three example mounts are shown: player mount 1321, design mount 1323, and buildup mount 1330. In some embodiments, the content that is rendered may be influenced and different based on which interface is mounted. Furthermore, a module client may not only look different but also act differently based on where it is used.

Module clients 1360 may render information on a display screen using the Layout API, which is configured to know screen "layouts" and where to place content that is rendered by each module. While active, each module client 1360 may access and use other APIs from the SDK to interact with the interaction model. For example, a module client may use the streaming API (e.g., for video, audio, and or session recordings), the device API, the sockets API, the orchestrator API, the authenticator API, the storage API, Persistence API, etc. The list of available APIs may change over time (e.g., by downloading more APIs or updating existing APIs). For example, at a new release of an interaction model, the list of available APIs may also be updated.

Data generated during executions of the interaction model(s) can be very useful and informative. By using modules to control or manage the database structure or schema, the interaction model ecosystem is able to capture and store as much data as possible, and then retrieve and provide (e.g., display) the captured/stored data in a contextually structured way using the generated metadata (e.g., based on the database schema).

Figure 14:
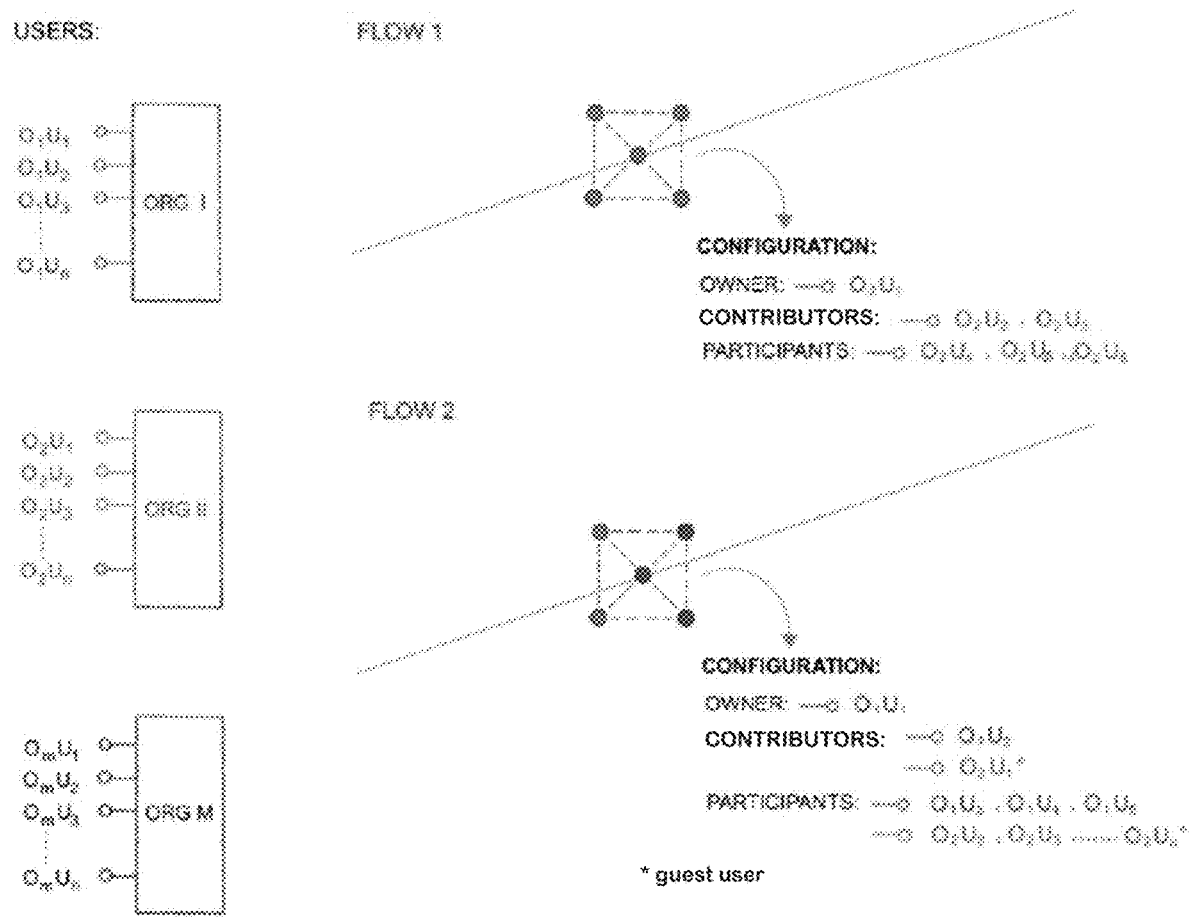
FIG. 14 illustrates examples of different configurations of users, according to embodiments of the present disclosure.

FIG. 14 illustrate examples of different configurations of users, according to embodiments of the present disclosure. As disclosed herein, the systems and methods of the present disclosure may be utilized to generate and execute interaction models for interactions. For each interaction model, at least one configuration of users may be identified for one or more sessions and each user in the configuration may be assigned a specific role (e.g., an owner, an administrator, a contributor, a participant, etc.). Users may have different roles in different interactions and their roles may differ across different organizations and groups.

The example of FIG. 14 illustrates different configurations of users and their respective role assignments. In this example, a number (m) of different organizations (ORG I, ORG II, . . . ORG M) are shown. Each organization has a different set of users. For example, as illustrated in FIG. 14, users O1U1-O1Un are part of organization ORG I, users O2U1-O2Un are part of organization ORG II, and so on, including users OmU1-OmUn of organization ORG M. In this example, two interactions (FLOW 1 and FLOW 2) are also shown. The configuration of users for these interactions may include users from the different organizations (i.e., a "guest user" from an outside organization as compared to the organization that owns and manages the interaction) and users may have different roles across different interactions. In some embodiments, guest users may be given restricted rights (i.e., only a participant role). Additionally, or alternatively, guest users may be assigned roles with any level of rights (i.e., from owner to participant).

The following table below summarizes the role assignments for the two interactions in FIG. 14:

TABLE 3

Role Assignments of Users in Different Interactions

| Role | FLOW 1 Interaction | FLOW 2 Interaction |
|---|---|---|
| Owner | O2U1 | O1U1 |
| Contributor | O2U2, O2U3 | O1U2, O2U1* |
| Participants | O2U4, O2U5, O2U6 | O1U3, O1, U4, O1U5 O2U3, O2U3, . . . O2U8* |

In the above table, the asterisked users in FLOW 2 are "guest users" (i.e., users from organization ORG II). Further, some users have different roles across the two interactions. For instance, in FLOW 1 user O2U1 is the owner while in FLOW 2 user O2U1 is a contributor.

When the interaction model for FLOW 1 is executed, only the users of ORG II take part in the interaction. That is, there are no guest users from ORG I or any other organization in the defined configuration of users for FLOW 1.

When the interaction model for FLOW 2 is executed, users of two organizations ORG I and ORG are part of the defined configuration of users. In this example, the guest users are from ORG II, including user O2U1 assigned a contributor role, and users O2U3, O2U3, . . . O2U8 each being assigned a participant role.

Figure 15:
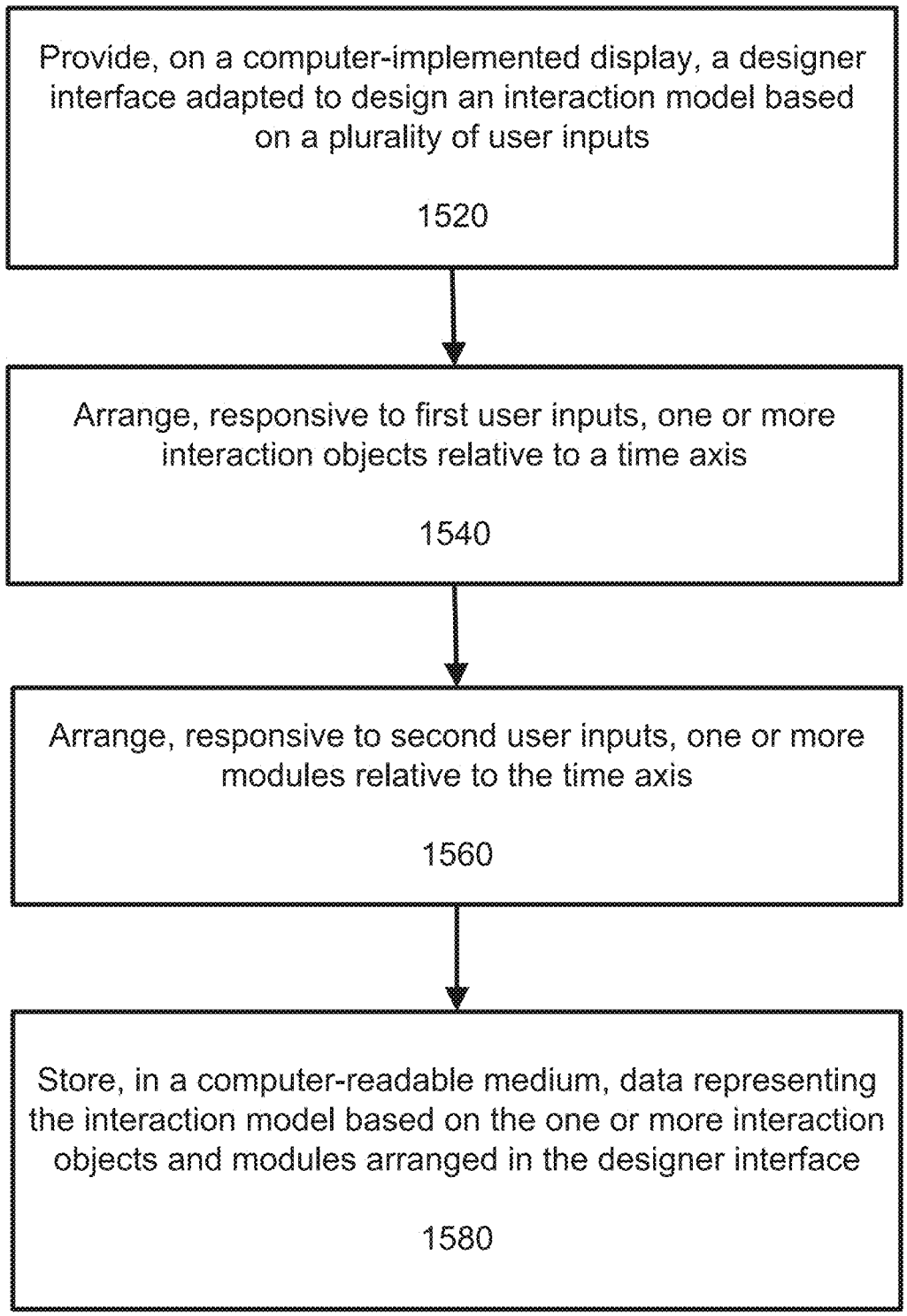
FIG. 15 is a flowchart illustrating an example method for generating an interaction model, according to embodiments of the present disclosure.

FIG. 15 is a flowchart illustrating an example method for generating an interaction model, according to embodiments of the present disclosure. As disclosed herein, interaction models may be generated using an interface such as a designer interface. The method of FIG. 15 may be implemented with the example systems disclosed herein (see, e.g., FIGS. 8, 12, and 13). An interaction model according to the method of FIG. 15 may provide a model for controlling an interaction. The interaction may include a plurality of sessions among users that exchange data for a common context.

As shown in FIG. 15, in step 1520, a designer interface is provided. The designer interface, such as the GUI example disclosed in FIG. 11, may be provided on a computer-implemented display of a user device. Access to the designer interface may be restricted to a user that is an owner or administrator of the interaction. As disclosed herein, the designer interface may include a number of tools and features to enable the owner or administrator to define and generate an interaction model. The interaction model may include one or more interaction objects and one or more modules arranged in a sequence and/or relative to a time axis.

Referring again to FIG. 15, in step 1540, responsive to first user inputs, one or more interaction objects are arranged relative to a time axis displayed in the designer interface. As disclosed herein, each interaction object may represent a configuration of users associated with the interaction. The first user inputs to the designer interface may include any number and type of user inputs. For example, a keyboard or a mouse based input; a drag and drop operation; a touch based input (e.g., using a touchscreen of a user device); a voice recognition based input (e.g., by receiving audio, and performing a voice recognition on the received audio); and a motion capture based input (e.g., by capturing images of the user in motion and performing a motion capture process, or by using a controller capable of detecting a motion/acceleration). Other examples of first user inputs include inputs created with a VR or AR device.

In step 1560, responsive to second user inputs, one or more modules are arranged relative to the time axis displayed in the designer interface. As disclosed herein, each of the one or more modules represents a set of functional elements that are executable in or during one or more of the plurality of sessions of the interaction. By execution of these functional elements, a user is able to use various functions (e.g., generate data, save data, access and retrieve data, record a session, and so on). The second user inputs, like the first user inputs, may include any number and type of user inputs. For example, a keyboard or a mouse based input; a drag and drop operation; a touch based input; a voice recognition based input; and a motion capture based input. Other examples of second user inputs include inputs created with a VR or AR device.

In step 1580, data representing the interaction model is stored in a computer-readable medium (e.g., on a local device, a server, or a cloud system). The stored data representing the interaction model includes data representing, among other things, the arrangement of the one or more interaction objects and the one or more modules arranged relative to the time axis.

In some embodiments, the method further includes identifying, responsive to third user inputs (e.g., a keyboard or a mouse based input; a drag and drop operation; a touch based input; a voice recognition based input; motion based input; etc), users associated with the configuration for each interaction object and roles assigned to the users in each configuration. The third user inputs may be made in the designer interface or another interface, such as a management interface. Further, the method may include storing, in a computer-readable medium, the identified users and roles as part of the interaction model.

As disclosed herein, the roles assignable to users in each configuration may comprise an owner, a contributor, a collaborator, and/or a participant. Each role defines rights of a user in the configuration. Further, one or more of the modules may include a set of functional elements that are configured to be dependent on the assigned roles. For example, when the functional elements of a particular module are executed, the resultant output or operation of this execution provided to a user may vary depending on the role assign to that particular user. By way of example, different information or instructions may be displayed to a user depending on the role assigned to that user. As a further example, a voting module may control which users can vote on particular items based on their assigned role. Access to certain documents or files may also be restricted based on each user's assigned role.

In some embodiments, the method may further include storing metadata for the interaction model. The metadata may include contextual information for the data stored in the buildup. The metadata may further include information for identifying a storage location of data that is part of a data buildup. In some embodiments, the method further includes generating at least part of the metadata with the functional element of one or more of the modules.

In some embodiments, the method includes generating an interaction model by: arranging and displaying, on the time axis in the designer interface, a first type of module representing a set of functional elements which are available for use at a particular point or period of time (e.g., a micro module); further arranging and displaying, as an offshoot from the time axis in the designer interface, a second type of module representing a set of functional elements which are available for use during the entirety of one or more sessions of the interaction (e.g., a macro module); and providing, as part of the interaction model, a third type of module representing a set of functional elements for providing a meta environment (e.g., a meta module), wherein the meta environment enables data communication with an external environment.

Figure 16:
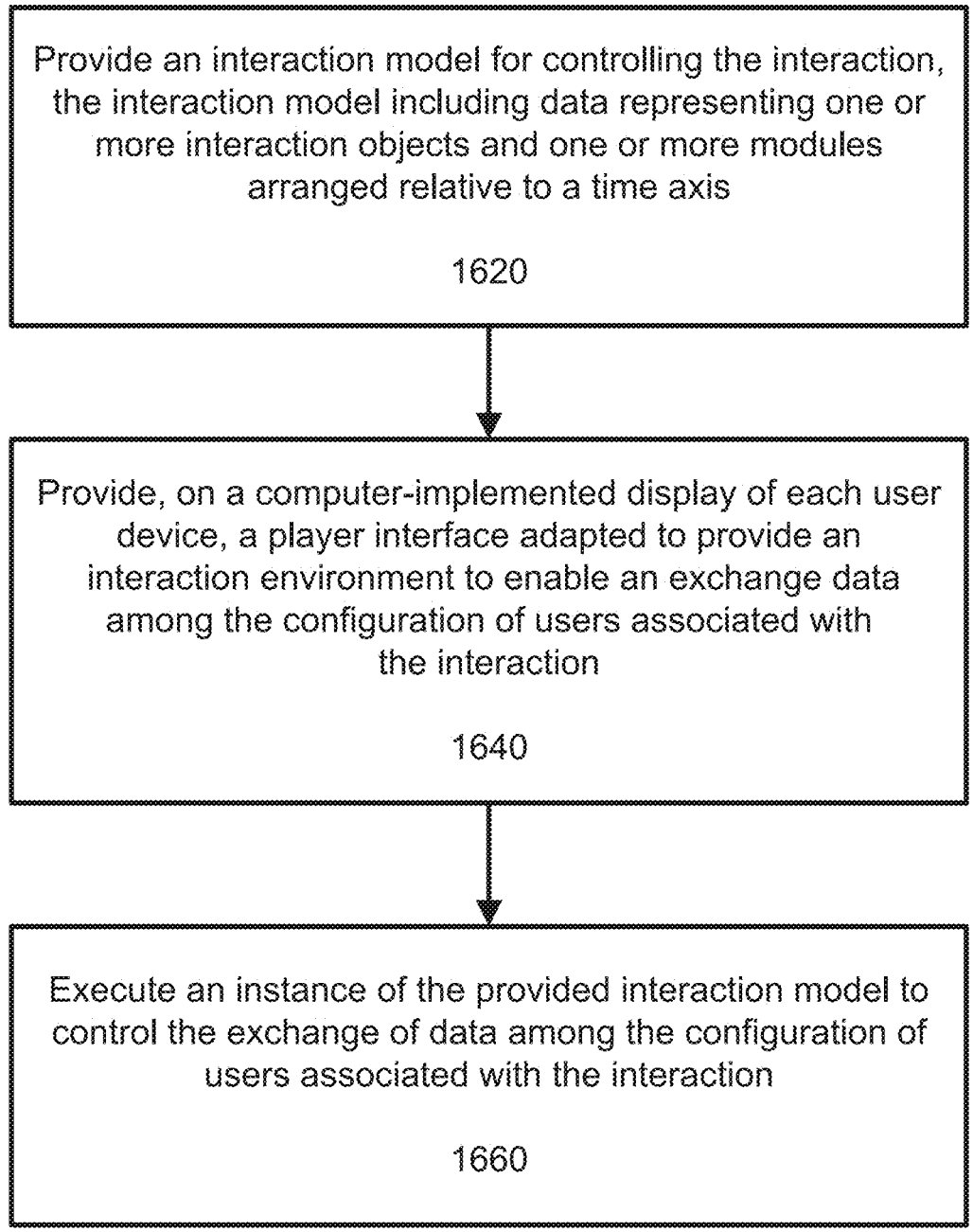
FIG. 16 is a flowchart illustrating an example method for controlling an interaction comprising a plurality of sessions, according to embodiments of the present disclosure.

FIG. 16 is a flowchart illustrating an example method for controlling an interaction comprising a plurality of sessions, according to embodiments of the present disclosure. As disclosed herein, an interaction can be controlled and managed by executing an interaction model. The method of FIG. 16 may be implemented with the example systems disclosed herein (see, e.g., FIGS. 8, 12, and 13). The interaction may include a plurality of sessions among users that exchange data for a common context. Users may join and participate in sessions via their respective user devices and through a player interface which implements an interaction environment.

As shown in FIG. 16, in step 1620, an interaction model is provided for controlling the interaction. The interaction model may be stored in a computer-readable medium and comprise data representing, among other things, one or more interaction objects and one or more modules arranged relative to a time axis. Each interaction object may represent a configuration of users associated with the interaction, and each module may include a set of functional elements that are executable in one or more of the sessions of the interaction.

In step 1640, a player interface is provided on a computer-implemented display of each user device. A player interface, such as the GUI example disclosed in FIGS. 1 and 10, may be provided on a computer-implemented display of each user device. The player interface may include tools and features to enable users to participate each session. As disclosed herein, for example, the player interface may be adapted to provide an interaction environment for users to exchange data during each session of the interaction. In the interaction environment, the player interface may also provide an agenda with graphical object(s) that are user-selectable to execute functional elements of one or more of the modules in the interaction model. The progress of the session relative to the agenda can also be shown through the player interface by, for example, displaying a progress pointer or line or by highlighting items in the agenda.

Referring again to FIG. 16, in step 1660, an instance of the provided interaction model is executed, with at least one processor, to control the exchange of data among users in each session of the interaction. As disclosed herein, during the execution of the interaction model, the interaction environment displayed by the player interface may be updated responsive to the execution of the interaction model. In some embodiments, the interaction environment of the player interface may be updated in response to execution of one or more of the modules of the interaction model.

As noted above, in the player interface, the users in the configuration can view an agenda for each session and the progress of each session relative to the agenda. Also, users in the configuration may exchange data, through the interaction environment of the player interface, using one or more modules of the interaction model. Also, the interaction environment of the player interface may be updated to present prompts and/or instructions to the users during the execution of the interaction model.

In some embodiments, with a designer interface or a management interface, users for the configuration may be identified as well as the role assigned to each user. The roles assignable to users may include, for example, an owner, an administrator, a contributor, and a participant. As disclosed herein, each role may define rights of a user in the configuration.

The example method of FIG. 16 may also include updating the display of the player interface on each user device to present information based on the role assigned to each user. Further, the method may include controlling, with at least one processor, the rights of the users in the configuration in accordance with roles assigned to the users. The rights may include one or more of available functions, permissions, access levels, capabilities, and responsibilities with respect to the interaction. To control the rights of the users, a permission-based authentication component may be utilized.

Still further, the example method of FIG. 16 may include applying functional elements of at least one module dependent on the roles assigned to users. Additionally, or alternatively, the method may include storing, in a database, a data buildup for the interaction, the data buildup comprising data exchanged in the sessions of the interaction. Further, as part of the method, metadata may be stored that provides contextual information for data in the data buildup.

Figure 17:
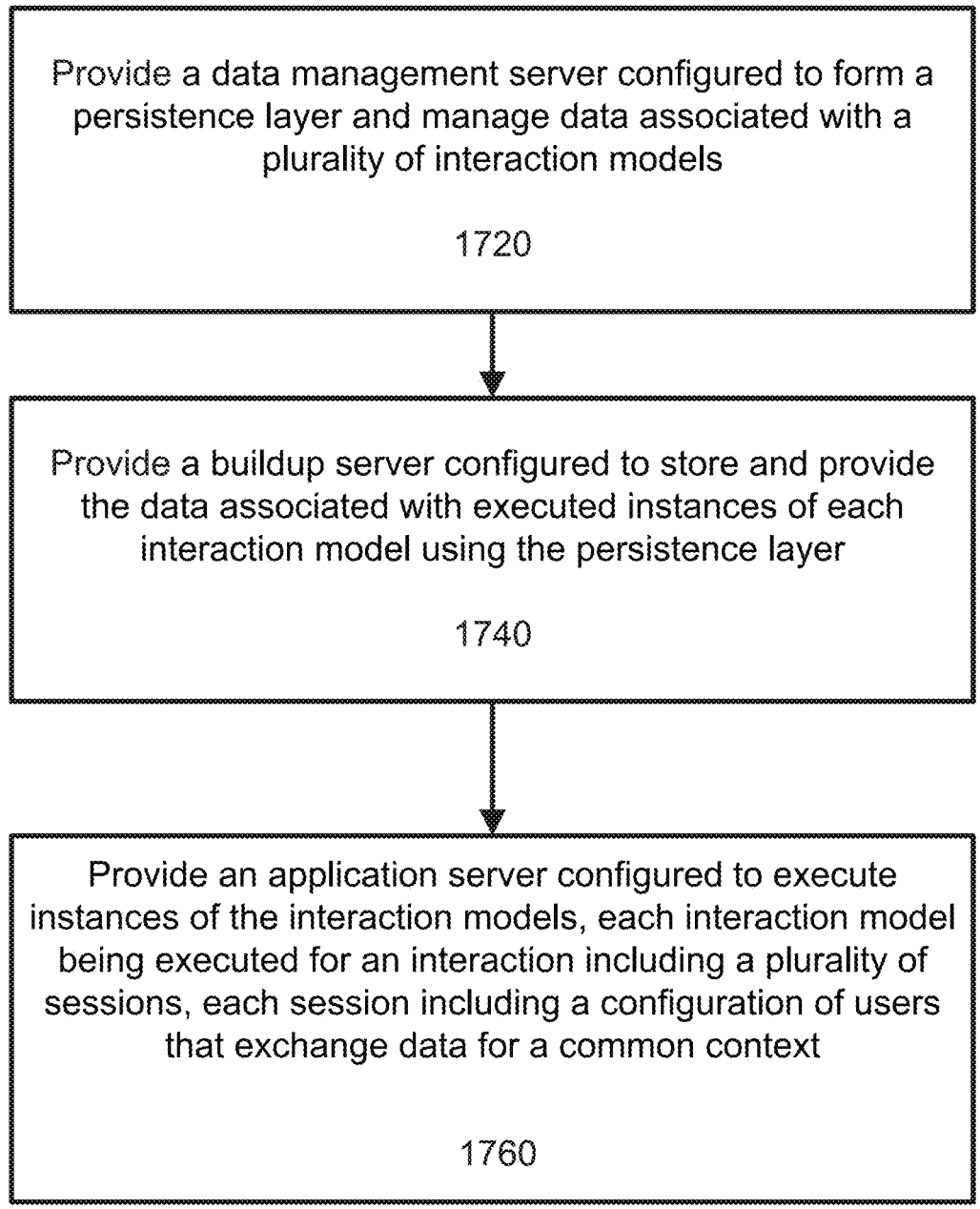
FIG. 17 is a flowchart illustrating an example method for controlling an interaction comprising a plurality of sessions, according to embodiments of the present disclosure.

FIG. 17 is a flowchart illustrating an example method for controlling an interaction comprising a plurality of sessions, according to embodiments of the present disclosure. The method of FIG. 17 may be implemented with the example system disclosed in FIG. 12. The method of claim 17 uses a number of components, including a data management server, a buildup server, and an application service. It will be understood from this disclosure that these components are non-limiting examples and that the method of FIG. 17 may be modified and implemented with other components and systems (such as those described with reference to FIGS. 8 and 13).

In step 1720, a data management server is provided. The data management server may be configured to form a persistence layer and manage data associated with a plurality of interaction models. The data management server may also configured to provide metadata for accessing the data associated with the interaction models. The data management server and other components of FIG. 17 (buildup server and application server) may by localized or distributed (e.g., in a client-server arrangement or cloud system).

Referring again to FIG. 17, in step 1740, a buildup server is provided. The buildup server may be configured to store and provide data associated with executed instances of each interaction model using the persistence layer of the data management server. As disclosed herein, each interaction model may include data representing one or more interaction objects and one or more modules. Each interaction object may represent a configuration of users associated with the interaction. Each module may include a set of functional elements that are executable in one or more of the sessions of the interaction.

In step 1760, an application server is provided. The application server may be configured to execute instances of the interaction models. Each interaction model may be executed for an interaction and include a plurality of sessions. As disclosed herein, each session may include a configuration of users that exchange data for a common context. The application server may also be configured to process the metadata from the data management server. The metadata may include location information for accessing the data managed by the data management server.

Application data from the application server may be stored in a first database, and media data from a media server may be stored in a second database. The application data may include configuration data. By way of example, the configuration data may include data for identifying users associated with the configuration for each interaction object and a role assigned to each user in the configuration.

The method of FIG. 17 may also include controlling the rights of users with the application server. For example, the application server may control the rights of users in the configuration in accordance with roles assigned to the users. The rights of user may include, among other things, permissions, access levels, capabilities, and responsibilities with respect to the interaction.

The set of functional elements of the one or more of the modules may include functional elements that are configured to be dependent on the assigned roles to users in the configuration. Also, the one or more modules of the interaction model comprise one or more of: a first type of module including a set of functional elements which are available for use at a particular point or period of time; a second type of module including a set of functional elements which are available for use during the entirety of one or more sessions of the interaction; and a third type of module including a set of functional elements for providing a meta environment, the meta environment enabling data communication with an external environment. Examples of module types including micro modules, macro modules, and meta modules.

As disclosed herein, the user devices may enable users to generate and exchange data in the one or more sessions of the interaction. Examples of user devices include a smartboard, a computer, a laptop, a tablet, a VR device, an AR device, and a headset device. Further examples of user devices are disclosed herein (see, e.g., FIG. 1).

Figure 18:
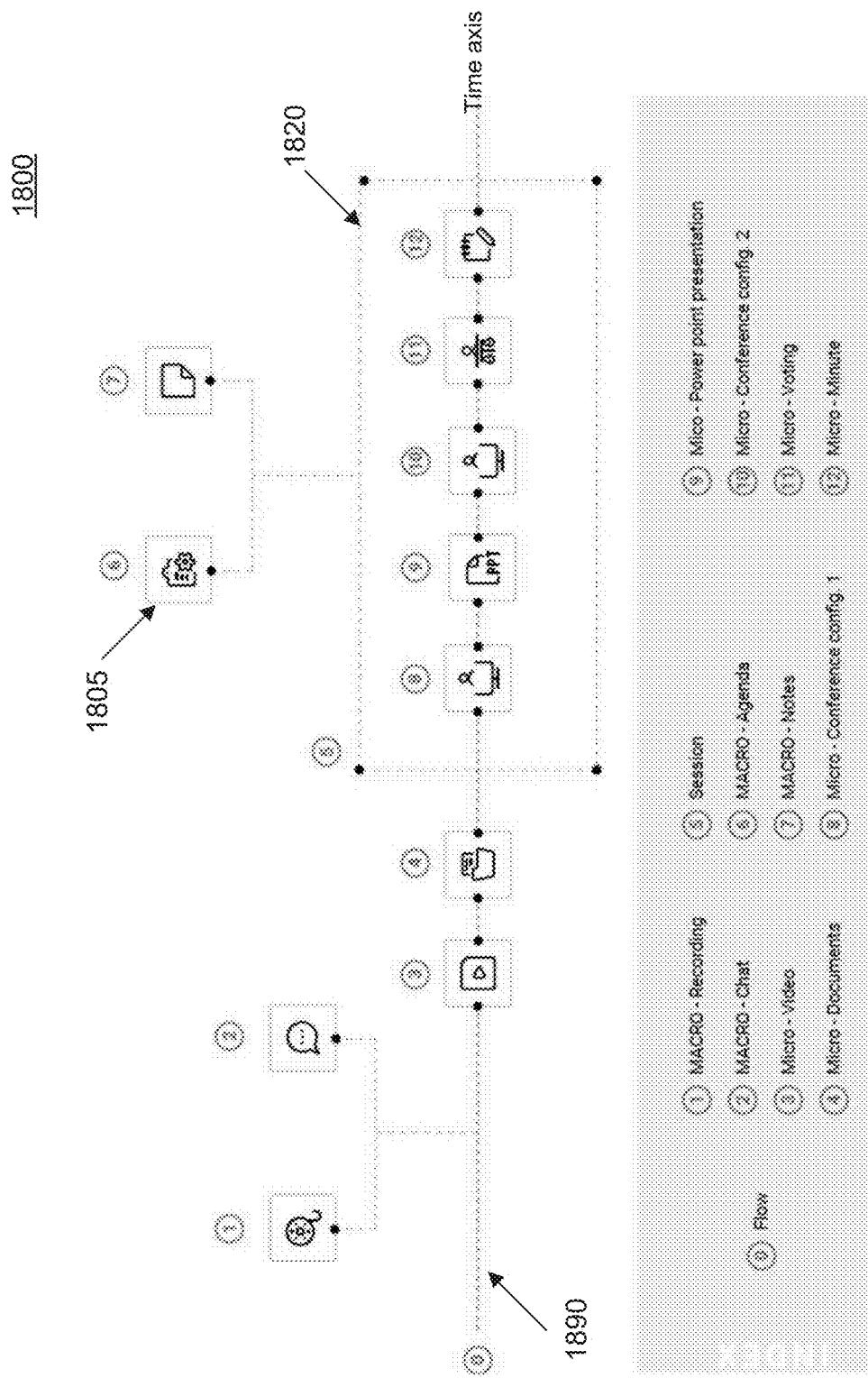
FIG. 18 illustrates an example interaction model including a defined session with a sequence of modules and an agenda module for managing the modules in the session, according to embodiments of the present disclosure.

FIG. 18 illustrates an example interaction model 1800 including a defined session 1820 with a sequence of modules and an agenda module 1805 for managing the modules in the session, according to embodiments of the present disclosure. As disclosed herein, interaction models may be generated using a designer interface. When designing an interaction model for an interaction or flow, a user may select a plurality of graphical objects (representing, among other things, an interaction object and a plurality of modules) arranged relative to a time axis 1890. The arrangement of the graphical objects in the designer interface may be done through a plurality of user inputs (e.g., drag and drop operations, text commands, voice commands, motion commands, etc). The example of FIG. 18 illustrates how the arrangement of graphical objects of interface model 1800 may appear to a user in the designer interface when designing the interaction model. An example designer interface, including its tools and functionalities, is described herein with reference to FIG. 11.

In FIG. 18, interaction model 1800 includes a plurality of modules of different types (e.g., micro modules and macro modules). In addition, interaction model 1800 includes a defined session 1820. As will be appreciated from this disclosure, there may be other defined sessions (not shown) for the interaction model. When designing interaction model 1800 in a designer interface, a user may first select and arrange macro modules (e.g., recording module (1) and a chat module (2)) as offshoots from the time axis. These macro modules will be available throughout each session. The user can also set other modules, such as meta modules and/or device modules (not shown), that are available throughout the interaction. Further, the user can select and arrange one or more micro modules (e.g., a video module (3) and a documents module (4)) along the time axis. These micro modules will be triggered and available at a particular point or time, as defined in interaction model 1800.

When designing interaction model 1800, the user can also define one or more sessions. Each session may be defined through the designer interface, including the modules that will be part of that session and the timing or scheduling of the session. In the example of FIG. 18, a session (5) is defined. The defined session 1820 may be scheduled for a specific date and time. Also, a configuration of users (not shown) may be defined for that session. The user may also select and arrange a sequence of micro modules (8-12) along the time axis for the defined session 1820. In the example of FIG. 18, the selected micro modules include a conference config. 1 module, a power point module, a conference config. 2 module, a voting module, and a minute module. These micro modules will be triggered and available, in sequence, at particular points or times, as defined in interaction model 1800. For the defined session 1820, the user may also select and arrange one or more macro modules that are available and used during that session. For example, as shown in FIG. 18, the user may identify an agenda module (6) and a notes module (7). The agenda module may include functional elements to manage the session and the micro modules in the session. For example, the agenda module may allow the user to change the names of the modules (e.g., "conference config. 1" or "conference config. 2") and set other desired parameters or configuration data. These settings may be stored as part of the data for implementing and executing the interaction model 1800.

As disclosed herein, the arrangement of the modules relative to time axis 1890 define when these modules are available or triggered for execution. Further, the sequence and names of the modules (such as modules (8)-(12) in defined session 1820) can be used to generate a session agenda. Using the data of the interaction model, the agenda can be automatically generated for each session and displayed in a player interface to inform users of the planned session activity and to manage and guide that session while it is executed. In addition, the agenda may include graphical objects that are selectable by a user to implement or execute modules (e.g., a voting module, a minute module, etc.). The present disclosure has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to or arranged with one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

According to some embodiments, the operations, features, methods, and/or techniques described herein can be implemented by any suitable combination of hardware, firmware, and software. By way of example, the herein disclosed devices, components, and systems can include one or more hardware processors programmed to perform such operations, features, methods, and/or techniques of the present disclosure pursuant to program instructions in firmware, memory, other storage, or combination thereof. Further, the herein disclosed user devices can combine custom hard-wired logic, ASICs, or FPGAs with custom programming to accomplish the operations, features, methods, and/or techniques of the present disclosure. Moreover, the disclosed devices, components, and systems can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing devices, components, and systems can be controlled by a proprietary operating system. Operating systems can control and schedule computer processes for execution, perform memory management, provide file system, networking, I/O services, and provide a user interface functionality, such as a graphical user interface ("GUI"), among other things.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, CD-ROMs, or other forms of RAM or ROM. Accordingly, the disclosed embodiments are not limited to the above described examples, but instead are defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including by reordering steps or inserting or deleting steps.

It is intended, therefore, that the specification and examples be considered as example only, with a true scope and spirit being indicated by the following claims and their full scope of equivalents.

What is claimed:

1. A computer-implemented method of generating an interaction model, the interaction model providing an executable interaction model for controlling an interaction comprising a plurality of sessions among users that exchange data for a common context, the method comprising:

providing, on a computer-implemented display, a designer interface adapted to design the interaction model and a sequence of the plurality of sessions over time based on a plurality of user inputs;

arranging, responsive to first user inputs, one or more interaction objects in a sequence displayed in the designer interface, each interaction object being selected from a set of available interaction object types each with a different configuration of users associated with the interaction;

further arranging, responsive to second user inputs, one or more modules relative to the sequence displayed in the designer interface, each module representing a set of functional elements that are executable in one or more of the plurality of sessions of the interaction; and storing, in a computer-readable medium, data representing the interaction model based on the one or more interaction objects and modules arranged in the designer interface, wherein an instance of the interaction model is executable by at least one processor to control the sequence of the plurality of sessions in an interaction environment presented through at least one player interface, the at least one player interface being different from the designer interface.

2. The method of claim 1, further comprising:

identifying, responsive to third user inputs, users associated with the configuration for each interaction object and a role assigned to each user in the configuration; and storing, in the computer-readable medium, data representing the identified users and roles assigned to users as part of the interaction model.

3. The method of claim 2, wherein the roles assigned to users comprise at least two of an owner, an administrator, a contributor, and a participant, each role defining rights of a user in the configuration.

4. The method of claim 3, wherein the set of functional elements of the one or more of the modules include functional elements that are configured to be dependent on the roles assigned to users.

5. The method of claim 1, further comprising:

storing, as part of a data buildup, data exchanged by users as part of the interaction; and further storing, for the data buildup, metadata identifying contextual information for the data stored as part of the data buildup.

6. The method of claim 5, wherein the metadata further includes location information for identifying a storage location of the data that is part of the data buildup.

7. The method of claim 5, further comprising:

generating, by the set of functional elements of the one or more of the modules, at least part of the metadata for the data buildup.

8. The method of claim 1, wherein at least one of the first user inputs and the second user inputs comprises at least one of:

a drag and drop operation;
a voice command input; and
a motion command input.

9. The method of claim 1, further comprising:

providing data for instantiating at least one of the one or more interaction objects, the one or more modules, and the interaction model.

10. The method of claim 1, wherein the designer interface is adapted to display a time axis and wherein the method further includes:

arranging, responsive to the first user inputs, the one or more interaction objects relative to the time axis displayed in the designer interface; and further arranging, responsive to the second user inputs, the one or more modules relative to the time axis displayed in the designer interface.

11. The method of claim 10, further comprising at least one of:

displaying, on the time axis in the designer interface, a first type of module representing a set of functional elements which are available for use at a particular point or period of time;

further displaying, as an offshoot from the time axis in the designer interface, a second type of module representing a set of functional elements which are available for use during the entirety of one or more sessions of the interaction; and providing, as part of the interaction model, a third type of module representing a set of functional elements for providing a meta environment, the meta environment enabling data communication with an external environment.

12. The method of claim 11, wherein the first type of modules, the second type of modules, and the third type of modules comprise at least two of a micro module, a macro module, and a meta module.

13. The method of claim 11, further comprising:

further providing, as part of the interaction model, a fourth type of module representing a set of functional elements for supporting data from a user device.

14. The method of claim 13, wherein the user device enables a user to generate and exchange data for one or more sessions of the plurality of sessions of the interaction, the user device comprising at least one of a smartboard, a computer, a laptop, a tablet, a VR device, an AR device, and a headset device.

15. The method of claim 1, wherein each interaction object type is a graphical representation indicating a configuration among at least one of: one or more owners and one or more contributors, one or more owners and one or more participants, and one or more owners, one or more contributors, and one or more participants.

16. The method of claim 1, wherein each of the arranged interaction objects represents a configuration of users that is applicable to a point, position, or period in time when a particular session of the plurality of sessions of the interaction is taking place.

17. A computer-implemented system for generating an executable interaction model for controlling an interaction comprising a plurality of sessions among users that exchange data for a common context, the system comprising at least one processor programmed with instructions and configured to:

provide, on a computer-implemented display, a designer interface adapted to design the executable interaction model and a sequence of the plurality of sessions over time based on a plurality of user inputs;

arrange, responsive to first user inputs, one or more interaction objects in a sequence displayed in the designer interface, each interaction object being selected from a set of available interaction object types each with a different configuration of users associated with the interaction;

further arrange, responsive to second user inputs, one or more modules relative to the sequence displayed in the designer interface, each module representing a set of functional elements that are executable in one or more of the plurality of sessions of the interaction; and store, in a computer-readable medium, data representing the executable interaction model based on the one or more interaction objects and modules arranged in the designer interface, wherein an instance of the executable interaction model is executable by at least one processor to control the sequence of the plurality of sessions in an interaction environment presented through at least one player interface, the at least one player interface being different from the designer interface.

18. The system of claim 17, wherein the at least one processor is further configured to:
identify, responsive to third user inputs, users associated with the configuration for each interaction object and a role assigned to each user in the configuration; and
store, in the computer-readable medium, data representing the identified users and roles assigned to users as part of the interaction model.

19. The system of claim 18, wherein the roles assigned to users comprise at least two of an owner, an administrator, a contributor, and a participant, each role defining rights of a user in the configuration.

20. The system of claim 19, wherein the set of functional elements of the one or more of the modules include functional elements that are configured to be dependent on the roles assigned to users.

21. The system of claim 17, wherein the at least one processor is further configured to:
store, as part of a data buildup, data exchanged by users as part of the interaction; and
further store, for the data buildup, metadata identifying contextual information for the data stored as part of the data buildup.

22. The system of claim 21, wherein the metadata further includes location information for identifying a storage location of the data that is part of the data buildup.

23. The system of claim 21, wherein the at least one processor is further configured to:
generate, by the set of functional elements of the one or more of the modules, at least part of the metadata for the data buildup.

24. The system of claim 17, wherein at least one of the first user inputs and the second user inputs comprises at least one of:
a drag and drop operation;
a voice command input; and
a motion command input.

25. The system of claim 17, wherein the at least one processor is further configured to:
provide data for instantiating at least one of the one or more interaction objects, the one or more modules, and the interaction model.

26. The system of claim 17, wherein the at least one processor is further configured to perform at least one of:
display, on the time axis in the designer interface, a first type of module representing a set of functional elements which are available for use at a particular point or period of time;
further display, as an offshoot from the time axis in the designer interface, a second type of module representing a set of functional elements which are available for use during the entirety of one or more sessions of the interaction; and
provide, as part of the interaction model, a third type of module representing a set of functional elements for providing a meta environment, the meta environment enabling data communication with an external environment.

27. The system of claim 26, wherein the first type of modules, the second type of modules, and the third type of modules comprise at least two of a micro module, a macro module, and a meta module.

28. The system of claim 26, wherein the at least one processor is further configured to:
further provide, as part of the interaction model, a fourth type of module representing a set of functional elements for supporting data from a user device.

29. The system of claim 28, wherein the user device is configured to enable a user to generate and exchange data for one or more sessions of the plurality of sessions of the interaction, the user device comprising at least one of a smartboard, a computer, a laptop, a tablet, a VR device, an AR device, and a headset device.

* * * * *